US006752224B2

(12) United States Patent
Hopper et al.

(10) Patent No.: US 6,752,224 B2
(45) Date of Patent: Jun. 22, 2004

(54) WHEELED CARRIAGE HAVING A POWERED AUXILIARY WHEEL, AUXILIARY WHEEL OVERTRAVEL, AND AN AUXILIARY WHEEL DRIVE AND CONTROL SYSTEM

(75) Inventors: Christopher J. Hopper, Kalamazoo, MI (US); Richard Jay Bartow, Battle Creek, MI (US); Christopher Gentile, Sturgis, MI (US); Randy Newsome, Portage, MI (US); Michael Joseph Hayes, Kalamazoo, MI (US); Patrick Beyer, Portage, MI (US); Richard L. McDaniel, Constantine, MI (US)

(73) Assignee: Stryker Corporation, Kalamazoo, MI (US)

(*) Notice: Subject to any disclaimer, the term of this patent is extended or adjusted under 35 U.S.C. 154(b) by 0 days.

(21) Appl. No.: 10/086,012

(22) Filed: Feb. 28, 2002

(65) Prior Publication Data

US 2003/0159861 A1 Aug. 28, 2003

(51) Int. Cl.⁷ .............................................. B62D 61/10
(52) U.S. Cl. ...................... 180/22; 180/19.1; 180/19.2; 180/65.1; 180/65.2; 5/500
(58) Field of Search .................... 5/86.1, 600; 180/65.1, 180/65.5, 11, 19.1–19.3, 22–24; 280/250.1, 304.1

(56) References Cited

U.S. PATENT DOCUMENTS

| 3,112,001 A | 11/1963 | Wise | 180/6.5 |
|---|---|---|---|
| 3,286,602 A | 11/1966 | Butner et al. | 92/28 |
| 3,304,116 A | 2/1967 | Stryker | 296/20 |
| 3,404,746 A | 10/1968 | Slay | 180/23 |

(List continued on next page.)

FOREIGN PATENT DOCUMENTS

| CA | 2 010 543 | 9/1990 |
|---|---|---|
| DE | 43 19 516 | 12/1994 |
| EP | 0 062 180 A2 | 10/1982 |
| EP | 0 093 700 | 11/1983 |
| EP | 0 329 504 B1 | 8/1989 |
| EP | 0 352 647 B1 | 1/1990 |
| EP | 0 403 202 B1 | 12/1990 |

(List continued on next page.)

OTHER PUBLICATIONS

Stryker Model 1001, stretcher having a fifth wheel (7 photographs —A through G), Aug., 1994.

U.S. patent application Ser. No. 09/489 584 filed Jan. 21, 2000.

Primary Examiner—Lesley D. Morris
Assistant Examiner—L. Lum
(74) Attorney, Agent, or Firm—Flynn, Thiel, Boutell & Tanis, P.C.

(57) ABSTRACT

A wheeled carriage for supporting a patient in a substantially horizontal position includes a patient support having head and foot ends and a wheeled base supported by castered wheels. Auxiliary wheels are suspendably mounted on a wheel support structure with the axis of the auxiliary wheels spaced from a midpoint of the wheeled base. A control apparatus controls the wheel support structure to move the auxiliary wheels between a first deployed position whereat castered wheels at one end of the carriage are elevated from a floor surface, and a second stored position with the auxiliary wheels out of engagement with the floor surface. The wheeled carriage includes a drive motor for powering the auxiliary wheels. A drive member applies force to a load cell on the wheeled carriage. The load cell outputs a drive signal to drive the auxiliary wheels. An auxiliary wheel drive and control system accelerates or decelerates the carriage by comparing the drive signal with a threshold value that changes dependent on the velocity of the carriage.

78 Claims, 32 Drawing Sheets

U.S. PATENT DOCUMENTS

| | | | | |
|---|---|---|---|---|
| 3,802,524 A | | 4/1974 | Seidel | 180/6.5 |
| 3,869,011 A | | 3/1975 | Jensen | 180/9.24 |
| 3,938,608 A | | 2/1976 | Folco-Zambelli | 180/21 |
| 4,221,273 A | | 9/1980 | Finden | 180/6.48 |
| 4,260,035 A | * | 4/1981 | Loveless et al. | 180/6.5 |
| 4,284,929 A | * | 8/1981 | Garrett et al. | 318/51 |
| 4,407,393 A | * | 10/1983 | Youdin et al. | 188/2 F |
| 4,475,613 A | | 10/1984 | Walker | 180/22 |
| 4,614,246 A | | 9/1986 | Masse et al. | 180/6.5 |
| 4,646,860 A | | 3/1987 | Owens et al. | 180/19.2 |
| 4,848,504 A | | 7/1989 | Olson | 180/191 |
| 4,874,055 A | | 10/1989 | Beer | 180/19.2 |
| 5,064,012 A | | 11/1991 | Losego | 180/19.1 |
| 5,083,625 A | | 1/1992 | Bleicher | 180/65.1 |
| 5,113,959 A | | 5/1992 | Mastov et al. | 180/11 |
| 5,121,806 A | | 6/1992 | Johnson | 180/65.5 |
| 5,156,226 A | | 10/1992 | Boyer et al. | 180/65.1 |
| 5,193,633 A | * | 3/1993 | Ezenwa | 180/65.1 |
| 5,222,567 A | | 6/1993 | Broadhead et al. | 180/15 |
| 5,234,066 A | * | 8/1993 | Ahsing et al. | 180/6.5 |
| 5,337,845 A | | 8/1994 | Foster et al. | 180/11 |
| 5,390,382 A | * | 2/1995 | Hannant et al. | 5/424 |
| 5,526,890 A | | 6/1996 | Kadowaki | 180/8.3 |
| 5,542,690 A | | 8/1996 | Kozicki | 280/304.1 |
| 5,778,996 A | | 7/1998 | Prior et al. | 180/65.1 |
| 5,806,111 A | | 9/1998 | Heimbrock et al. | 5/86.1 |
| 5,810,104 A | * | 9/1998 | Campbell | 180/19.3 |
| 5,826,670 A | | 10/1998 | Nan | 180/15 |
| 5,927,414 A | | 7/1999 | Kan et al. | 180/19.3 |
| 5,937,959 A | | 8/1999 | Fujii et al. | 180/12 |
| 5,937,961 A | | 8/1999 | Davidson | 180/166 |
| 5,944,131 A | | 8/1999 | Schaffner et al. | 180/65.1 |
| 5,964,313 A | | 10/1999 | Guy | 180/332 |
| 5,983,425 A | * | 11/1999 | DiMucci et al. | 5/611 |
| 5,988,304 A | | 11/1999 | Behrendts | 180/65.1 |
| 6,000,076 A | * | 12/1999 | Webster et al. | 5/618 |
| 6,000,486 A | | 12/1999 | Romick et al. | 180/23 |
| 6,050,356 A | | 4/2000 | Takeda et al. | 180/65.1 |
| 6,070,679 A | | 6/2000 | Berg et al. | 180/19.2 |
| 6,098,732 A | | 8/2000 | Romick et al. | 180/23 |
| 6,154,690 A | | 11/2000 | Coleman | 701/1 |
| 6,178,575 B1 | | 1/2001 | Harada | 5/600 |
| 6,209,670 B1 | | 4/2001 | Fernie et al. | 180/12 |
| 6,240,579 B1 | | 6/2001 | Hanson et al. | 5/86.1 |
| 6,256,812 B1 | | 7/2001 | Bartow et al. | 5/86.1 |
| 6,286,165 B1 | | 9/2001 | Heimbrock et al. | 5/600 |
| 6,330,926 B1 | | 12/2001 | Heimbrock et al. | 180/65.5 |
| 6,367,817 B1 | * | 4/2002 | Kamen et al. | 280/5.507 |
| 6,390,213 B1 | * | 5/2002 | Bleicher | 180/65.1 |
| 6,588,523 B2 | * | 7/2003 | Heimbrock et al. | 180/65.5 |

FOREIGN PATENT DOCUMENTS

| | | |
|---|---|---|
| EP | 0 630 637 | 12/1994 |
| EP | 0 653 341 A1 | 5/1995 |
| JP | 10-181609 | 7/1998 |
| JP | 10-305705 | 11/1998 |
| JP | 2000-118407 | 4/2000 |
| WO | WO 87/07830 | 12/1987 |
| WO | WO 94/21505 | 9/1994 |
| WO | WO 95/20514 | 8/1995 |
| WO | WO 96/07555 | 3/1996 |
| WO | WO 96/33900 | 10/1996 |

* cited by examiner

WHEELED CARRIAGE HAVING A POWERED AUXILIARY WHEEL, AUXILIARY WHEEL OVERTRAVEL, AND AN AUXILIARY WHEEL DRIVE AND CONTROL SYSTEM

FIELD OF THE INVENTION

This invention relates to a wheeled carriage for supporting a patient in a substantially horizontal position, and, more particularly, to a wheeled carriage having at least one auxiliary wheel selectively positionable with the floor surface. The auxiliary wheel can be raised or lowered by activation of control elements including a cam device. A power drive system enables driving of the auxiliary wheel to move the carriage.

BACKGROUND OF THE INVENTION

Wheeled carriages for supporting a patient in a substantially horizontal position are well known in the art and a representative example of an early version of such a device is illustrated in Dr. Homer H. Stryker's U.S. Pat. No. 3,304,116, reference to which is incorporated herein. Dr. Stryker's innovative wheeled carriage included a fifth wheel which is raisable and lowerable by an attendant directly manually manipulating the wheel support frame oriented beneath the patient supporting portion of the wheeled carriage. The fifth wheel is positioned at substantially the center of the undercarriage such that usually the rear castered wheels and the fifth wheel support the carriage when the fifth wheel is deployed. However, the front castered wheels and the fifth wheel may also support a patient on the wheeled carriage depending on the position of the patient. Therefore, the wheeled carriage of U.S. Pat. No. 3,304,116 can teeter between the front and rear castered wheels when a patient is being moved thereon with the fifth wheel deployed.

In use, on an uneven floor surface, the fifth wheel disclosed in U.S. Pat. No. 3,304,116 can temporarily be in an extended position, but out of contact with the floor. For example, if a carriage begins movement up a ramp, the change in grade of the floor surface can cause the extended fifth wheel to lift from the floor. In the carriage of U.S. Pat. No. 3,304,116, the loss of contact with the floor can be a minor inconvenience. However, for a driven auxiliary wheel selectively positionable with the floor surface, loss of contact may lead to slipping or free rotation of the auxiliary wheel. Recontact between the auxiliary wheel and the floor may cause sudden acceleration of the carriage.

Accordingly, it is an object of this invention to provide a wheeled carriage for supporting a patient in a substantially horizontal position having an arrangement so that at least one driven auxiliary wheel, when in the extended position, maintains contact with the floor surface even if the floor surface is uneven or has a lower surface where the auxiliary wheel is positioned relative to the other wheels.

Controlling the speed and velocity of powered auxiliary wheels can be difficult because relatively slow stopping and starting is necessary to provide smooth acceleration and deceleration for wheeled carriages, especially carriages designed to transport persons with medical conditions.

It is a further object of this invention to provide a power drive control circuit for smooth acceleration and deceleration of the wheeled carriage by controlling driving of an auxiliary wheel.

SUMMARY OF THE INVENTION

The objects and purposes of the invention are met by providing a wheeled carriage for supporting a patient in a substantially horizontal position. The wheeled carriage includes a patient support having a length, opposing ends of the length comprising a head end and a foot end of the patient support. The patient support is mounted on a wheeled base including four-floor surface engaging and castered wheels spaced from one another. The wheeled base has an imaginary transverse centerline located at a midpoint of the length thereof. An auxiliary wheel support structure secured to the wheeled base suspendedly supports auxiliary wheels. The wheeled carriage includes a control apparatus for controlling the auxiliary wheel support structure to move the auxiliary wheels to a first deployed position engaging the floor surface, while a pair of castered wheels at the foot end are lifted from the floor surface. The control apparatus can also move the auxiliary wheels to a second stored position out of engagement with the floor surface.

When the auxiliary wheels are positioned on an uneven floor surface, such that the deployed auxiliary wheels are out of engagement with the floor surface while the castered wheels contact the floor, the auxiliary wheel support structure enables the auxiliary wheels to move downwardly to maintain contact with the floor surface.

In a first embodiment, the auxiliary wheel support structure includes a floating frame supporting the auxiliary wheels. When the deployed auxiliary wheels begin to lose contact with the floor surface due to a lowered surface thereunder, the floating frame moves downwardly to maintain contact between the auxiliary wheel and the lowered floor surface.

In a second embodiment, the auxiliary wheel support structure includes a pair of spaced parallel frame members secured to a cross bar that supports a cam follower and a roller member. A cam apparatus controls the cam follower to place the auxiliary wheels in a deployed or stored position. The auxiliary wheel support structure includes a linkage element pivotally secured to the wheeled base, and receiving the roller member at a first end. A push rod is pivotally secured at a first end to the wheeled base and pivotally and slidably secured at a second end to the linkage element. A rod spring mounted about and along the length of the rod member applies a biasing force therethrough, which is transferred through the roller member to the cam follower. When in the deployed position, the rod spring maintains a downward force on the cam follower. Then, when the four castered wheels contact the floor surface and the auxiliary wheel would not, because of an uneven surface, the downward force lowers the cam follower and thus the auxiliary wheels, to maintain floor surface contact.

Another embodiment provides a drive motor for driving the deployed auxiliary wheels to power the wheeled carriage. A handle on the wheeled carriage controls the velocity and direction of the wheeled carriage. The handle applies force to a load cell in one of two opposing directions. Applying force to the handle in a first forward direction accelerates the carriage in the forward direction, or decelerates the carriage when traveling in the reverse direction. When traveling in the reverse direction, as long as the forward force remains, the carriage eventually stops and then restarts beginning movement in the forward direction.

Another embodiment provides a disconnect mechanism for disconnecting the drive motor from a powered driving mode to a manually controlled unpowered operating mode. The unpowered mode allows an operator to manually move the wheeled carriage.

Another embodiment includes a drive and control system for controlling the auxiliary wheel support structure to move said at least one auxiliary wheel between a first deployed position and a second stored position out of engagement with the floor surface. The drive and control system receives a drive signal from an input measuring device, compares the value with a drive signal threshold value, and provides a power signal to drive the auxiliary wheel in response to the value of and the direction of the drive signal when the drive signal value exceeds the drive signal threshold value. The drive signal threshold value changes at increasing velocities of the vehicle. The drive and control system includes a processor which stores and calculates the threshold value. The drive and control system operates to smoothly and methodically control the velocity of the wheeled carriage.

BRIEF DESCRIPTION OF THE DRAWINGS

Other objects and purposes of this invention will be apparent to persons acquainted with an apparatus of this general type upon reading the following specification and inspecting the accompanying drawings, in which.

DETAILED DISCUSSION

Figure 1:
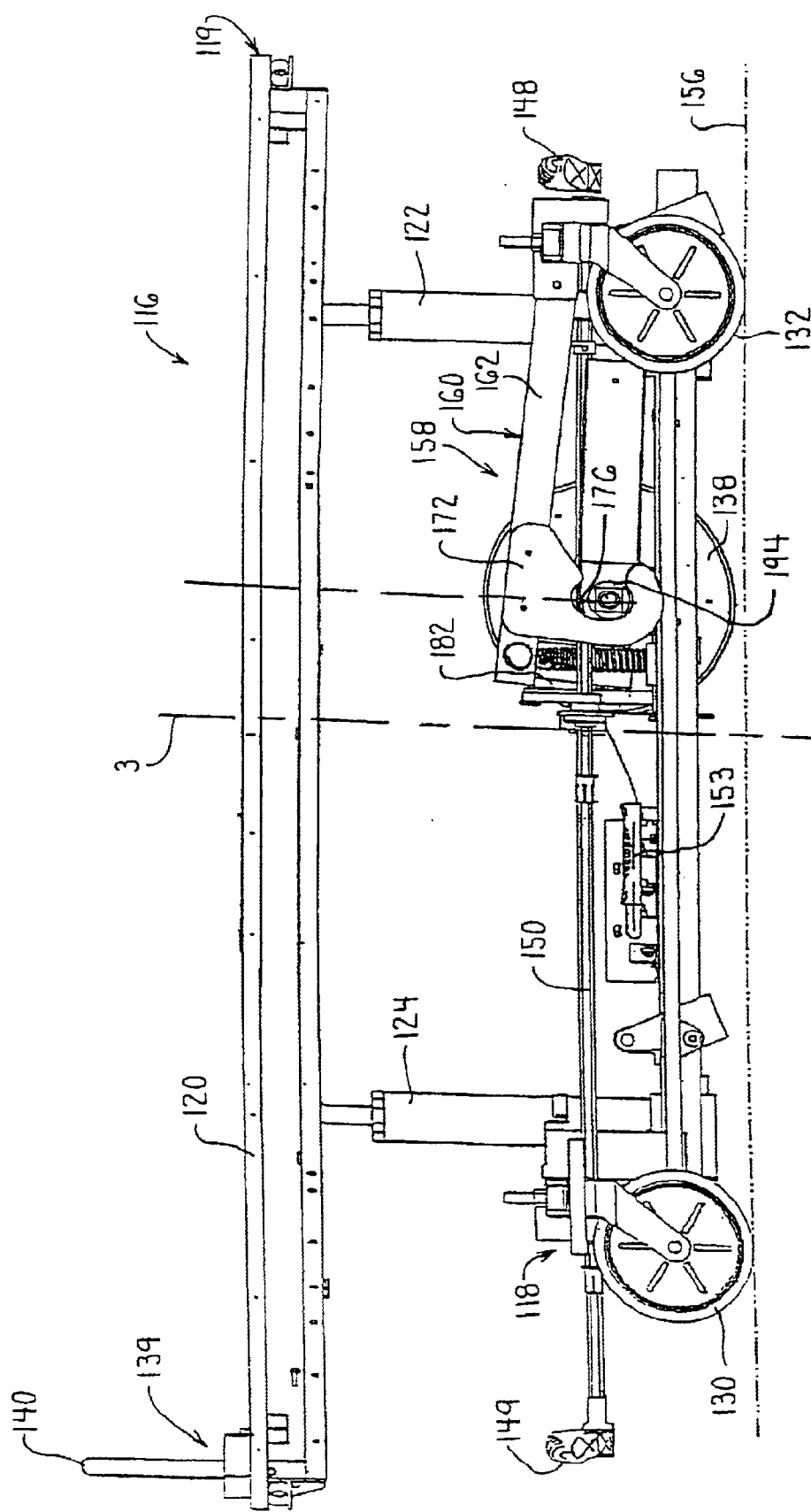
FIG. 1 is a side view of a first embodiment of a wheeled carriage for supporting a patient in a substantially horizontal position and embodying the invention.

Certain terminology will be used in the following description for convenience in reference only and will not be limiting. The words "up", "down", "right" and "left" will designate directions in the drawings to which reference is made. The words "in" and "out" will refer to directions toward and away from, respectively, the geometric center of the wheeled carriage and designated parts thereof. Such terminology will include derivatives and words of similar importance.

Figure 2:
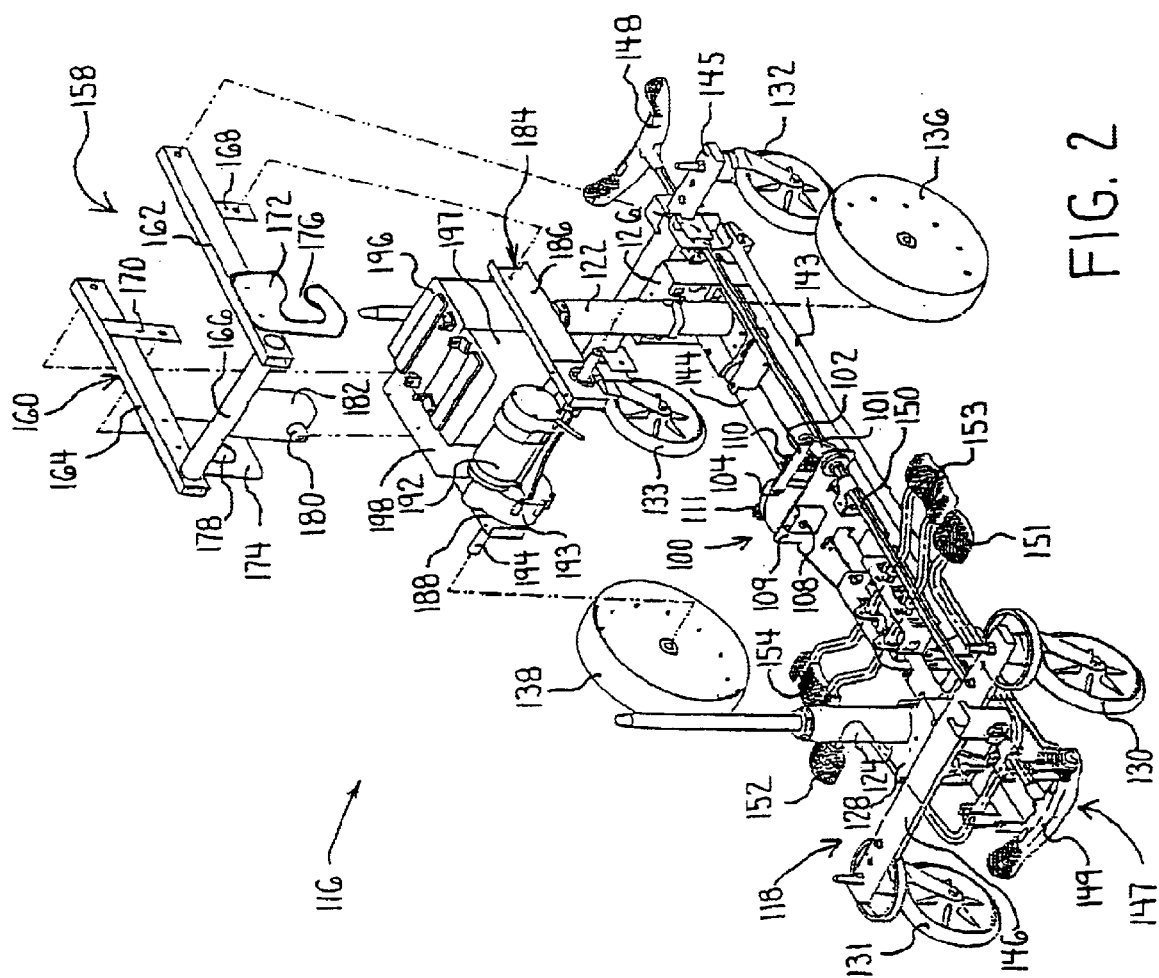
FIG. 2 is an exploded isometric view of the first embodiment of the wheeled carriage with the patient support removed to illustrate elements of the auxiliary wheel support structure and control apparatus.

FIG. 1 is an illustration of a wheeled carriage 116 for supporting a patient in a substantially horizontal position. The wheeled carriage 116 of FIG. 1, includes a wheeled base 118, a patient support 120 and a pair of hydraulically operated jacks 122 and 124 interposed between the wheeled base 118 and the underside of the patient support 120. As shown in FIG. 2, the jacks 122 and 124 are mounted to the wheeled base 118 and are fixedly secured in place by respective brackets 126 and 128. The jacks 122, 124 provide height adjustable support for the patient support 120.

As shown in FIG. 2, the wheeled base 118 includes a first elongate base frame member 143 and a second elongate spaced base frame member 144 extending along the length of the wheeled carriage 116. The wheeled base 118 includes a pair of elongate base support beams 145, 146 supporting castered wheels 130–133. The castered wheels 130–133 are supported at four corners of the wheeled base 118 to define a theoretical polygon P, in this case, a rectangle as shown in FIG. 2. The orientation of the wheels 130–133 is similar to that illustrated in Dr. Stryker's U.S. Pat. No. 3,304,116 patent. All of the aforesaid structure is generally conventional and forms the environment for the invention, which will be discussed in more detail below.

Auxiliary Wheel Location

In the first embodiment shown in FIGS. 1–10, auxiliary wheels 136, 138 are spaced a distance from the center of gravity along the length of the wheeled carriage 116 sufficient to ensure that the carriage will not teeter even if the center of gravity shifts a distance due to the weight of the patient.

As shown in FIG. 1, the wheeled base 118 has an imaginary transverse centerline M located at a midpoint of the length of the wheeled base and dividing the wheeled base. The axis of the auxiliary wheels 136, 138 is spaced from the centerline M at the midpoint of the wheeled base 118 toward the foot end 119 of the wheeled base.

The auxiliary wheels 136, 138 are spaced away from the center of gravity of the wheeled carriage 116. When the auxiliary wheels 136, 138 are deployed, the wheeled carriage 116 rests on the auxiliary wheels and castered wheels 130, 131. The wheeled carriage 116 does not teeter between the castered wheels 130, 131 at the foot end, and the castered wheels 132, 133 at the head end of the wheeled carriage. Preventing teetering of the wheeled carriage 116 ensures the patient is comfortable and avoids annoying the clinician. Further, preventing teetering enables proper cardiopulmonary resuscitation of the patient, if necessary.

The arrangement of the auxiliary wheels 136, 138 is disclosed in detail in U.S. Pat. No. 6,256,812, issued Jul. 10, 2001 and titled "Wheeled Carriage Having Auxiliary Wheel Spaced from Center of Gravity Of Wheeled Base and Cam Apparatus Controlling Deployment of Auxiliary Wheel", the disclosure of which is hereby incorporated by reference in its entirety.

Auxiliary Wheel Support Structure

An auxiliary wheel support structure 158 is provided on the wheeled base 118 toward a foot end 119 of the wheeled carriage 116. In this particular embodiment, the auxiliary wheel support structure 158 is oriented so that its plane of rotation is fixed and parallel to a longitudinal axis A of the wheeled base 118 shown in FIG. 3. As shown in FIG. 2, the auxiliary wheel support structure 158 includes a loading frame 160 for supporting fifth and sixth auxiliary wheels 136, 138 and a floating frame 184 secured to the auxiliary wheels. Thus, the auxiliary wheel support structure 158 interconnects the auxiliary wheels 136, 138 to the wheeled base 118.

A. Loading Frame

Figure 3:
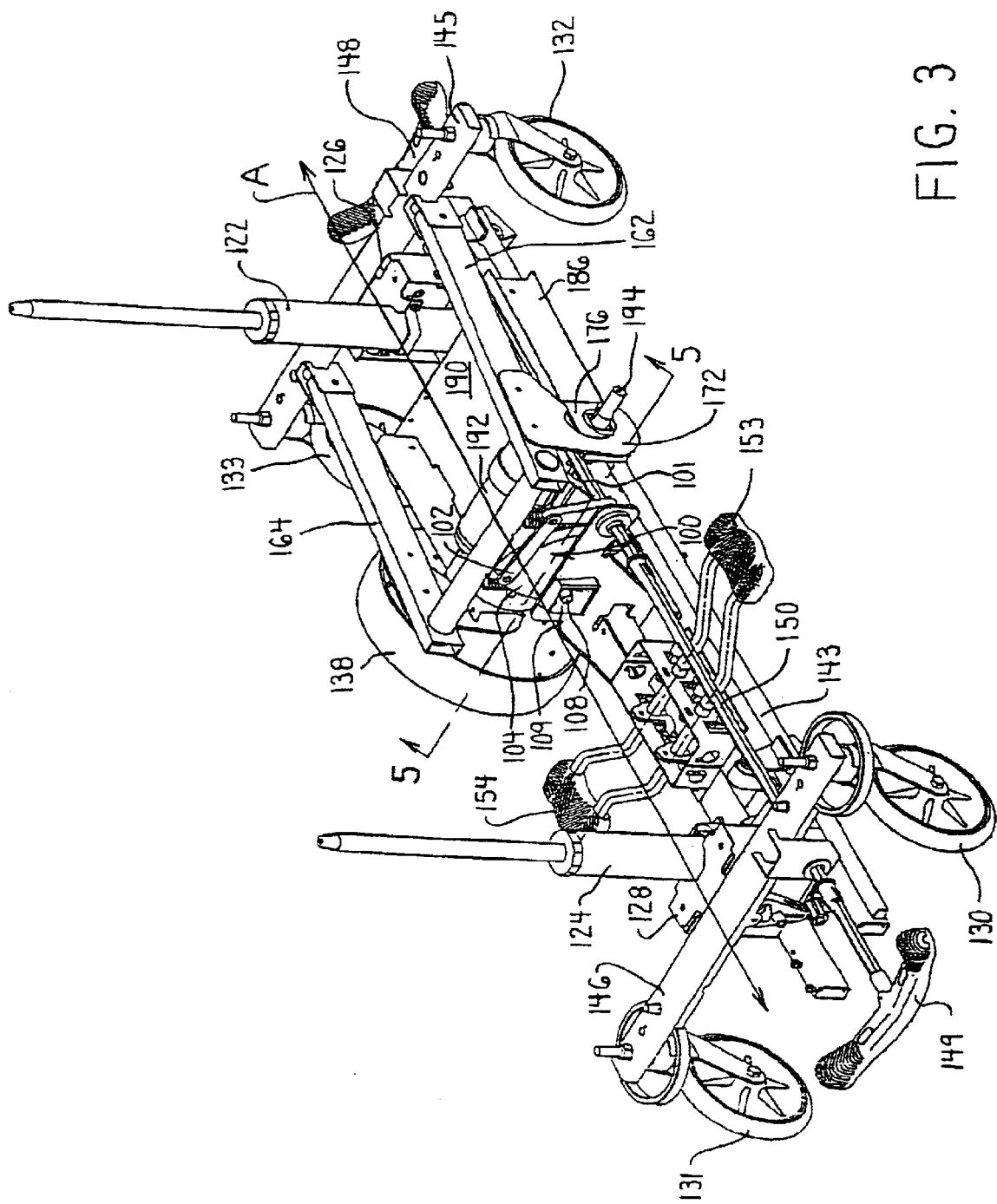
FIG. 3 is an isometric view of the wheeled carriage with the patient support and an auxiliary wheel removed to illustrate the auxiliary wheel support structure with the auxiliary wheels in a stored position.

The loading frame 160 includes first and second elongate frame members 162, 164. As shown in FIG. 3, one end of each of the frame members 162, 164 is pivotally secured at one end of the wheeled base 118. An elongate cross bar 166 is secured to second opposing ends of the frame members 162, 164. The cross bar 166 is perpendicular to the frame members 162, 164, which are parallel to each other. The loading frame 166 includes rigid floating frame connecting members 168, 170. As shown in FIG. 2, the connecting members 168, 170 are spaced at an equal distance along the respective frame members 162, 164 and extend downwardly therefrom. The connecting members 168, 170 include apertures for connection to the floating frame 184.

The loading frame 160 also includes first and second slotted elements 172, 174 mounted outwardly and equidistantly near the second ends of the frame members 162, 164, respectively. The slotted elements 172, 174 project downwardly and are substantially perpendicular to a plane defined by the frame members 162, 164. Flat surfaces of the slotted elements 172, 174 define parallel planes. The loading frame 160 is symmetric with respect to a central longitudinal axis A of the wheeled carriage 116 shown in FIG. 3. The slotted elements 172, 174 include open vertical slots 176, 178.

A cam follower support plate 182 having opposing flat surfaces is secured to and centered on the cross bar 166 and projects downwardly therefrom. The cam follower support plate 182 supports a cam follower 180 projecting outwardly from the plate toward the center of the wheeled carriage 116. The cam follower 180 includes a roller to interact with other elements to be described later.

B. Floating Frame

FIGS. 2 and 3 illustrate a floating frame 184 that includes first and second elongate parallel beams 186, 188. First ends of the parallel beams 186, 188 are pivotally secured to the connecting members 168, 170 of the loading frame 160. Thus the floating frame 184 can move downwardly at second ends thereof essentially independent of the position of the loading frame 160.

Figure 4:
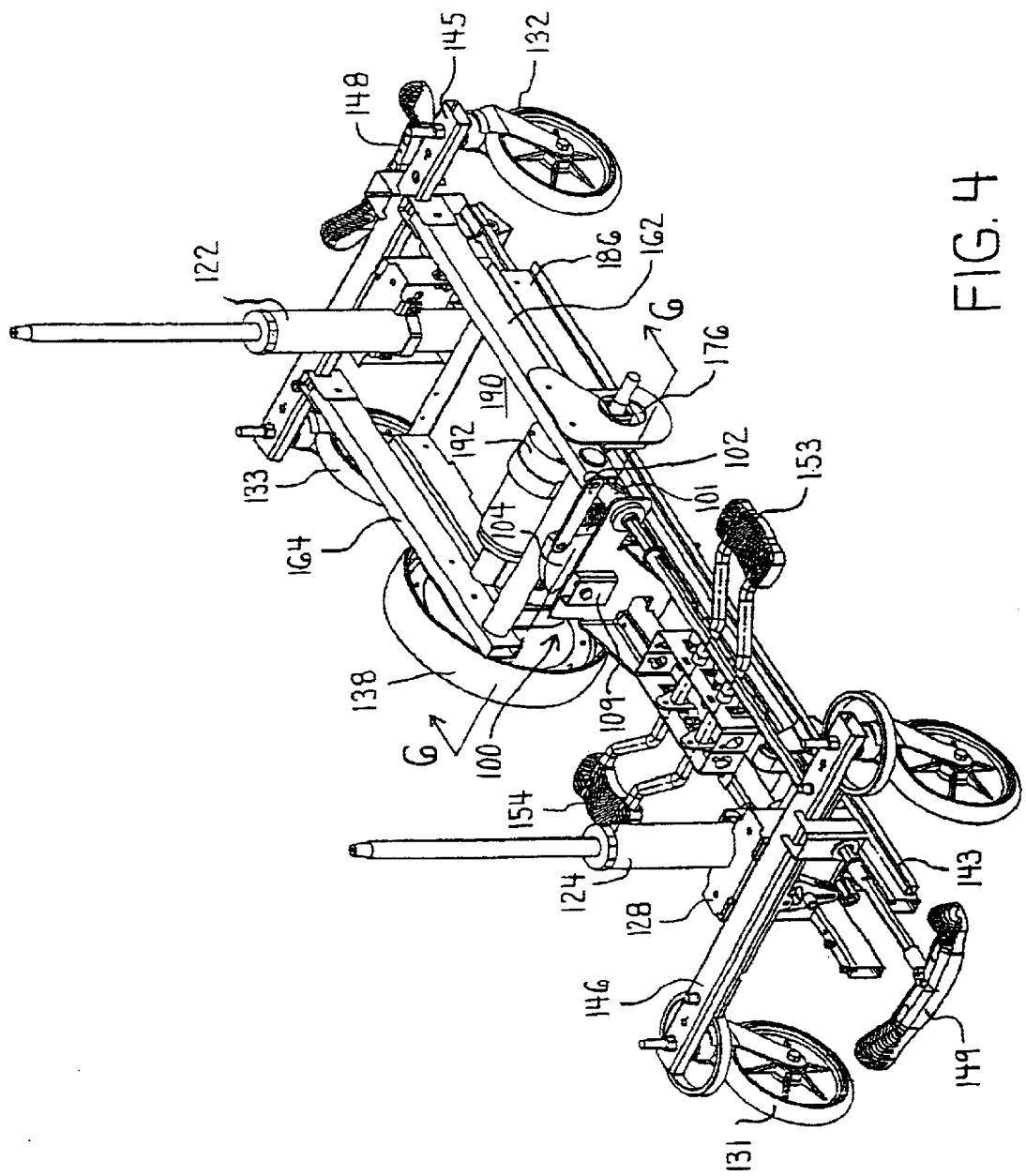
FIG. 4 is an isometric view of the wheeled carriage with the patient support and the auxiliary wheel removed to illustrate the auxiliary wheel support structure with the auxiliary wheels in a deployed position.

The floating frame 184 includes a flat plate element 190, as shown in FIG. 4. The plate element 190 extends substantially the entire length of the beams 186, 188. The plate element 190 is fixedly secured to the first and second beams 186, 188 to form a tray having a flat top surface. The plate element 190 pivots with the parallel beams 186, 188 of the floating frame 190.

The flat top surface of the plate element 190, at a position spaced away from the first ends of the beams 186, 188 supports a DC auxiliary wheel drive motor 192, a drive coupling 193, a drive axle 194, and the auxiliary drive wheels 136, 138. The coupling 193 connects the DC drive motor 192 to the auxiliary wheel drive axle 194. As shown in FIG. 3, the drive axle 194 is perpendicular to the longitudinal axis A.

As shown in FIG. 2, the plate element 190 also supports first and second storage batteries 196, 197, which store power for the wheeled carriage 116. The plate element 190 further supports an electronic control unit 198 for controlling the drive motor 192 in response to selected vehicle functions.

Interaction Between Drive Axle and Floating Frame

The drive axle 194 of the floating frame 184 coacts with the loading frame 160 as follows. The drive axle 194 projects through the vertical slots 176, 178 of the slotted elements 172, 174. Further, the drive axle 194 projects through circular apertures in the second ends of the beams 186, 188 of the floating frame 184. These apertures are sized to ensure that the drive axle 194 tracks movement of the floating frame 184 and to provide additional support to the drive axle. The drive axle 194 fixedly supports the auxiliary wheels 136, 138 at opposing ends thereof. The auxiliary wheels 136, 138 are spaced outwardly from the respective slotted elements 172, 174.

The drive axle 194 can contact the top or bottom edges of the respective slots 176, 178 of the slotted elements 172, 174. In this way, the range of the distance between top and bottom edges of the slots 176, 178 limit the distance of pivotal movement or changes in position of the auxiliary wheels 136, 138, and thus the position of the floating frame 184, relative to the loading frame 160.

Cam Apparatus

Figure 5:
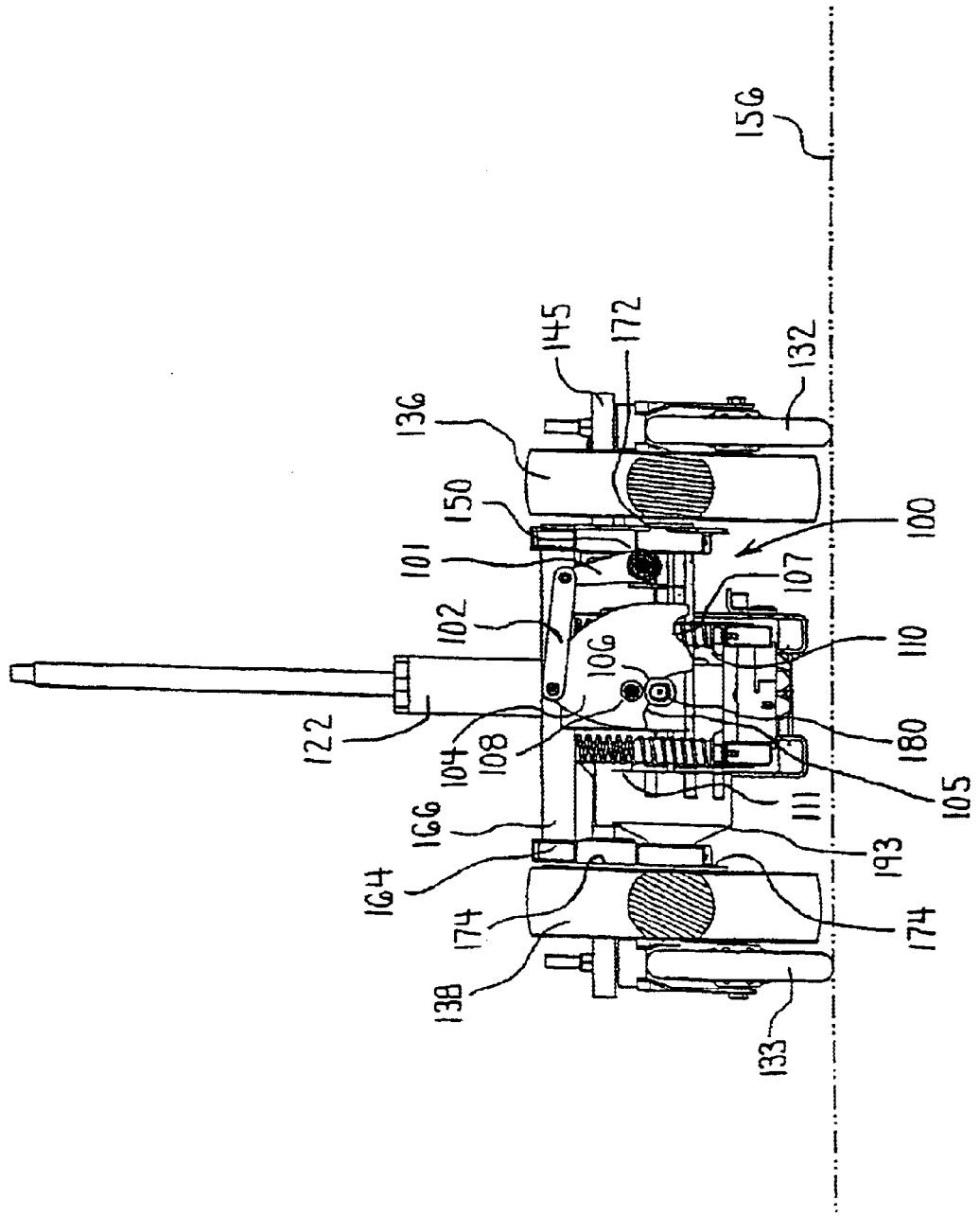
FIG. 5 is a cross-sectional view of the wheeled carriage taken at line 5—5 in FIG. 3 showing a cam apparatus supporting a cam follower at a cam surface location so that the auxiliary wheels are in a stored position.

A cam apparatus 100 is positioned on the wheeled base 118, as shown in FIGS. 3–5. The cam apparatus 100 includes an elongate crank arm 101 fixedly secured at one end to a rotatable shaft 150. The crank arm 101 is pivotally connected at the other end to a first end of an elongate cam linkage member 102. The cam linkage member 102 is pivotally connected at a second end to a top portion of a cam 104. Thus the cam linkage member 102 provides a link between the crank arm 101 and the cam 104.

As shown in FIG. 5, the cam 104 includes a retracting depression 106 for receiving the cam follower 180 and a separate deployment depression 107 for receiving the cam follower. The cam 104 also includes a cam brake retracting depression 105. The cam 104 is rotatable about a cam axle 108. A cam support plate 109, fixed to the wheeled base 118, rotatably supports the cam axle 108, and thereby the cam 104.

The cam apparatus 100 includes first and second springs 110, 111 positioned on the wheeled base 118. The springs 110, 111 are adjacent the cam 104 and oriented upwardly. The springs 110, 111, are in alignment with and contact the cross bar 166 of the loading frame 160. The springs 110, 111 provide an upward biasing force for maintaining the cross bar 166 of the loading frame 160 away from the floating frame 184 and the wheeled base 118.

Foot Pedals

As shown in FIG. 2, a control apparatus 147 includes manually manipulatable members such as foot pedals 148, 149 secured at opposing ends of the rotatable shaft 150, which is rotatably mounted to the wheeled base 118. FIG. 2 further shows the rotatable shaft 150 extending beyond the length of the wheeled base 118. The pedals 148, 149 can set a brake or adjust the position of the auxiliary wheels 136, 138.

Side pedals 151–154 also can set a brake, adjust the position of the auxiliary wheels 136, 138, or control the height of the patient support 120 by controlling the hydraulic jacks 122, 124. The side pedal arrangement is not considered an inventive feature for purposes of this patent application. The side pedal arrangement has some similarities to the arrangement set forth in U.S. Pat. No. 6,240,579, issued Jun. 5, 2001 and titled "Unitary Pedal Control of Brake and Fifth Wheel Deployment Via Side and End Articulation with Additional Unitary Pedal Control of Height of Patient Support", which is hereby incorporated by reference in its entirety.

Operation of the Auxiliary Wheels—Retracted State

FIGS. 3 and 5 show the auxiliary wheels 136, 138 of the wheeled carriage 116 in a retracted or stored position. To place the auxiliary wheels 136, 138 into the retracted state, an operator pushes one of the foot pedals 148, 149 to rotate the shaft 150. The shaft 150 moves the crank arm and rotates the cam 104 via linkage member 102. The cam 104 is rotated in a counterclockwise direction relative to the direction of view in FIGS. 5 and 6. The cam 104 then reaches the position shown in FIG. 5, and the cam follower 180 is positioned in retracting depression 106. This is so because the cam 104 does not force the cam follower 180 downwardly as much as shown in the deployed position of FIG. 6.

With the cam follower 180 in the raised position shown in FIG. 5, the springs 110, 111 apply an upward force to the cross bar 166 of the loading frame 160. The force raises one end of the loading frame 160. FIG. 3 illustrates the springs 110, 111 lifting the loading frame 160, which includes the slotted elements 172, 174.

The slotted elements 172, 174 are raised so that the auxiliary wheel drive axle 194 therein contacts a lower end of each of the vertical slots 176, 178. Thus, the loading frame 160 at lower ends of the slots 176, 178, utilizes the springs 110, 111 to raise or lift the drive axle 194. This occurs by pivoting or lifting the inward end of the floating frame 184 relative to the opposite outward end of the floating frame which is pivotally secured to the wheeled base 118. Therefore, the auxiliary wheels 136, 138 mounted to the drive axle 194 are raised to the upwardly retracted or stored position shown in FIG. 3.

Figure 7:
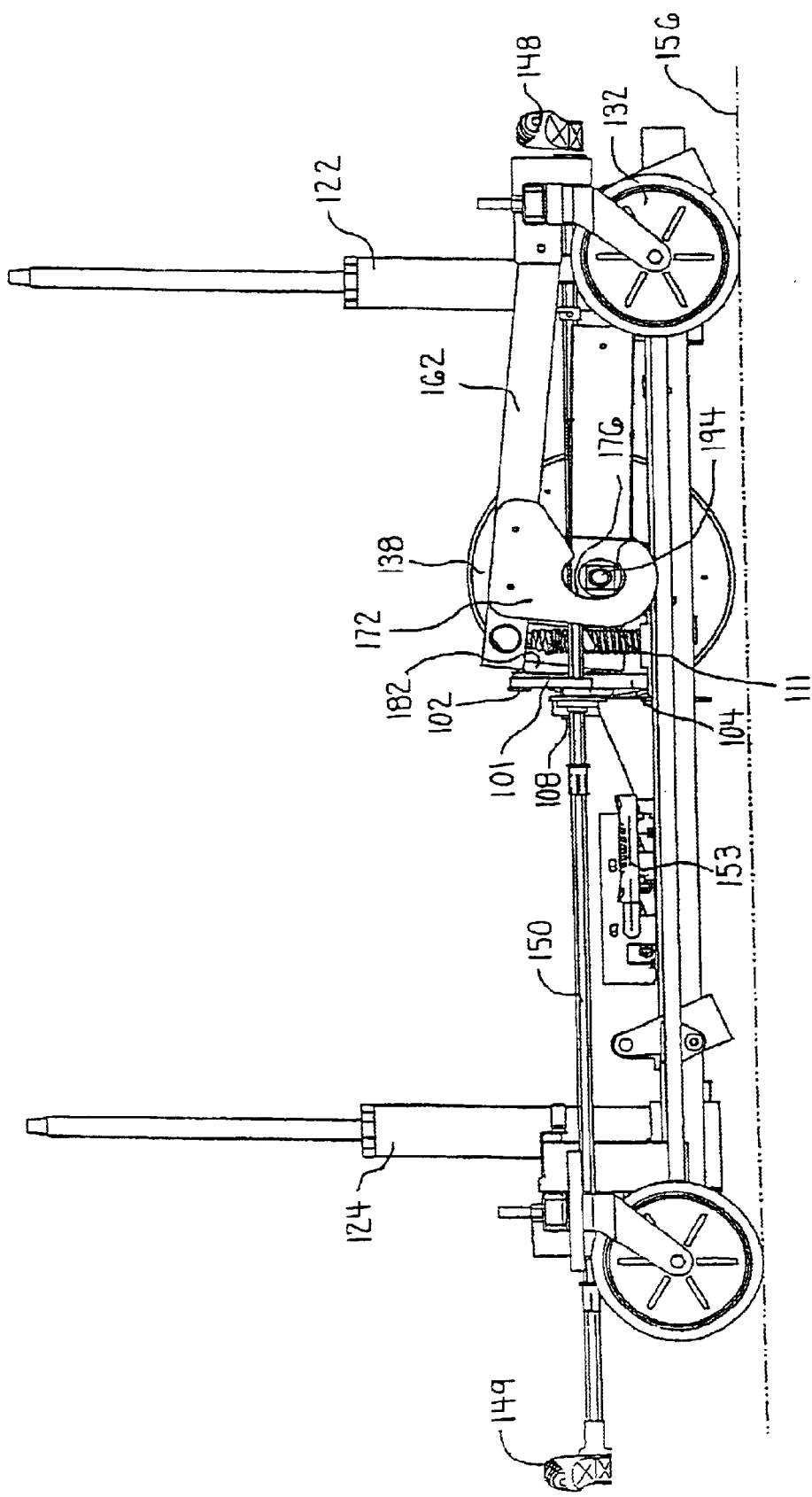
FIG. 7 is a side view of the first embodiment of the wheeled carriage with an auxiliary wheel removed to illustrate the relationship between the auxiliary wheels and the floor surface in a stored position.

The springs 110, 111 then maintain the loading frame 160 in the stored or retracted position. In the retracted position, the loading frame 160 pivots upwardly a distance limited by the cam roller 180 contacting a surface of the cam 104 at a retracting depression 106. With the loading frame 160 in the raised position, the auxiliary wheels 136, 138 are positioned above the floor surface 156 as shown in FIG. 7.

Operation of the Auxiliary Wheels—Deployed State

Figure 6:
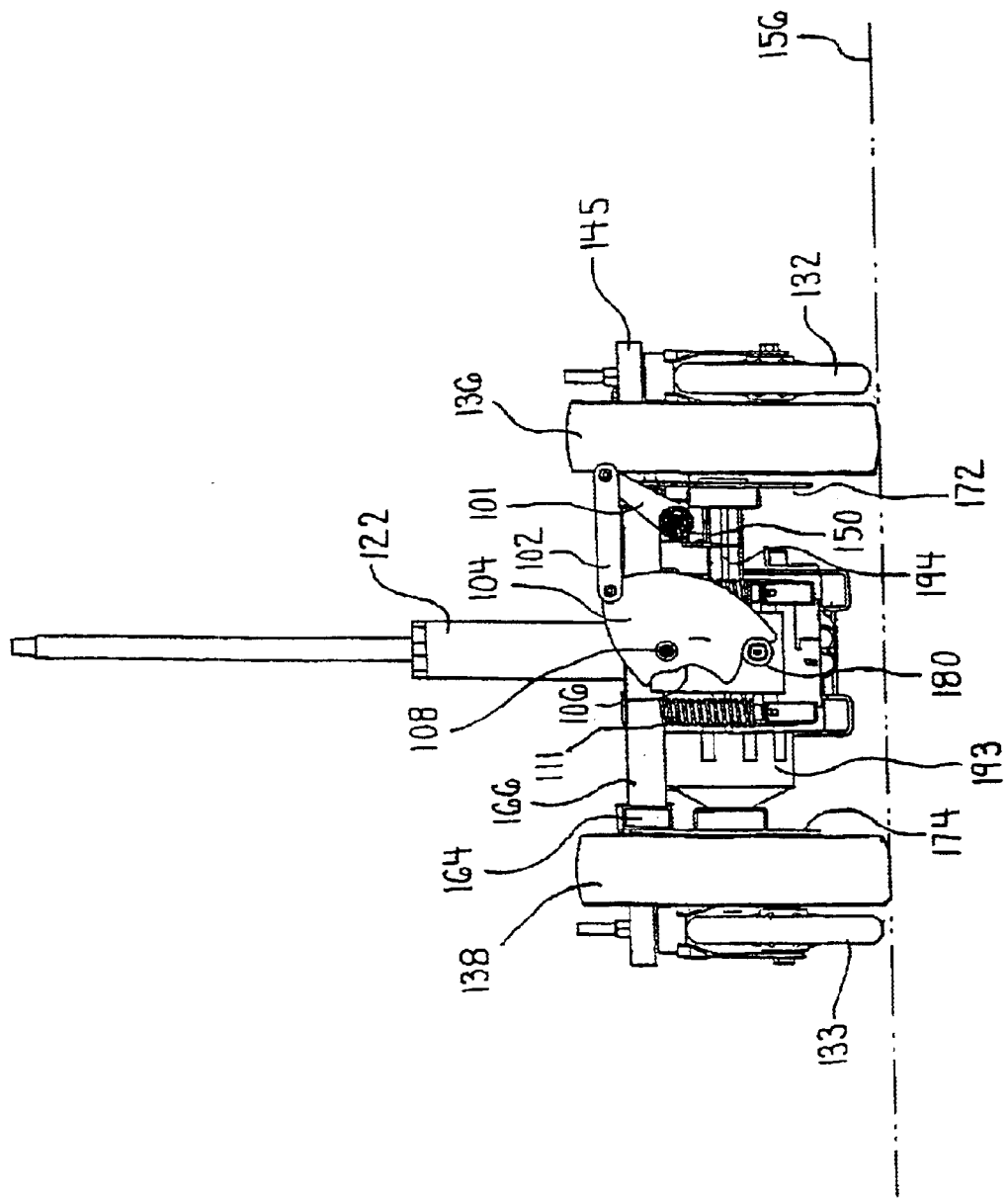
FIG. 6 is a cross-sectional view of the wheeled carriage taken at line 6—6 in FIG. 4 showing the cam apparatus supporting the cam follower so that the auxiliary wheels are in a deployed position.

To effect a lowering of the position of the loading frame 160, and thus the auxiliary wheels 136, 138, from the retracted position requires the following. The user pushes a foot pedal 148, 149 to rotate the shaft 150 in a clockwise direction relative to the direction of view in FIGS. 5 and 6, thus moving the crank arm 101. Movement of the crank arm 101 rotates the cam 104 in a clockwise direction about the cam axle 108. The cam follower 180 acts as a roller and moves along a cam surface until the follower is received and maintained at a deploying depression 107 of the cam 104, as shown in FIG. 6. The downward movement of the cam follower 180 into the deploying depression 107 lowers the relative position of the cam follower 180. The cam follower 180 is secured to the inner end of the loading frame 160 by cam roller support plate 182. Thus, downward movement of the cam follower 180 forces downwardly the inner position of the loading frame 160 including the cross bar 166.

Figure 8:
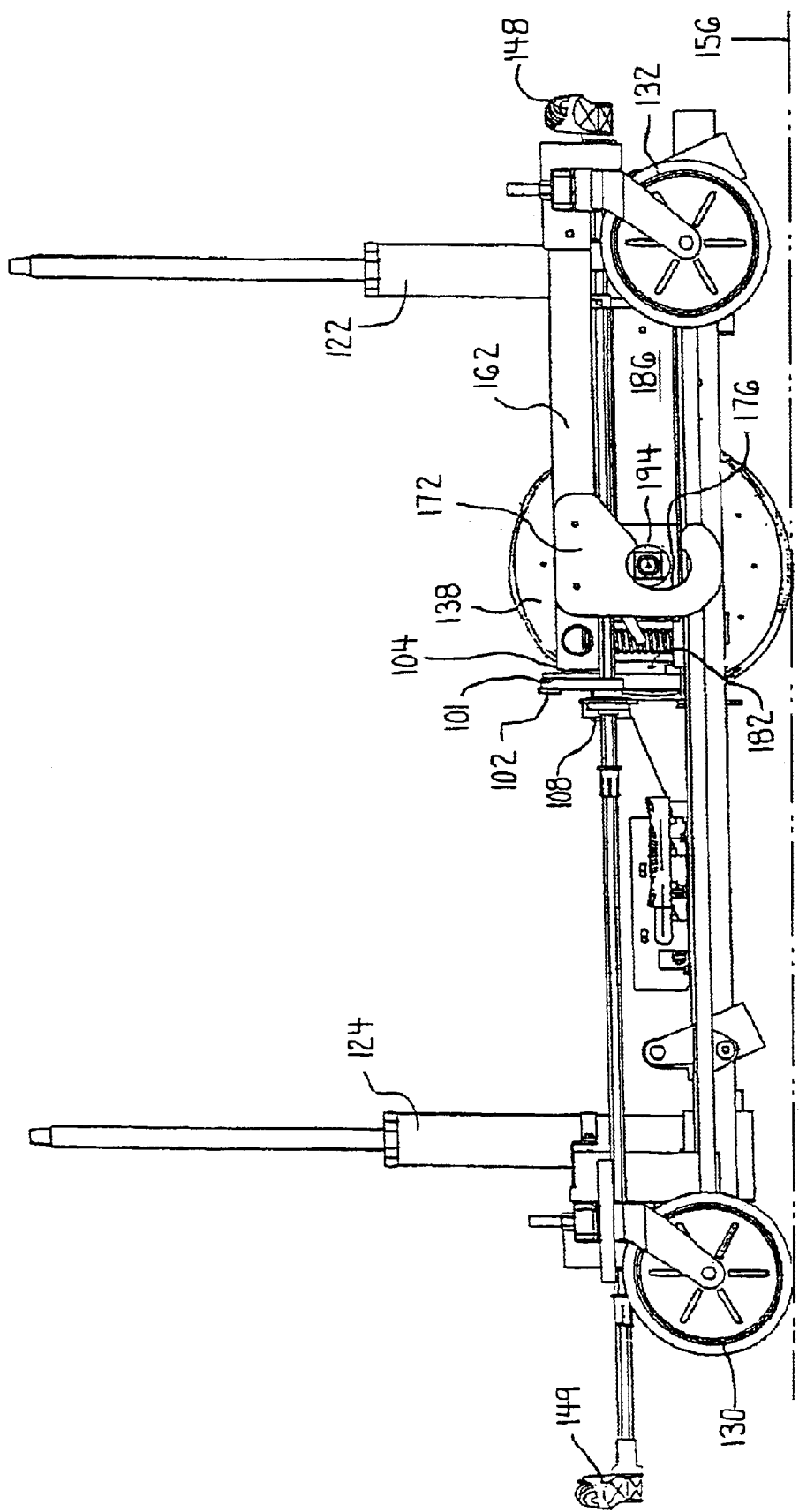
FIG. 8 is a side view of the first embodiment of the wheeled carriage with an auxiliary wheel removed to illustrate the relationship between the auxiliary wheels and the floor surface in a deployed position.

When the rotatable shaft 150 rotates the cam 104 so that the cam follower 180 enters the deploying depression 107 and lowers the loading frame 160, the auxiliary wheel support structure 158 operates as follows. During the downward movement of the loading frame 160, the slotted elements 172, 174 also move downwardly. During downward movement, top edges of the vertical slots 176, 178, which receive the auxiliary wheel drive axle 194, eventually contact the drive axle. As the loading frame 160 continues to move downwardly, the loading frame 160 at top edges of the vertical slots 176, 178 applies force to the auxiliary wheel axle 194 such that the entire floating frame 184 is forced downwardly beyond a position where the four castered wheels 130–133 and the auxiliary wheels 136, 138 all contact the floor. Two of the wheels 132, 133 lift off from the floor surface 156. Thus, as shown in FIG. 8, in the engaged or deployed position, only castered wheels 130, 131 and auxiliary wheels 136, 138 engage the floor surface 156.

In the engaged position, the drive motor 192 can drive the drive axle 194 to rotate the auxiliary wheels 136, 138 and power the wheeled carriage 116 in a selected direction.

Extended Travel By Auxiliary Wheels

Figure 9:
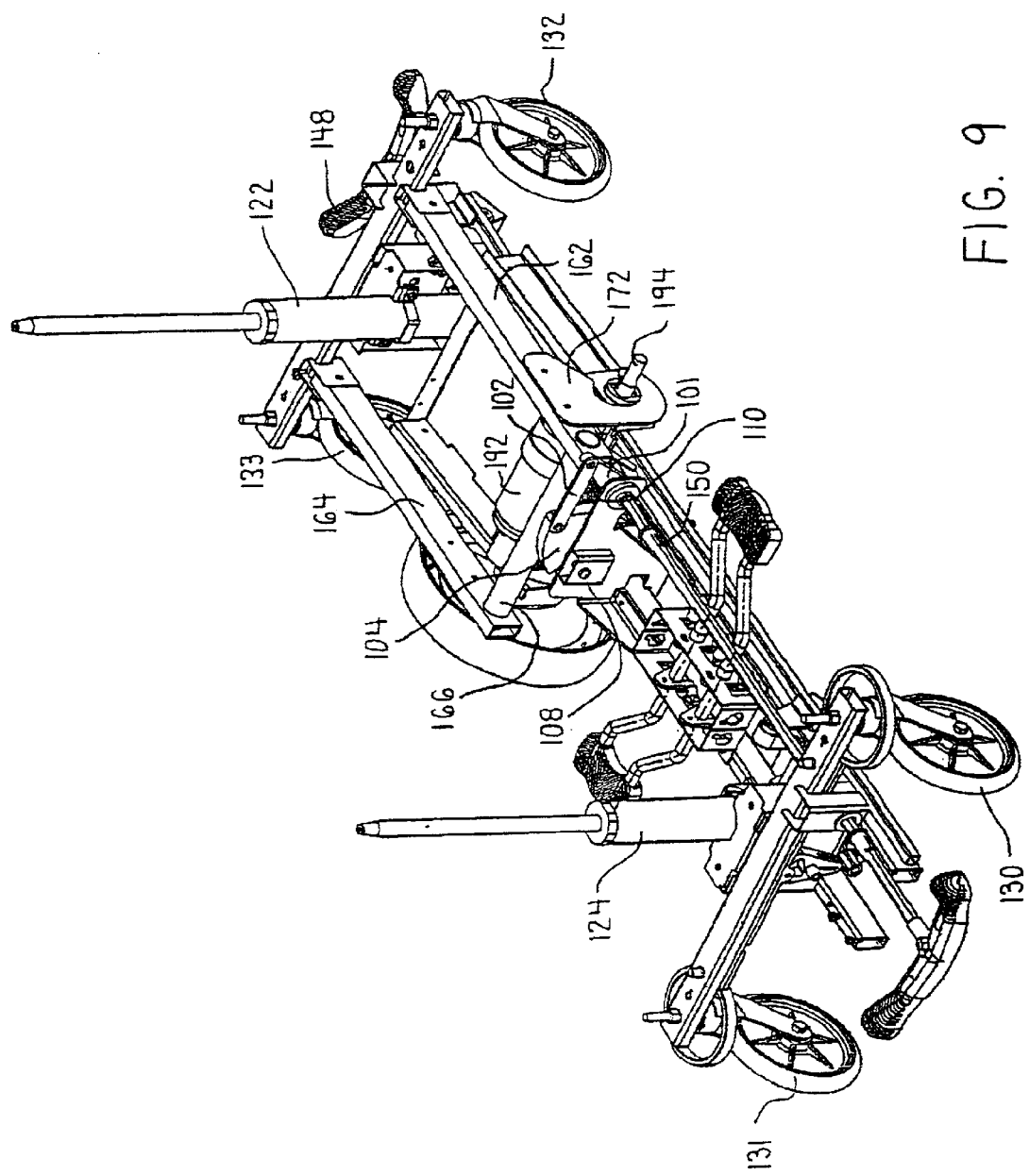
FIG. 9 is an isometric view of the first embodiment of the wheeled carriage with elements removed to illustrate the auxiliary wheel support structure with the auxiliary wheels in an extended travel position.
Figure 10:
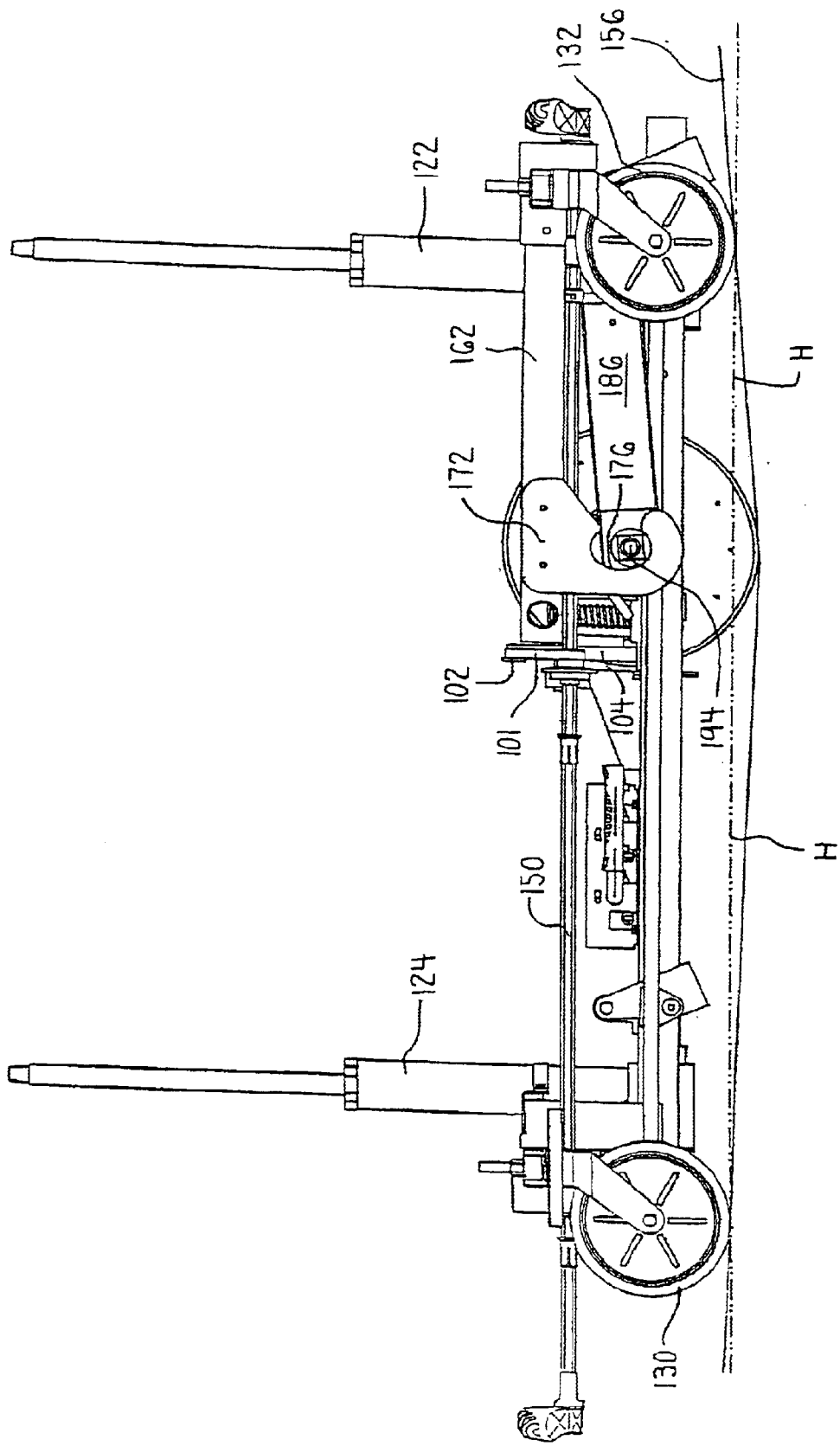
FIG. 10 is a side view of the first embodiment of the wheeled carriage with the patient support and an auxiliary wheel removed to illustrate the auxiliary wheels in an extended travel position on an uneven floor surface.

There are instances in which the floor surface 156 traveled by the wheeled carriage 116 is not level. For example, when the wheeled carriage 116 is moving from a level floor surface onto an inclined ramp. In such an instance, even though the auxiliary wheels 136, 138 are deployed and in contact with the floor surface 156, and the castered wheels 132, 133 are elevated, the auxiliary wheels can temporarily be located in a valley. FIGS. 9 and 10 show the wheeled carriage 116 on an uneven floor surface 156 with the auxiliary wheels 136, 138 positioned in a lowered portion of the floor surface a large distance below an imaginary horizontal plane H.

The floating frame 184 avoids the situation where the auxiliary wheels 136, 138 do not contact the floor surface due to the floor surface being uneven. The floating frame 184 enables contact of the auxiliary wheels 136, 138 with the floor surface 156 even in circumstances where the floor surface at the auxiliary wheels is lowered a significant distance relative to the floor surface at the castered wheels 130–133.

As shown in FIG. 8 and discussed above, the upper edges of the slotted elements 172, 174 force the auxiliary wheel axle 194 and the auxiliary wheels 136, 138 downwardly and against a level floor surface and raise the castered wheels 132, 133. When the floor surface at the auxiliary wheels 136, 138 is lowered any distance beyond a level surface, the weight of the floating frame 184 including batteries 196, 197, the wheel drive motor 192 and other elements on the plate element 190, provide a downward force. The weight of the floating frame 184 and elements thereon including the auxiliary wheel axle 194 acts to move the floating frame 184 downwardly and maintain the position of the auxiliary wheels 136, 138 on the floor surface 156. The vertical slots 176, 178 of the loading frame 160 permit the auxiliary wheel axle 194 to move downwardly therein. The auxiliary wheels 136, 138 can continue to move downwardly until the auxiliary wheel axle 194 contacts the lower edges of the vertical slots 176, 178 as illustrated in FIGS. 9 and 10. A comparison between the engaged auxiliary wheel position on a flat surface 156, shown in FIGS. 4 and 8, and the overtravel auxiliary wheel position shown in FIGS. 9 and 10, illustrates the change in position of the loading frame 160 and the auxiliary wheel axle 194 mounted thereto, relative to the wheeled base 118 and the loading frame 160. In FIG. 10, the auxiliary wheels 136, 138 maintain contact with the uneven floor surface 156 even at a lowered surface area significantly below an imaginary horizontal line H.

Thus, the auxiliary wheel axle 194 can move the entire length of the vertical slots 176, 178 to maintain contact between the auxiliary wheels 136, 138 and the floor surface 156.

However, in the overtravel position shown in FIG. 10, the castered wheels 132, 133 also contact the floor surface 156. Thus in the overtravel position of FIGS. 9 and 10, rather than having only the auxiliary wheels 136, 138 and the castered wheels 130, 131 in contact with the floor surface 156, the castered wheels 132, 133 also may contact the floor surface. More importantly, the auxiliary wheels 136, 138 maintain contact with the floor surface 156, even if there is an uneven floor surface.

The importance of the auxiliary wheels 136, 138 maintaining contact with the floor surface 156 is as follows. When the auxiliary wheel drive motor 192 drives the auxiliary wheels 136, 138, sudden loss of contact with the floor can cause a great increase in velocity for the auxiliary wheels 132, 133, which can damage the motor or the coupling 193. Further, recontact of the driven auxiliary wheels 136, 138 with the floor surface 156 can cause stalling of the drive motor 192, or a sudden increase in velocity of the wheeled carriage 116.

In conclusion, the first embodiment of the invention enables driven auxiliary wheels 136, 138 to maintain traction with an uneven floor surface. This enables the driven auxiliary wheels to continuously drive the wheeled carriage 116.

Second Embodiment

FIGS. 11–20 illustrate a second embodiment of the invention. Where possible, elements in FIGS. 11–20 that are the same as in the first embodiment have the same reference numeral except the prefix "1" is changed to the prefix "2". For example, the wheeled base 118 in FIGS. 1–10 is represented as element 218 in FIGS. 11–20.

As in the first embodiment, the auxiliary wheels 236, 238 are once again spaced a distance from an imaginary transverse centerline located at a midpoint of the length of the wheeled carriage 216 toward a foot end of the wheeled base 218 sufficient to ensure that the wheeled carriage 216 will not teeter even if the center of gravity shifts a distance due to the weight and position of a patient on the patient support. Force equations that determine the specific selected position of the auxiliary wheels preferably are as set forth in U.S. Pat. No. 6,256,812, incorporated by reference above.

Figure 11:
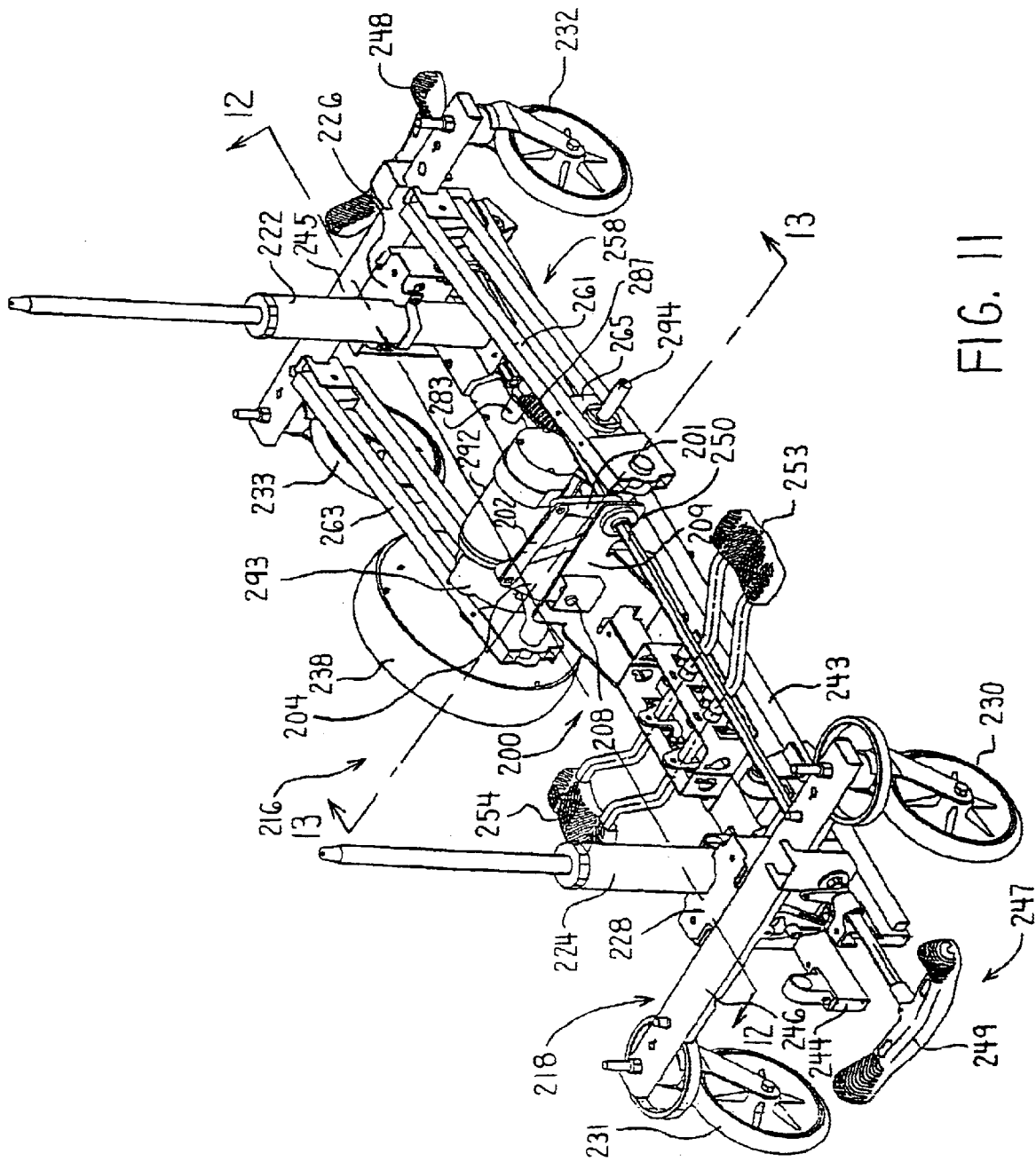
FIG. 11 is an isometric view of a second embodiment of the wheeled carriage having a patient support and an auxiliary wheel removed to illustrate the auxiliary wheel support structure with the auxiliary wheels in a stored position.

As in the first embodiment and as shown in FIG. 11, the wheeled base 218 includes a first elongate base frame member 243 and a second spaced elongate base frame member 244 extending along the length of the wheeled carriage 216. The wheeled base 218 includes a pair of elongate base support beams 245, 246 mounted to the castered wheels 230–233 at opposing corners of the wheeled carriage 216. The wheeled base 218 includes brackets 226, 228 that support jacks 222, 224. The jacks 222, 224 provide height adjustable support for the patient support.

As in the first embodiment, and as shown in FIG. 11, a control apparatus 247 includes manually manipulatable members, such as foot pedals 248, 249 secured at opposing ends of a rotatable shaft 250 mounted to the wheeled base 218. FIG. 11 further shows the rotatable shaft 250 extending beyond the length of the wheeled base 218. The pedals 248, 249 can set a brake or adjust the position of the auxiliary wheels 236, 238 shown in FIG. 13.

As in the first embodiment, side pedals 253, 254 can set a brake, adjust the position of the auxiliary wheels 236, 238, or control the height of the patient support by controlling the hydraulic jacks 222, 224. This pedal arrangement is not considered an inventive feature for purposes of this patent application.

As in the first embodiment, storage batteries (not shown) store power for use by the drive motor 292 and other devices of the wheeled carriage 216. An electronic control unit (not shown) controls the motor 292 for driving of the auxiliary wheels 236, 238 in response input signals from the operator.

Auxiliary Wheel Support Structure

An auxiliary wheel support structure 258 is provided on the wheeled base 218 toward a foot end of the wheeled carriage 216. The auxiliary wheel support structure 258 includes elongate first and second frame members 261, 263. As shown in FIG. 11, one end of each of the elongate frame members 261, 263 is pivotally secured at the foot end of the wheeled base 218. An elongate cross support 265 is secured to second opposing ends of the frame members 261, 263. The cross support 265 is perpendicular to the frame members 261, 263, which are parallel to each other. The cross support 265 and the frame members 261, 263 are symmetric with respect to a central longitudinal axis of the wheeled carriage 216. Thus, in this particular embodiment, the auxiliary wheel support structure 258 is oriented so that its plane of rotation is fixed and perpendicular to a plane defined by a flat top surface of the wheeled base 218.

Figure 12:
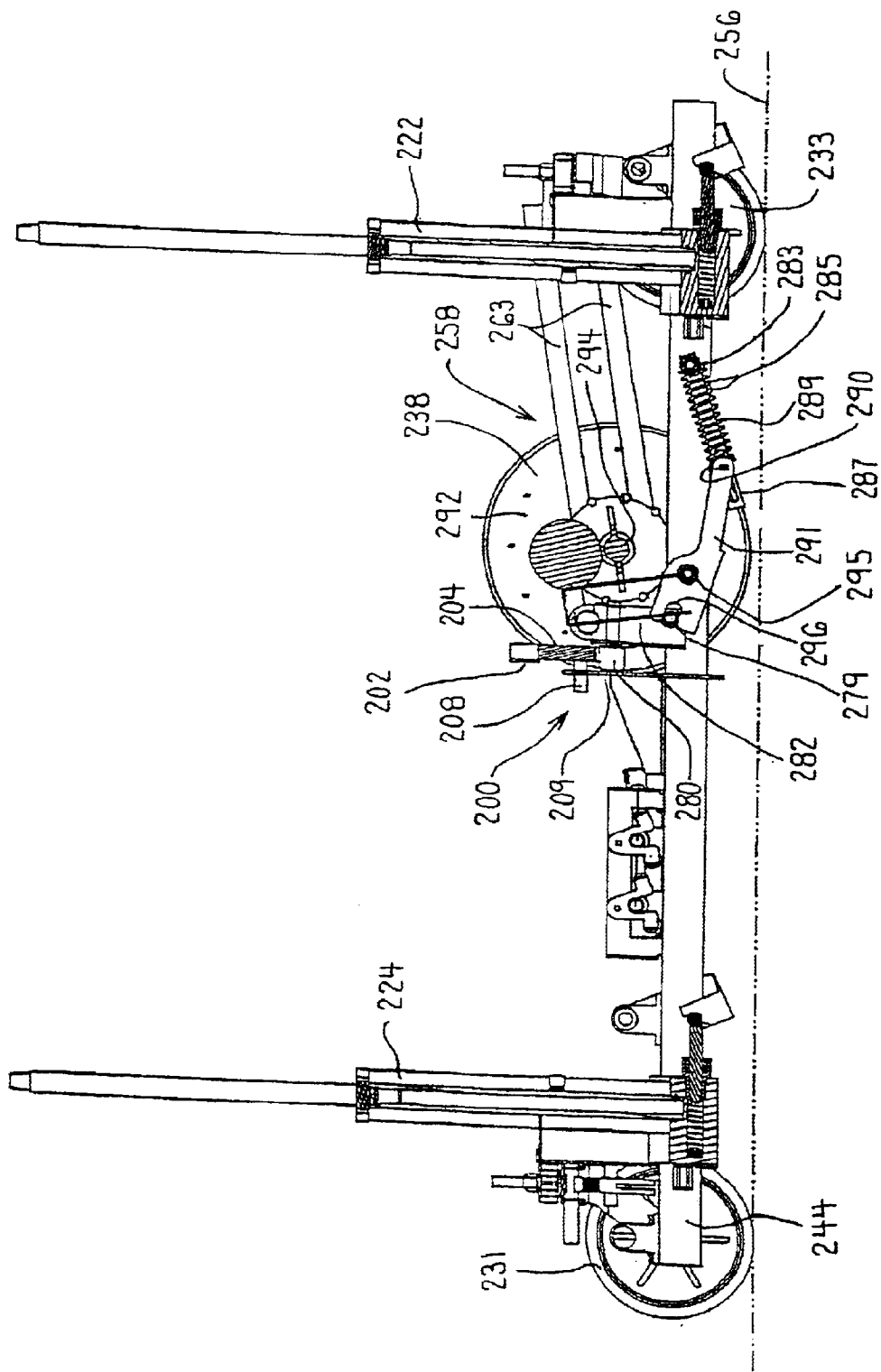
FIG. 12 is a side view of the second embodiment of the wheeled carriage having an auxiliary wheel removed to illustrate the relationship between the auxiliary wheel support structure and the floor surface in the stored position.

A cam follower support member 282 is secured to the cross support 265. As shown in FIG. 12, the cam follower support member 282 supports a cam follower 280 projecting outwardly from the support member. The cam follower 280 includes a roller to interact with a cam apparatus 200 to be described later. Rotation of the cam follower 280 defines a first plane. The cam follower support member 282 also supports a rolling element 279 spaced away from the cam follower 280. Rotation of the rolling element 279 defines a second plane. The first plane of rotation of the cam follower 280 is substantially transverse to the second plane of rotation of the rolling element 279.

The cross support 265 also supports a DC auxiliary wheel drive motor 292. A coupling 293 couples the drive motor 292 to an auxiliary wheel drive axle 294. As shown in FIG. 12, the drive axle 294 is perpendicular to the longitudinal axis of the wheeled base 218. Thus, the cross support 265 also supports the drive coupling 293, drive axle 294 and auxiliary drive wheels 236, 238.

The auxiliary wheel drive axle 294 supports the auxiliary wheels 236, 238 at opposing ends thereof. The auxiliary wheels 236, 238 are spaced outwardly from the frame members 261, 263.

FIG. 12 also shows a push rod support post 283 secured to the wheeled base 218 and pivotally supporting a first end of an elongate push rod 285. The push rod support post 283 extends in a direction transverse to the longitudinal direction of the wheeled base 218. The push rod 285 is mounted transverse to the rod support post 283. The push rod 285 includes a closed rod slot 287 at the second opposing end. The rod slot 287 extends along a portion of the length of the rod 285. The rod slot 287 opens transverse to the longitudinal axis of the wheeled base 218.

A rod coil spring 289 surrounds the length of the push rod 285. The coils of the spring 289 apply a force in a direction corresponding to the length of the elongate rod 285.

A cross pin 290 is slidably received in the rod slot 287. Thus, the cross pin 290 is positioned in a direction transverse to the longitudinal axis of the wheeled base 218. The cross pin 290 is fixedly secured to a first end of an elongate lift linkage element 291.

The first end of the linkage element 291 includes an open-end vertical slot forming a two tined fork shape for receiving therein the slotted end of the rod 285. The cross pin 290 is fixedly positioned across the opening at the first end of the linkage element 291. The second end of the linkage element 291 includes an open slot 296. The slot 296 opens outwardly at the second end of the linkage element 291 and extends inwardly along the length of the linkage element.

The linkage element 291 is pivotally secured to the wheeled base 218 by a pivot pin 295. The length of the pivot pin 295 extends in a direction transverse to the longitudinal axis of the wheeled base 218. The pivot pin 295 is mounted at a central location of the linkage element 291, but closer to the second end of the linkage element than the first end.

The open slot 296 of the linkage element 291 receives the rolling element 279 mounted to the cam follower support member 282.

Cam Apparatus

A cam apparatus 200, almost identical to the cam apparatus of the first embodiment, is positioned on the wheeled base 218, as shown in FIGS. 11–14. The cam apparatus 200 includes an elongate crank arm 201 fixedly secured at one end to the rotatable shaft 250. The other end of the crank arm 201 pivotally connects to a first end of an elongate cam linkage member 202. A second end of the cam linkage member 202 pivotally connects to a top portion of a cam 204. Thus the cam linkage member 202 provides a link between the crank arm 201 and the cam 204.

Figure 13:
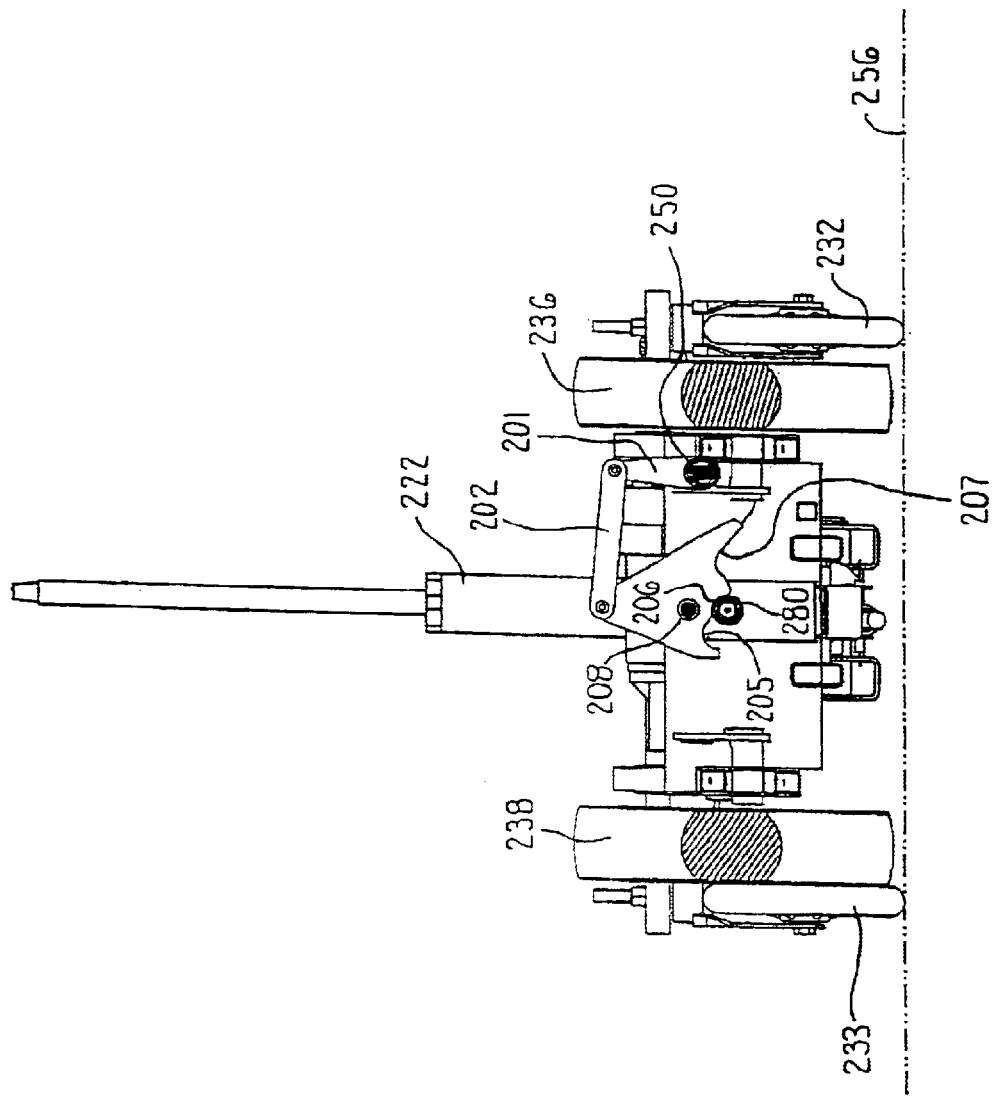
FIG. 13 is a cross-sectional view taken at 13—13 of FIG. 11 showing a cam apparatus supporting a cam follower at a cam surface location so that the auxiliary wheels are in a stored position.
Figure 14:
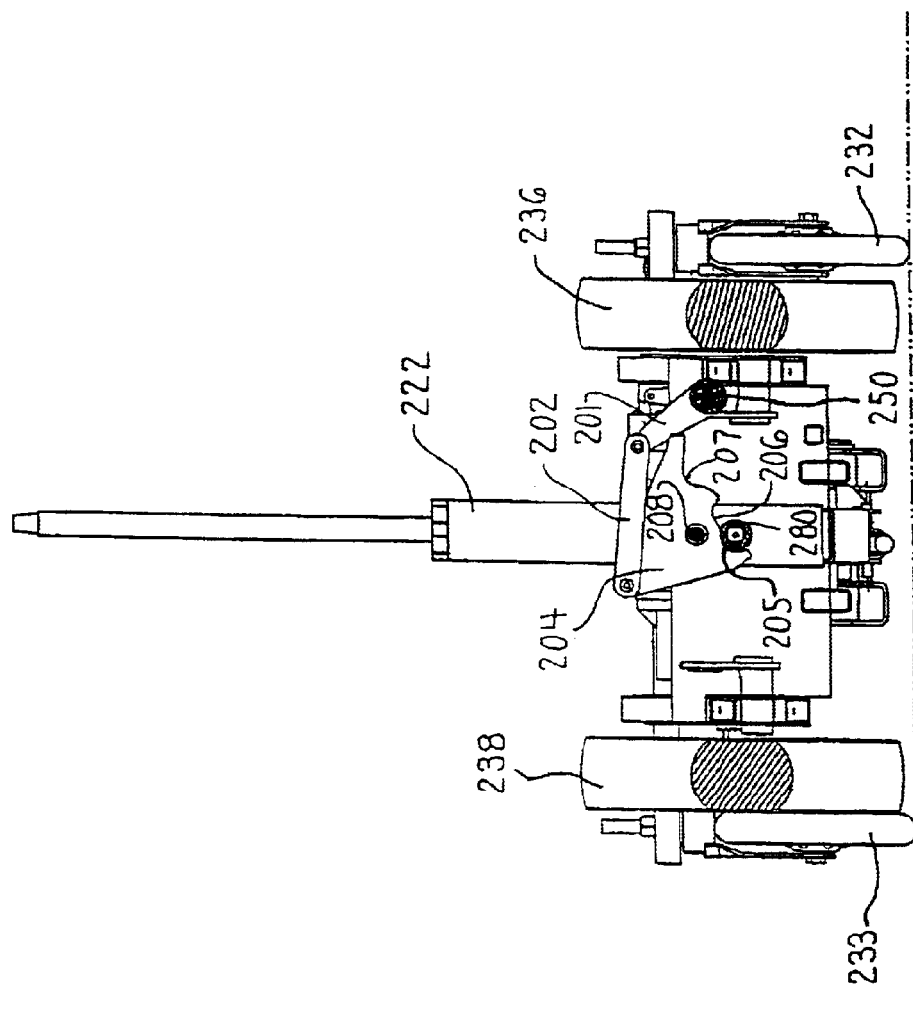
FIG. 14 is a cross-sectional view taken at 13—13 of FIG. 11 showing a cam apparatus supporting a cam follower so that the auxiliary wheels are in a stored position and the cam apparatus is in a cam brake position.

As shown in FIGS. 13 and 14, the cam 204 includes a retracting depression 206 and a separate deployment depression 207 for receiving the cam follower 280. The cam 204 also includes a cam brake retracting depression 205. The cam 204 is rotatable about a cam axle 208. A cam support plate 209, fixed to the wheeled base 218, rotatably supports the cam axle 208, and thereby the cam 204.

Operation of the Cam Apparatus

As in the first embodiment, the operator uses one of the foot pedals 248, 249 to rotate the shaft 250 and thus the crank arm 201. The crank arm rotates the cam 204 via the linkage member 202. Rotation of the cam 204 acts upon the cam follower 280 so that the cam follower is positioned in a selected one of the depressions 205–207, which correspond to the depressions discussed in the first embodiment. The brake position depression 205 corresponds to a pedal location where the auxiliary wheels 236, 238 are retracted, and separate elements (not shown) actuate brakes preventing movement of the vehicle. When the cam follower 280 is received in depression 206, the auxiliary wheels 236, 238 are positioned in a retracted position. When the cam follower is in depression 207, the auxiliary wheels 236, 238 are deployed in contact with the floor surface. Thus, the cam apparatus 200 operates upon the cam follower 280 as discussed in the first embodiment. In conclusion, a single foot pedal 248, 249 can select three different states of the wheeled carriage 216 by deploying or retracting the auxiliary wheels 236, 238 and also by applying brakes to maintain the wheeled carriage 116 at a fixed location.

Operation of the Auxiliary Wheels—Retracted State

FIGS. 11 and 12 show the auxiliary wheels 236, 238 of the wheeled carriage 216 in a retracted or stored position. The retracted position is obtained as follows. The cam apparatus 200 operates as described in the first embodiment to lift the cam follower 280 to the raised position shown in FIGS. 12 and 13.

As a starting point, it is assumed the longitudinal axes of the push rod 285 and the linkage element 291 are aligned which each other (not shown) in a substantially horizontal position. When the longitudinal axes of the push rod 285 and the linkage element 291 are aligned, the cross pin 290 is at the innermost position within the closed rod slot 287. The rod spring 289 applies a linear force upon the linkage element 291 along the longitudinal axis of the push rod 285. The linear force does not force the linkage element or the push rod in an upward or downward direction. At this position for the push rod 285 and linkage element 291, the cam follower 280 is moving along a cam surface of the cam 204 between the cam depression 206 and the cam depression 207.

To place the auxiliary wheels in a retracted state, the cam apparatus is operated as in the first embodiment. The cam apparatus 200 moves the cam follower 280 toward the raised position (auxiliary wheels 236 238 retracted). The cam follower support member 282 also moves upwardly along with the frame members 261, 263 and the cross support 265. The frame members 261, 263 pivot about first ends secured to the wheeled base 218.

Simultaneously, the rolling element 279 fixedly secured to the cam follower support member 282 moves upwardly in open slot 296 of the linkage element 291. As the rolling element 279 rolls in the slot 296, the adjacent second end of the linkage element 291 pivots upwardly causing the first end of the linkage element to move downwardly. This pivoting movement enables the cross pin 290 fixedly secured at the first end of the linkage element 291 to slide in an outward direction within the closed rod slot 287 as the second end of the push rod 285 moves downwardly.

As the first end of the linkage element 291 and the second end of the push rod 285 move downwardly, the linear force applied by the rod spring 289 along the longitudinal axis of the push rod 285 now drives the first end of the linkage element 291 downwardly. The force from the rod spring 289, due to the pivot pin 295 acting as a lever, transfers into an upward force for the cam follower support member 282. This is accomplished by the force of the rod spring 289 being transferred to the cam follower support member 282. The upward force on the cam follower support member 282 maintains the cam follower 280 in the retracting depression 206 shown in FIG. 13 or the cam brake retracting depression 205 shown in FIG. 14. Thus, the cross bar 265 and the auxiliary wheels 236, 238 are maintained in the upward retracted position shown in FIGS. 12 and 13.

In conclusion, even though the cam apparatus 200 controls the position of elements 285, 289, 291, the elements provide a return force depending on the position of the push rod 285 and the rod spring 289.

Deployment of the Auxiliary Wheels

Lowering the position of the auxiliary wheel support structure 258, and thus the auxiliary wheels 236, 238 from the retracted position, requires the following. The user utilizes a manipulatable member 248, 249 to rotate the shaft 250 in a clockwise direction relative to the direction of view in FIGS. 13 and 14. The rotatable shaft 250 rotates the cam 204 about the cam axle 208. The cam follower 280 acts as a roller and moves along the cam surface toward the deploying depression 207. The movement of the cam follower 280 toward the deploying depression 207 lowers the relative vertical position of the cam follower 280. As discussed above, the cam follower support member 282 secures the cam follower 280 to the auxiliary wheel support structure 258. Thus, downward movement of the cam follower 280 forces downwardly the relative position of the auxiliary wheel support structure 258.

When the cam apparatus 200 lowers the auxiliary wheel support structure 258, the auxiliary wheel support structure 258 operates as follows. The downward movement of the cam follower support member 282 also moves the rolling element 279 downwardly. The rolling element 279 transfers a downward force to the second end of the lift linkage element 291. The second end of the linkage element 291 pivots about pivot pin 295 and transfers a force lifting the first end upwardly. The first end of the linkage element 291 slides inwardly along the rod slot 287 of the push rod 285 and advances toward the second end of the push rod. The upward movement of the second end of the push rod 285 is opposed by the rod spring 289. Eventually the linkage element 291 and the rod 285 reach the axially aligned position with respect to each other. At this position, the cross pin 290 of the linkage element 291 extends a maximum distance into the rod slot 287.

As the cam apparatus 200 continues moving the first/rod end of the linkage element 291 upwardly beyond the horizontal position, the cross pin 290 now begins to move along the rod slot 287 away from the innermost position therein. The force of the rod spring 289 applies a linear force with respect to the length of the rod 285. A component of the force acting against the linkage element 291 drives the first end of the linkage element and the second end of the push rod 285 upwardly, toward the position shown in FIG. 16. Thus, the direction of force from the rod spring 289 forces pivoting of the linkage element 291 in an opposite direction than when the auxiliary wheels 236, 238 are stored.

Figure 15:
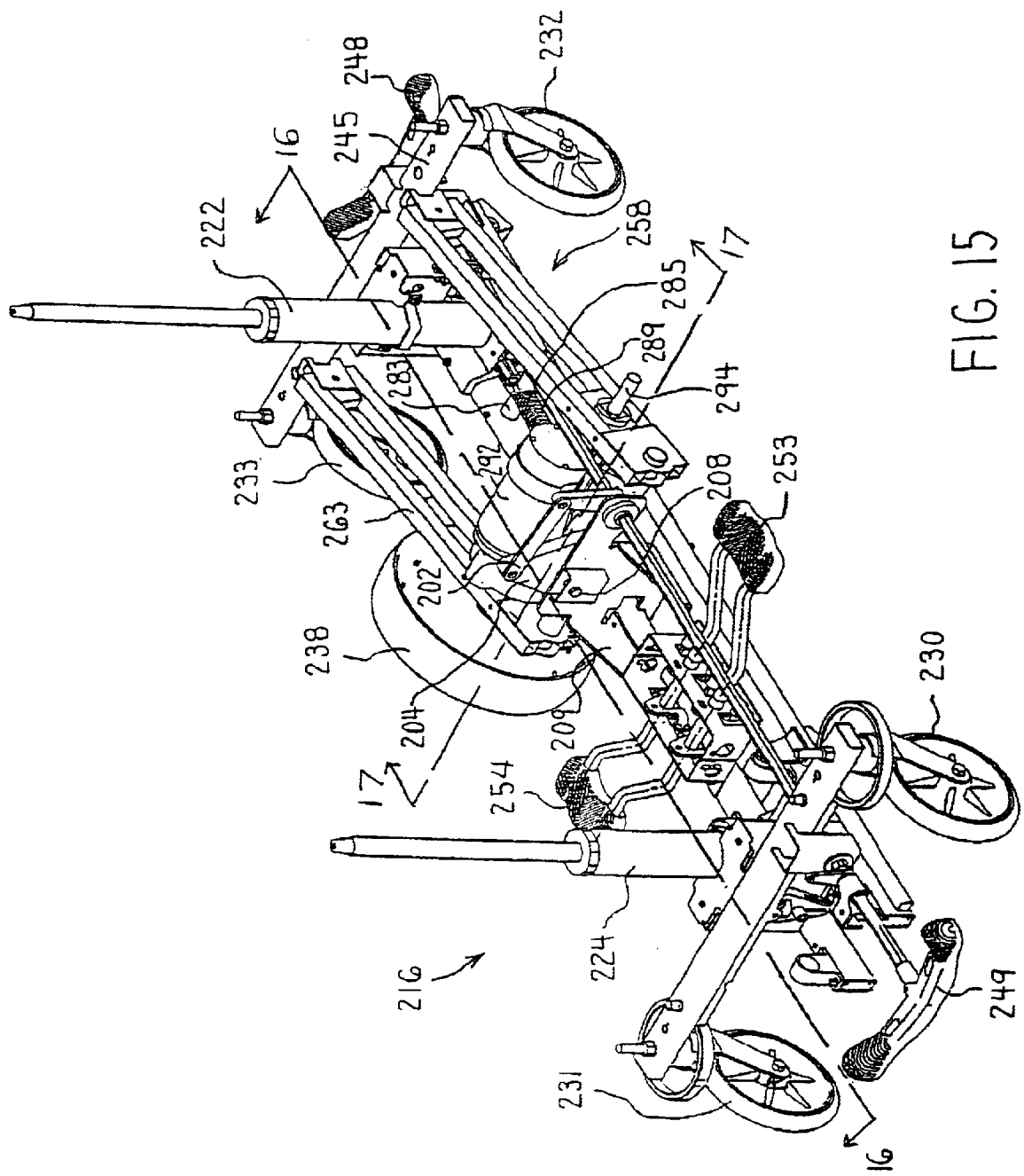
FIG. 15 is an isometric view of the second embodiment of the wheeled carriage with the patient support and an auxiliary wheel removed to illustrate the auxiliary wheel support structure with the auxiliary wheels in a deployed position.
Figure 16:
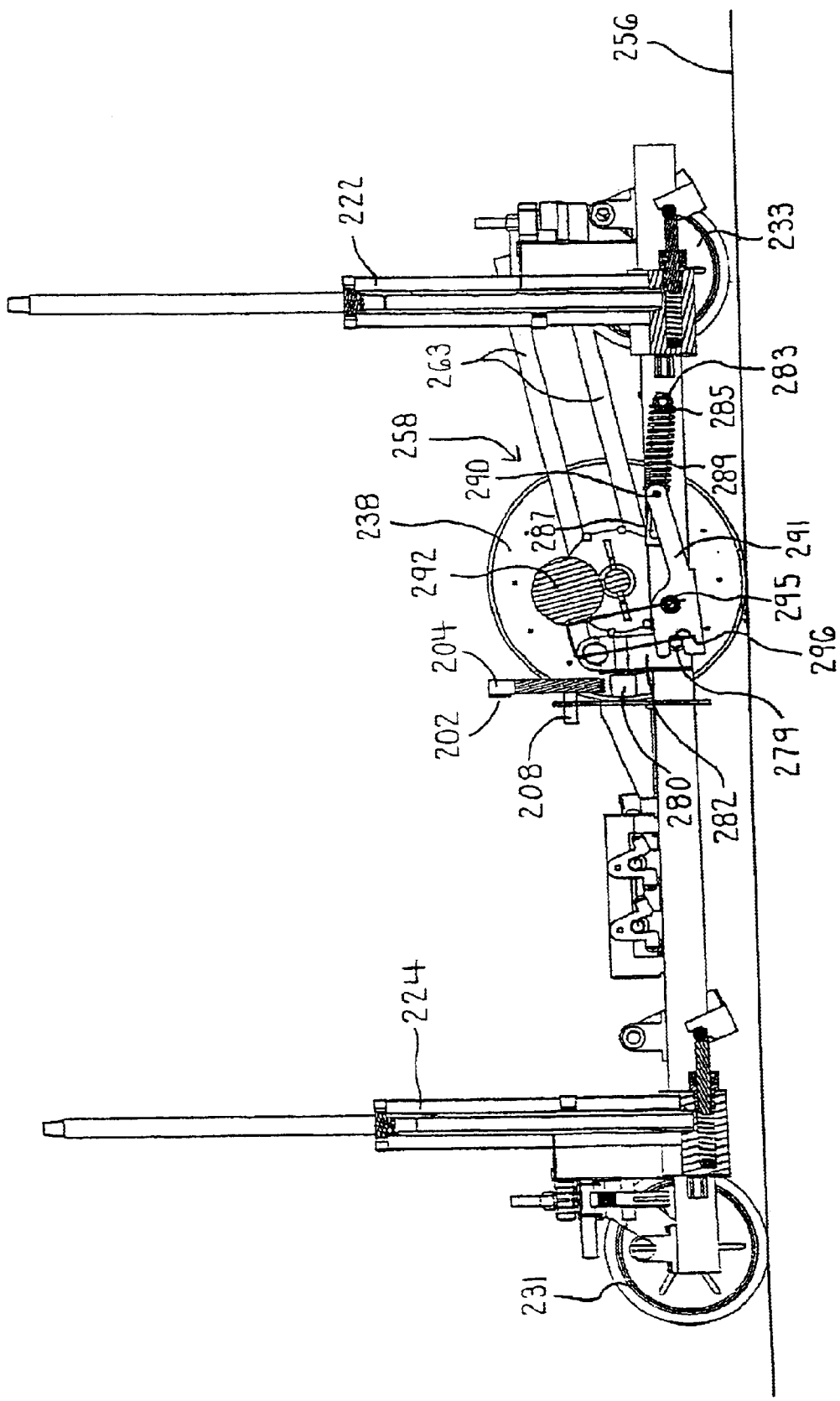
FIG. 16 is a side view of the second embodiment of the wheeled carriage showing the relationship between the auxiliary wheels in a deployed position and the floor surface.
Figure 17:
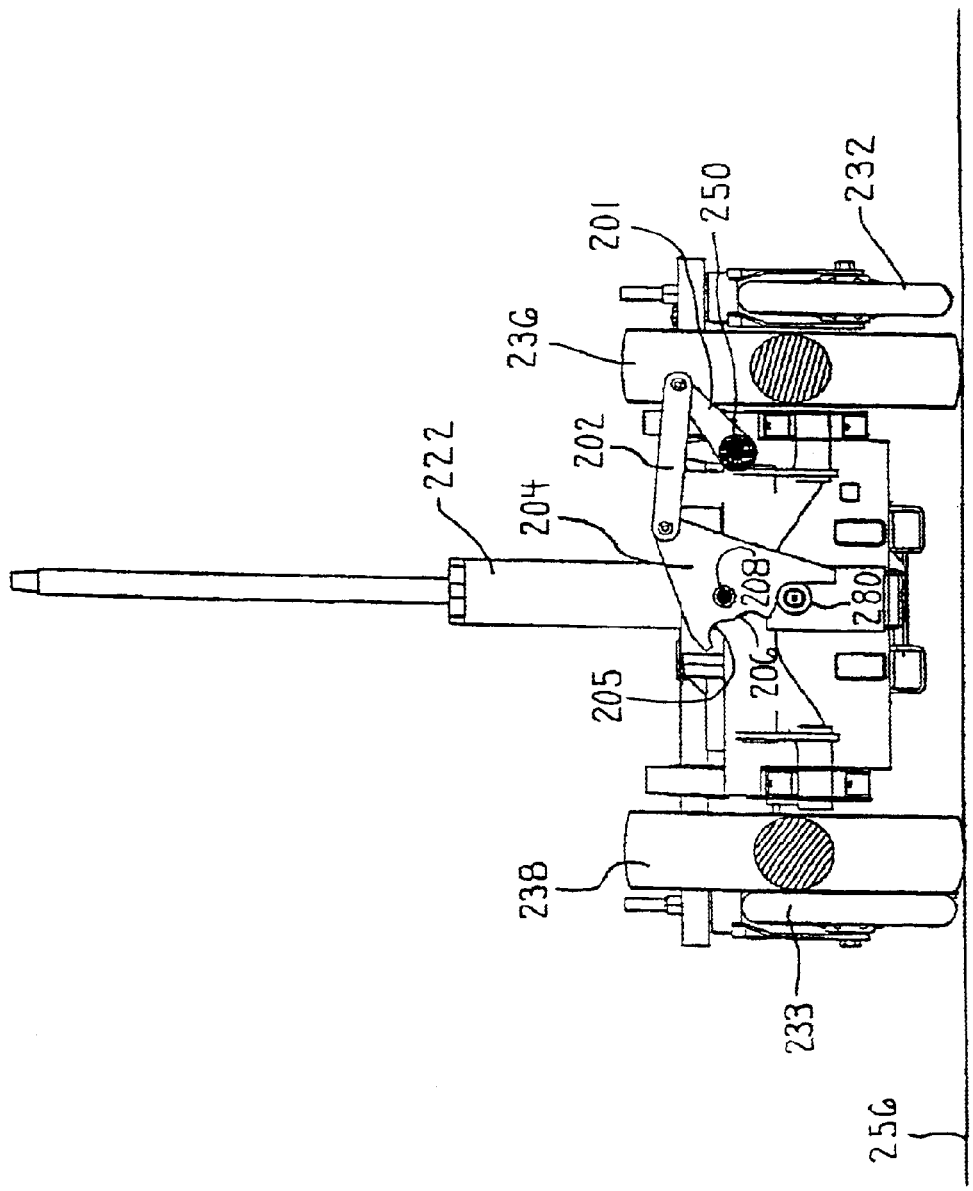
FIG. 17 is a cross-sectional view taken at 17—17 of FIG. 15 showing a cam apparatus supporting a cam follower so that the auxiliary wheels are in a stored position.

As the linkage element 291 pivots, the force from the rod spring 289 now transfers through the rolling element 279 to drive the cam follower support member 282 downwardly instead of upwardly. The downward force on the follower support member 282 assists in advancing the cam follower 280 downwardly along a cam surface until the cam follower 280 reaches the deployment depression 207, as shown in FIG. 17. At this position, the entire auxiliary wheel support structure 258 has pivoted downwardly about the first ends of the frame members 261, 263 pivotally secured to the wheeled base 218 as shown in FIGS. 15–17. The auxiliary wheels 236, 238 extend beyond a plane defined by the castered wheels 230–231. The pair of castered wheels 232, 233 are lifted off from the floor surface 256 as shown in FIGS. 16 and 17. Thus, as in the first embodiment, only the castered wheels 230, 231 and the auxiliary wheels 236, 238 engage or contact the floor surface 256.

Extended Travel By Auxiliary Wheels

Figure 19:
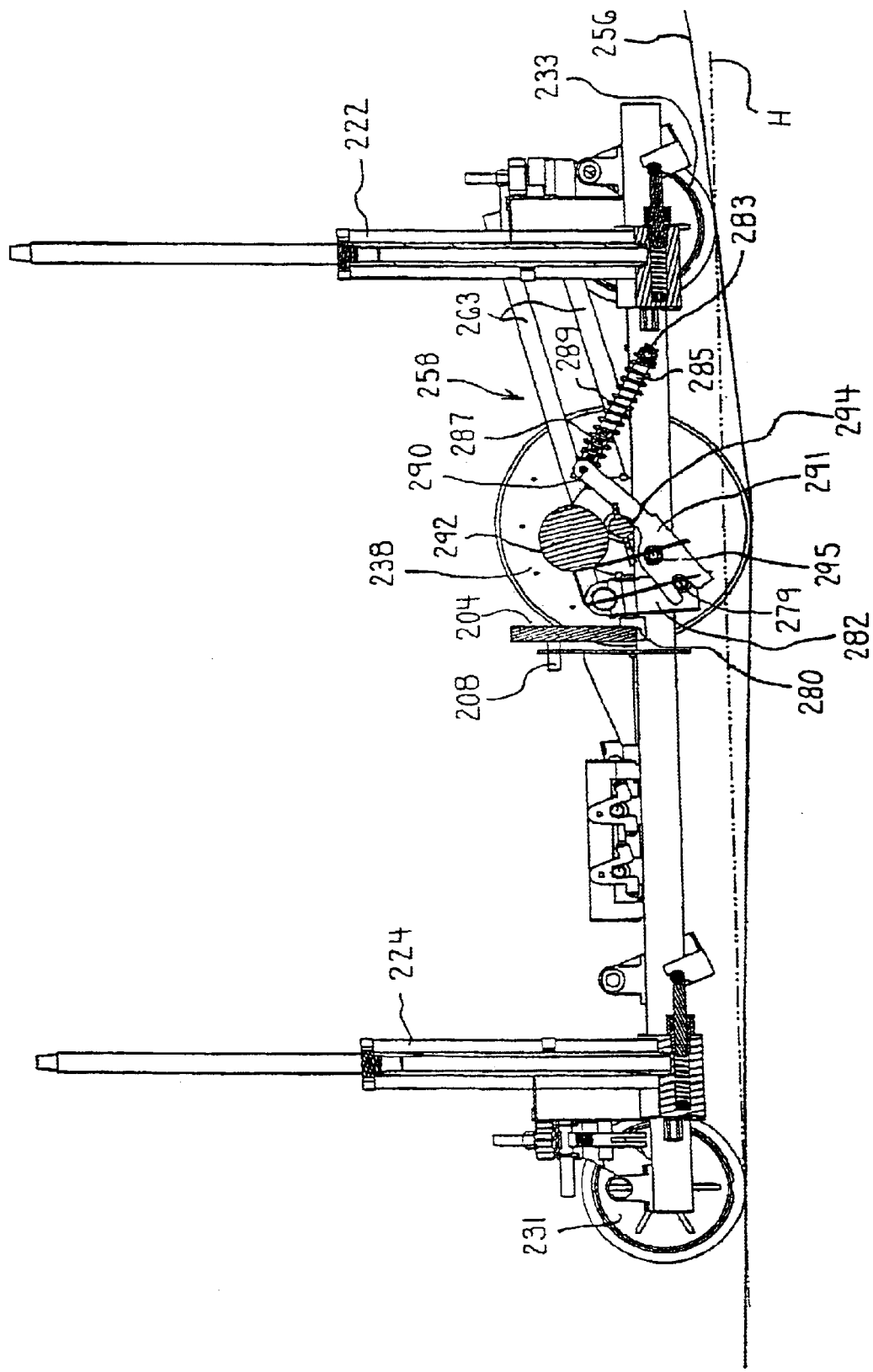
FIG. 19 is a side view taken of the wheeled carriage with an auxiliary wheel removed to illustrate the relationship between the auxiliary wheels and the floor surface when the auxiliary wheels are in an overtravel position.

As in the first embodiment, there are instances in which the floor surface 256 traveled by the wheeled carriage 216 is not level or even. For example, when the wheeled carriage 216 is moving from a level floor surface onto a ramp. In such an instance, even though the auxiliary wheels 236, 238 are deployed and in contact with the floor surface 256, and the castered wheels 232, 233 are elevated, the auxiliary wheels can temporarily be located in a valley between a level floor surface and an upwardly inclined ramp. FIG. 19 shows the wheeled carriage on an uneven floor surface 256 with the auxiliary wheels 236, 238 positioned in a lowered portion of the floor surface a large distance below an imaginary horizontal plane H.

Figure 18:
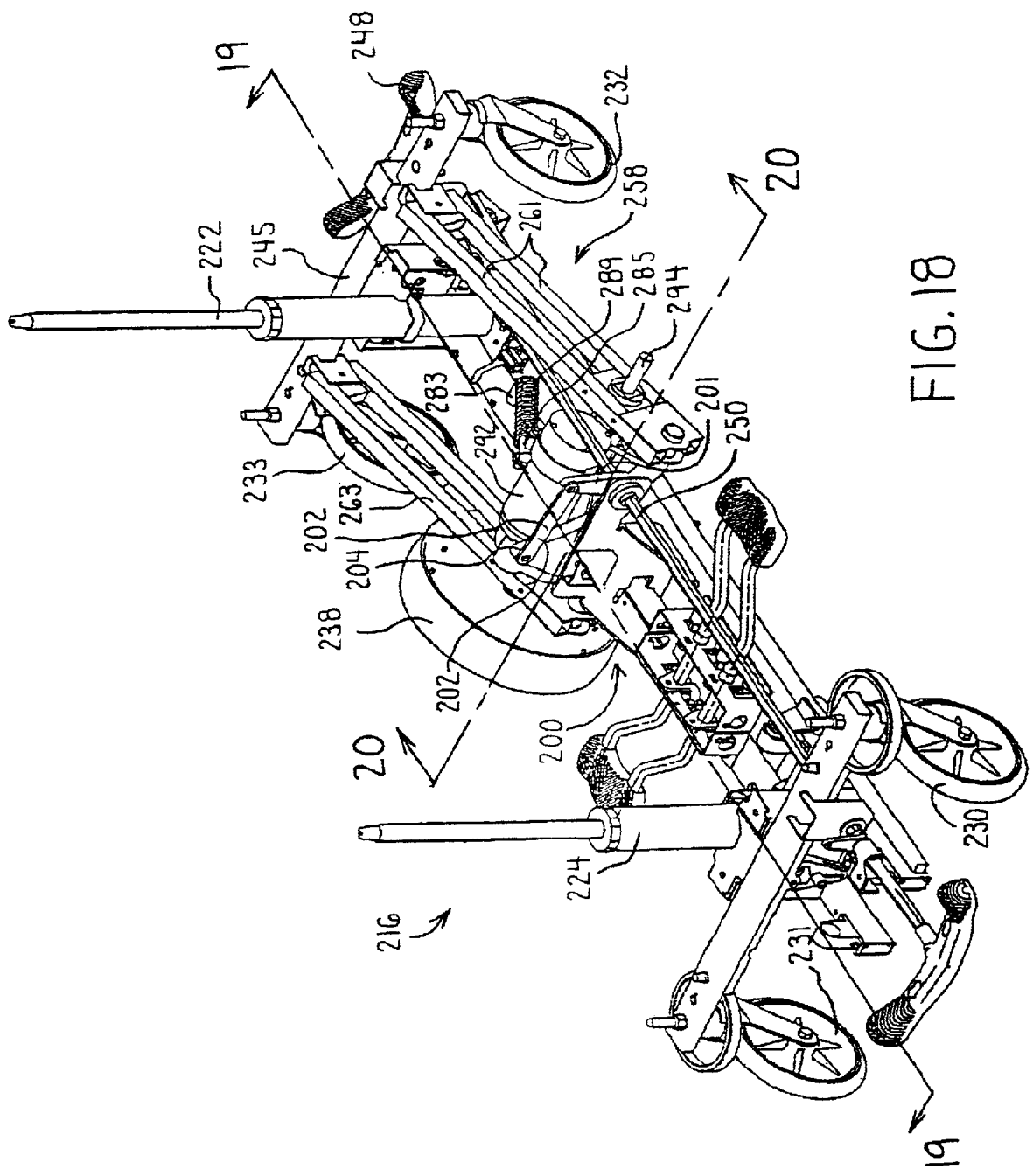
FIG. 18 is an isometric view of the second embodiment of the wheeled carriage with the patient support and an auxiliary wheel removed to illustrate the auxiliary wheel support structure in an overtravel position.
Figure 20:
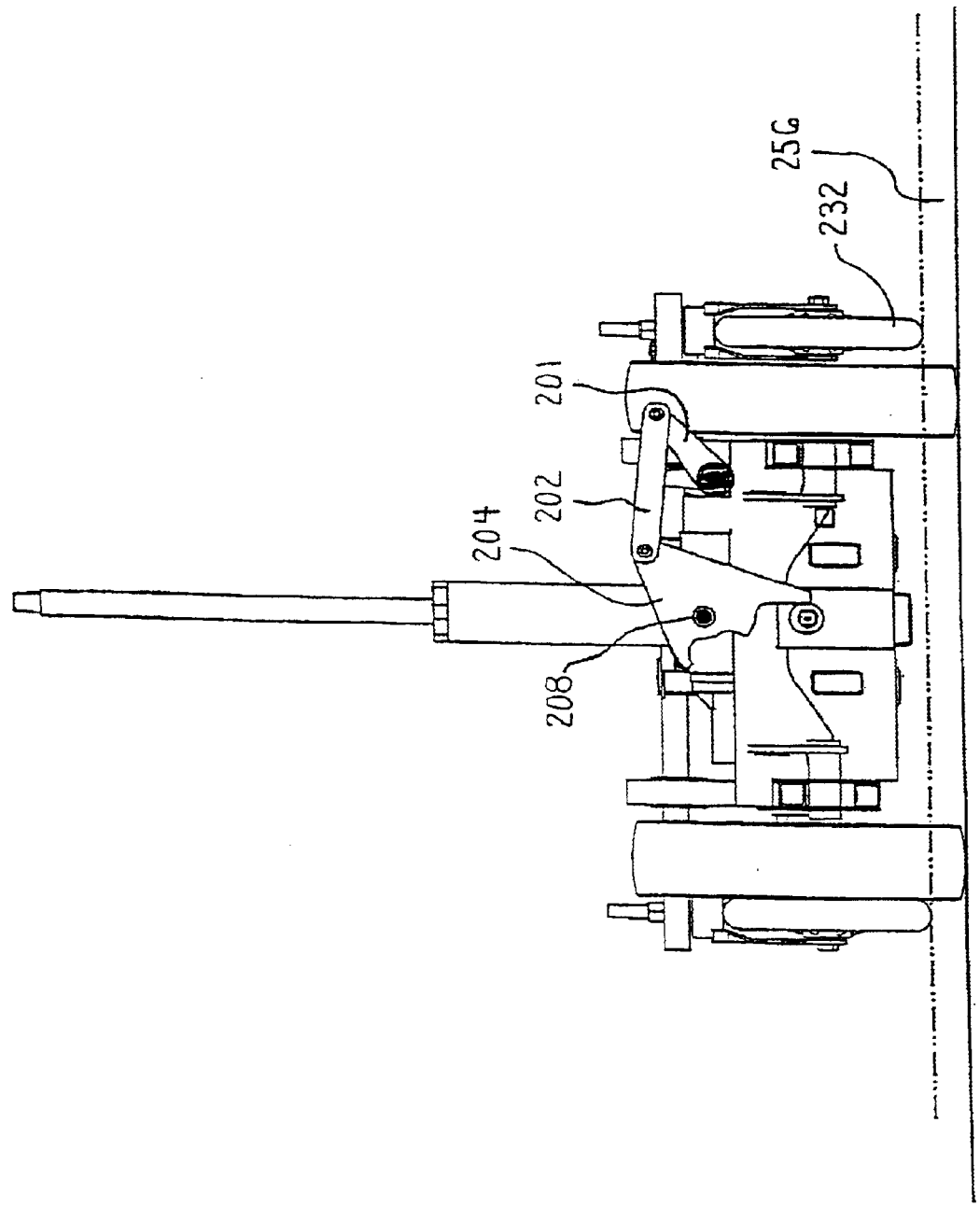
FIG. 20 is a cross-sectional view taken at 20—20 of FIG. 18 showing a cam apparatus supporting a cam follower when the auxiliary wheels are in an overtravel position.

As in the first embodiment, the auxiliary wheel support structure 258 avoids the driven auxiliary wheels 236, 238 from being raised above the uneven floor surface 256 having a valley or a depression. Thus, as in the first embodiment, the auxiliary wheel support structure 258 avoids a sudden loss of contact with the floor surface 256. The support structure 258 also prevents a sudden recontact of the driven auxiliary wheels 236, 238 with the floor surface 256. Thus, when the uneven floor surface is encountered, the auxiliary wheels 236, 238 advance to an overtravel position as shown in FIGS. 18–20.

Overtravel operation of the auxiliary wheel support structure 258 is as follows. The wheeled carriage 216 has the auxiliary wheels 236, 238 in the engaged position shown in FIGS. 15–17. The castered wheels 232, 233 at the foot end of the wheeled carriage 216 are in the raised position out of contact with the floor surface 256.

As shown in FIG. 16, the rod spring 289 provides an upward driving force to the first end of the linkage element 291. This driving force acts downwardly on the second end of the linkage element 291 by pivoting about the pivot pin 295 and, through the rolling element 79, bias downwardly the follower support member 282 and the cam follower 280 thereon.

When the floor surface 256 becomes uneven and lower at the auxiliary wheels 236, 238 than below the castered wheels 230–233, the force applied to the linkage element by the rod spring 287 is transferred to the cam follower support member 282 and drives the cam follower 280, as well as the entire auxiliary wheel support structure 258 and the auxiliary wheels downwardly. As a result, the second end of rod 285 and the first end of the linkage element 291 pivot toward the position shown in FIG. 19. During such movement, the force component of the rod spring 287 applied toward raising the first end of the linkage element 291 increases due to the change of position of the rod 285.

FIG. 20 shows the cam follower 280 at a lowered position away from the deployment depression 207. In this position, the downward force applied by the rod spring 289, without assistance from the cam apparatus 200 automatically forces the auxiliary wheels 236, 238 into contact with the floor surface 256. Once again, the auxiliary wheels 236, 238, and the auxiliary wheel support structure 258 pivot about first ends of the frame members 261, 263 as shown in FIGS. 18 and 19.

The biasing force of the rod spring 289 enables the auxiliary wheels 236, 238 to maintain contact with the floor surface 256 even when the floor surface 256 is lowered so that the castered wheels 230–233 contact the floor surface. In this way, the powered auxiliary wheels 236, 238 can continue to move the wheeled carriage 216.

The wheeled carriage 216 returns from the overtravel position as follows. When the wheeled carriage 216 begins to return to a level floor surface 256, the force on the auxiliary wheels 236, 238 from the floor surface overcomes the biasing force of the rod spring 287 driving the auxiliary wheel support structure 258 and the auxiliary wheels 236, 238 upwardly.

The upward movement of the wheel support structure 258 and the cam follower 280 enables the cam follower to move along the cam surface until reaching the deployment depression 207. The deployment depression 207 receives the cam follower 280 and maintains the position of the auxiliary wheels 236, 238, even as the castered wheels 232, 233 are again raised from the floor surface 256.

As discussed above, during the upward movement of the cam follower support member 282, the second end of the lift linkage element 291 moves upwardly, lowering the first end of the linkage element. However, the linkage element 291 never reaches an axially aligned position with the push rod 285, in part because of the deployment depression 207.

As in the first embodiment, the wheeled support structure 258 returns the auxiliary wheels 236, 238 to the deployed position.

Manual Control Drive Apparatus

Figure 21A:
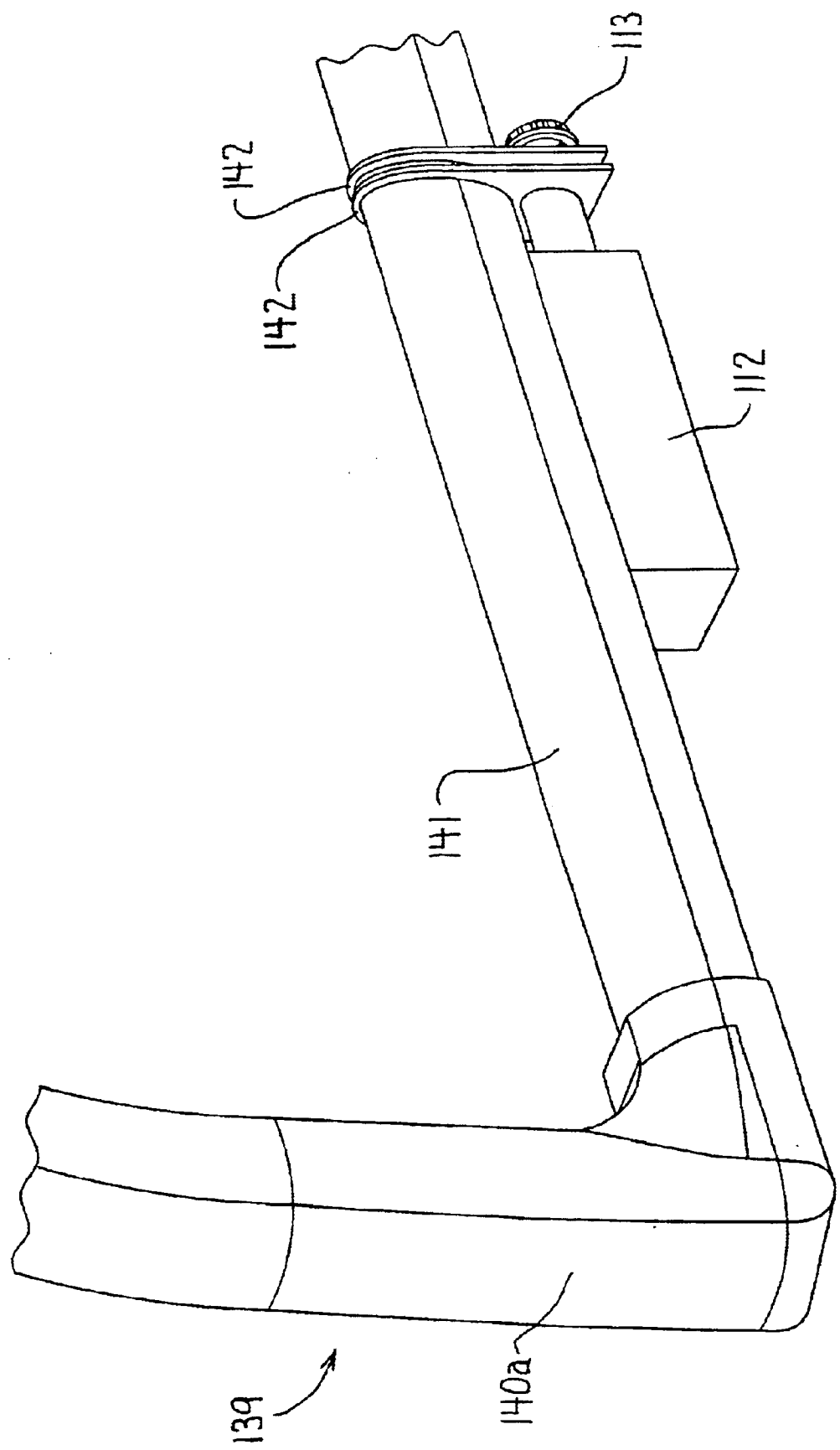
FIG. 21A is a partial view of a manual control drive apparatus for the wheeled carriage including a load cell.
Figure 21B:
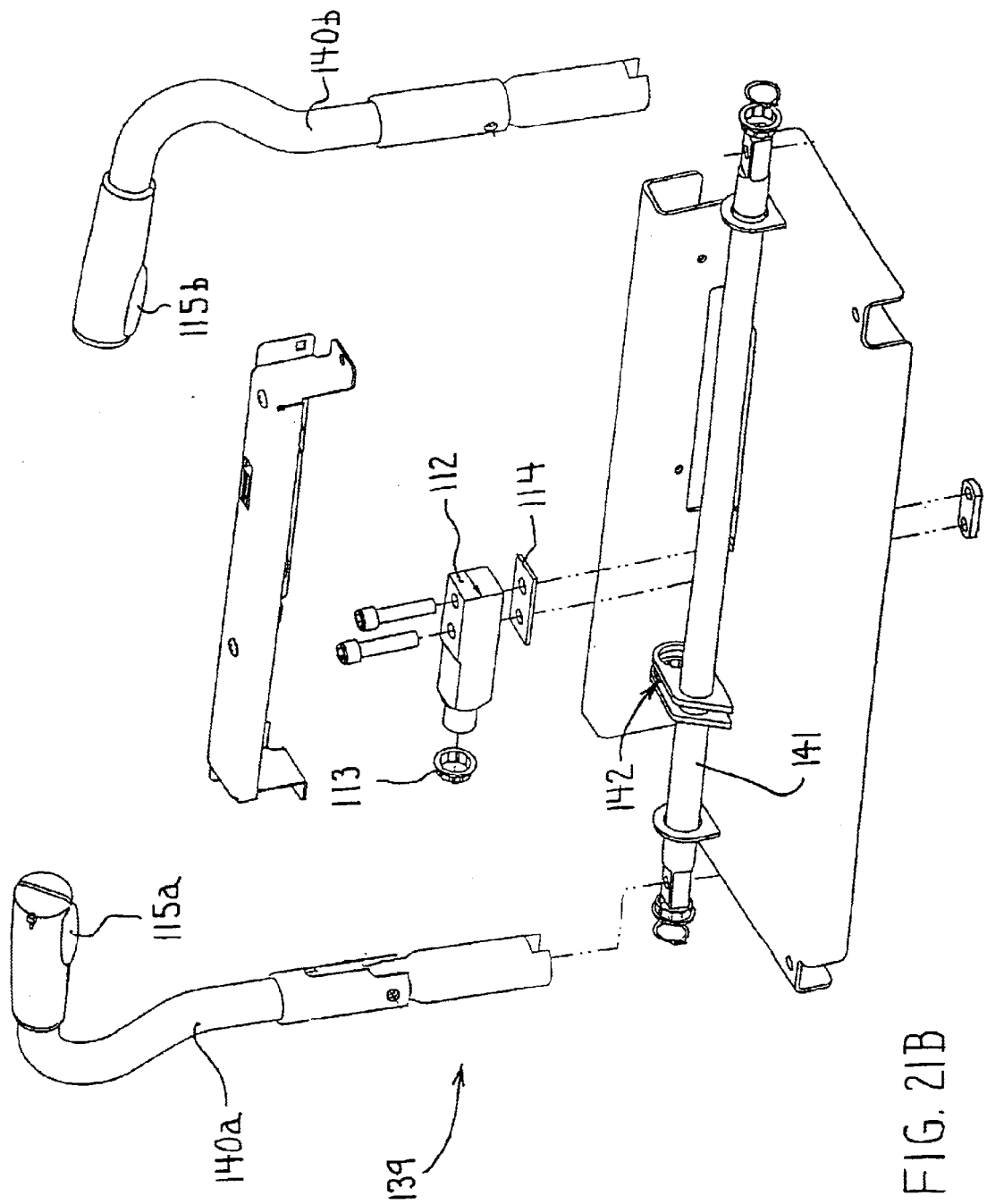
FIG. 21B is an exploded view of the manual control drive apparatus including a load cell.

The first and second embodiments of the invention preferably utilize the same manual control drive apparatus 139, shown in FIGS. 21A and 21B. However, for purposes of discussion, the manual control drive apparatus 139 will only be described with respect to the embodiment of FIGS. 1–10. The manual control drive apparatus 139 includes manually controlled drive members, such as handles 140a, 140b, which enable an operator to drive the wheeled carriage 116 in selected directions. As shown in FIG. 21B, the manual control apparatus 139 includes a handle support bar 141 fixedly secured at opposing ends to lower portions of the handles 140a, 140b. The handle support bar 141 is coupled by bar elements 142 to a force transfer element 113. The force transfer element 113 connects to a force-measuring device, such as load cell 112. A load cell shim element 114 is used to properly position the load cell 112 on a support housing adjacent the handle support bar 141.

An end rail or any other known gripping type device that enables persons to move or push the wheeled carriage 116 can replace the handles 140a, 140b. Even the frame of the patient support 120 can be utilized as the gripping device in some embodiments.

The drive handles 140a, 140b include spaced motion/presence sensors 115a, 115b as shown in FIG. 21B. The presence sensors 115a, 115b, have an outwardly spring biased movable or deformable shell. Each presence sensor houses a pair of push-button type sensor switches therein.

Figure 22:
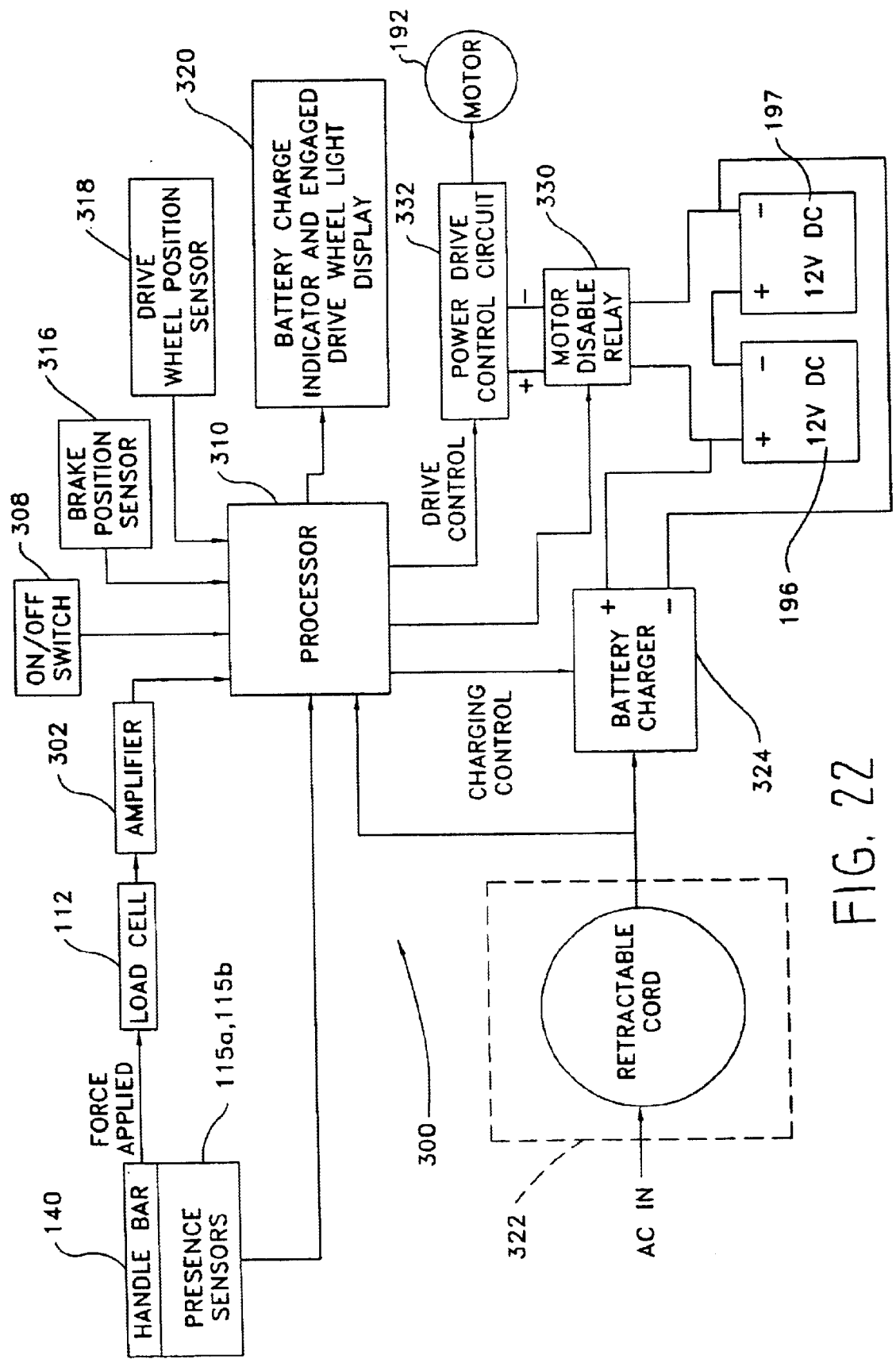
FIG. 22 is a block diagram of an auxiliary wheel drive and control system for auxiliary wheels of a wheeled carriage.

The presence sensors are represented in block diagram form as element 115 in FIG. 22. The presence sensors can include the sensors disclosed in U.S. patent application Ser. No. 09/489,584, filed Jan. 21, 2000, and titled "POWER ASSISTED WHEELED CARRIAGE", the disclosure of which is hereby incorporated by reference in its entirety.

Grasping or squeezing either of the drive handles 140a, 140b at one of the presence sensors 115a, 115b, corresponding to a pair of sensor switches, closes an electrical circuit.

The presence sensors 115a, 115b can also be pressure sensors sensing air or liquid pressure using a flexible member that is deformed by an operator's hand. Capacitive sensing elements detecting the presence of an operator's hand, or other types of sensors, can also be utilized.

While two presence sensors 115a, 115b are disclosed, an operator only needs to place a hand on a single handle 140a, 140b to power the wheeled carriage 116. However, an embodiment utilizing both handles 140a, 140b to actuate the wheeled carriage also is contemplated.

Load Cell

As shown in FIG. 21A, the load cell 112 measures force applied to the handles 140a, 140b to power the auxiliary wheels 136, 138 in a forward or reverse direction. The load cell 112 preferably includes a plurality of strain gauges provided on a strain gauge body. One type of load cell includes strain gauges arranged to form a Wheatstone bridge.

The load cell typically outputs a voltage of about 2.5 volts when no force is applied thereto. When the load cell 112 is loaded in the forward direction, the voltage output by the load cell 112 increases. When the load cell 112 is biased in the reverse direction (toward the user holding on of the handles 140a, 140b), the voltage output from the load cell decreases.

While the load cell 112 is preferred, other arrangements of force responsive sensors for outputting a force signal are within the scope of the invention.

Operation of the Load Cell

An operator is positioned at the head end of the wheeled carriage 116 adjacent to the handles 140a, 140b. The load cell 112 is biased when a force is applied to one of the handles 140a, 140b. The handles 140a, 140b do not move significantly, if it all, when a force is applied thereto. The force is transferred from the handle through the handle support bar 141 and bar elements 142 to the force transfer element 113. The force transfer element 113 transfers the force/load applied on the handle 140a, 140b to the load cell 112. The body and strain gauges of the load cell 112 flex in response to the pivoting force applied onto the load cell.

When an inward force is applied to one of the handles 140a, 140b in a forward direction, away from an operator and toward the center of the wheeled carriage 116, the load cell 112 provides a forward drive signal.

When an operator applies the inward force, the wheeled carriage is intended to travel in a forward direction away from the operator. When the operator applies an outward force to the handles 140a, 140b, away from the wheeled carriage 116, the wheeled carriage is driven toward the operator. The handle apparatus 139 is designed to measure force only in the forward and reverse directions. No force in any other direction is measured.

During operation, turning of the wheeled carriage 116 is simplified when the auxiliary wheels 136, 138 are deployed onto a floor surface 156. This is so, because the auxiliary wheels 136, 138 are not castered, and are relatively wide and tall compared to the other castered wheels 130–133 of the wheeled base 118. Further, because of the resulting shorter wheelbase between the wheels 132, 133 and 136, 138 turning requires less physical force.

Auxiliary Wheel Drive and Control System

FIG. 22 illustrates an auxiliary wheel drive and control system 300 of the invention for powering auxiliary wheels of the first or second embodiment. An on/off switch 308 enables operation of the drive and control system 300. The load cell 112 quantifies a force input transferred from the handles 140a, 140b as described above.

The drive and control system 300 includes an amplifier 302, which amplifies the signal from the load cell 112. The drive and control system 300 includes a processor 310, such as a computer/central processor (CPU) or a microprocessor, which receives an amplified output signal from the amplifier 302. The amplified output signal assists in the control of the drive speed of the auxiliary wheels.

The processor 310 also receives presence output signals from a motion/presence sensor 115 on the drive handles 140a, 140b. The motion/presence sensor 115 indicates the presence of an operator's hand on the handles 140a, 140b, as described above. The processor 310 calculates the presence or absence of an operator's hand in response to the presence output signals.

The auxiliary wheel drive and control system 300 includes brake and drive wheel position sensors 316, 318. The brake position sensor 316 outputs a signal to the processor 310 in response to actuation/deactivation of the wheeled carriage brakes. Thus the on/off condition of the vehicle brakes is determined. The drive wheel position sensor 318 senses whether the auxiliary wheels 136, 138 are in a retracted position or a deployed position. The output from the drive wheel position sensor 318 is sent to the processor 310.

The auxiliary wheel drive and control system 300 includes a battery charge indicator and engaged auxiliary drive wheel light display 320. The display 320 provides a visual indication of the battery condition and the position of the auxiliary wheels 136, 138. One example of a display or display panel is set forth in U.S. patent application Ser. No. 09/489,584, titled "POWER ASSISTED WHEELED CARRIAGE" the disclosure of which was previously incorporated by reference herein.

The auxiliary wheel drive and control system 300 also includes a retractable power cord 322, battery charger 324 and first and second series connected 12V batteries 326, 328.

The retractable power cord 322 receives an alternating current from a wall outlet. The current is carried to the battery charger 324 for charging batteries 326, 328. The voltage received by the cord 322 is also provided to the presence sensor 115, the processor 310 and the battery charger 324. The retractable cord 322 can be replaced by a standard power cord or any other device for transferring power to the drive and control system 300 of the wheeled carriage 116.

The processor 310 connects to the battery charger 324 to control charging of the batteries 196, 197. In response to the presence of 120V AC power, the processor 310 signals the battery charger 324 to charge the batteries 196, 197, so long as the batteries do not overcharge. In response to the presence of 120V AC power, the processor 310 provides an output signal to a power drive control circuit 332 to ensure no operation of the auxiliary wheel drive motor 192. The processor 310 can provide an additional output signal to a motor disable relay 330 to ensure no operation of the drive motor 192.

To additionally ensure no improper operation of the auxiliary wheel drive motor 192, the processor 310 provides an additional output signal to a drive motor disabling device, such as a motor disable relay 330. The motor disable relay 330 is a normally closed relay connected to a circuit in parallel with the auxiliary wheel drive motor 192. Thus, when the relay is closed, the auxiliary wheel drive motor 192 is short circuited and unable to drive the auxiliary wheels, even if electrical power is improperly applied thereto.

To operate the drive motor 192, the processor opens the motor disable relay 330 to open the parallel circuit. Thus the short circuit is removed, and voltage applied to the drive motor 192 can now power the carriage 116.

In use, if an operator parks the carriage 116 on an incline with the drive motor not operating, the auxiliary wheels deployed, and the brake unset, the carriage may begin to move or to roll with the incline. However, the closed motor disable relay 330 enables back emf to go from one electrical side of the drive motor to the opposing electrical side. The short circuit provides an electrical resistance force against movement of the carriage 116 when the auxiliary wheels 136, 138 are deployed and the drive motor is not operating. Thus, this arrangement acts as motor braking by an unpowered motor to resist or slow movement of the carriage 116.

The batteries 196, 197 provide power to bias the load cell 112, to power the presence sensors 115, and to power other elements of the auxiliary wheel drive and control system 300.

Power Drive Control Circuit

When enabled by signals from the load cell 112 and the presence sensor 115, the processor 310 provides an auxiliary wheel drive control signal to a power drive control circuit 332. The power drive control circuit 332 provides output signals to the auxiliary wheel drive motor 192 to control the velocity and direction of travel of the wheeled carriage 116.

In the preferred embodiment, the power drive control circuit 332 applies pulses to the DC drive motor 192. The width of the pulses varies depending on the power signals received from the processor 310. The speed of the drive motor 192 increases with the width of the pulses. The duty cycle of the pulses from the power drive control circuit 332 is fast. This enables the DC drive motor 192 to operate smoothly with no jerkiness sensed by an operator or a person on the patient support 120.

The pulse width modulation signals have a positive and a negative voltage during each duty cycle. When the pulses have a duty cycle of 50%, the drive motor 192 does not operate. In such instance, for 50% of the duty cycle a positive pulse is applied to the drive motor 192. For the other 50% of the duty cycle, a negative pulse of equal magnitude is applied to the drive motor 192. In fact, at a 50% duty cycle, the drive motor 192 acts somewhat like a brake, opposing rotation of the auxiliary wheels 136, 138.

In operation, the power drive control circuit 332 receives power signals from the processor 310 and varies the pulse width during the duty cycle. For example, by increasing the positive pulse width to 65%, and correspondingly decreasing the negative pulse width to 35% of the duty cycle, the drive motor 192 drives the auxiliary wheels 136, 138 in the forward direction. When a reverse direction is selected, for example, the positive pulse width can be reduced to 40% and the negative pulse width increased to 60%. Thus, the drive motor 192 drives the wheeled carriage 116 in the reverse direction toward the operator.

One example of a drive motor driven by pulse width modulation signals is set forth in U.S. patent application Ser. No. 09/489,584, titled "POWER ASSISTED WHEELED CARRIAGE" the disclosure of which was previously incorporated by reference herein.

In some embodiments, a separate power sensor (not shown) senses the 120V AC power and provides an input to the CPU 310. Alternating current can also be provided from the power sensor or directly from the retractable cord to the motor disable relay 330 to ensure the auxiliary wheel drive motor 192 is disabled when the retractable cord 322 receives power from an outlet.

In the preferred embodiment, the power drive control circuit 332 applies pulse width modulation signals to the drive motor 192. However, other less preferred circuit arrangements and types of drive motors are contemplated.

Operation of the Auxiliary Wheel Drive and Control System

As shown in the block diagram 338 of FIG. 23, the processor 310 of the auxiliary wheel drive and control system 300 executes control of the wheeled carriage 116 as follows. The wheel drive and control system 300 begins operating when a power on/off switch is actuated at step 340. At step 342, the processor 310 senses if the presence sensor 115 is enabled or closed. If enabled (YES), the block diagram advances to step 344. At step 344, driving of the auxiliary wheel drive motor 192 is disabled. After disabling the drive motor 192, the operation returns to step 340.

The operation repeats steps 340, 342, 344 until the system is powered up with the presence sensor 115 disabled (NO) at step 342. During this time, the main program will not start operating. The arrangement of steps 342, 344 prevents an operator from improperly biasing the presence sensor 115 in a permanently enabled position.

Returning to step 342, when the presence sensor 115 is disabled at step 342, the operation advances to step 346. At step 346, operation of the main operating program begins and the program advances to step 348.

At step 348, the processor 310 senses if the voltage of batteries 326, 328 is adequate for driving the wheeled carriage 116. If not (NO), the program advances to step 350. At step 350, when the presence sensor 115 is enabled (YES), a low battery condition is displayed on the display 320. The program then returns to step 346 regardless of the condition of the presence sensor 115. This sequence of steps prevents operation of the power drive control circuit 332 to drive the motor 192 when the battery charge is low. Operation at low charge would damage the batteries 326, 328 and not adequately power the wheeled carriage 116.

Returning to step 348, when the result of the battery voltage is adequate (YES), the program advances to step 352. At step 352, the condition of the presence sensor 115 is sensed. If the sensor 115 is not enabled (NO), the program advances to step 354.

At step 354, the wheeled carriage 116 is gradually stopped or remains stopped. To stop the wheeled carriage 116, the processor 310 controls the power drive control circuit 332 to discontinue power to the drive motor 192. Stopping of the wheeled carriage 116 preferably occurs within two seconds of detecting that the presence sensor 115 is disabled (NO).

This sequence of steps prevents continued powered driving of the wheeled carriage 116 when a user is not touching the handles 140a, 140b.

Returning to step 352, if the processor 310 senses that the presence sensor 115 is enabled (YES), the program advances to step 356. At step 356, the CPU senses whether the presence sensor 115 has been enabled for over a predetermined time, such as ten minutes, without motion of the wheeled carriage 116. If enabled for the predetermined time period (YES), the program advances to step 358.

At step 358, the processor 310 disables power to the drive motor 192. Then, assuming no changes in the sensed values, the program advances through steps 346, 348, 352, 356 and returns to step 358. Thus, until the presence sensor switch 115 is turned off and then on again, i.e. reset, the program will not advance to step 360. This sequence of steps prevents a user from tampering with and permanently fixing the presence sensor switch 115 in the biased/closed position after the system has been powered up.

Returning to step 356, if the presence sensor 115 has not been on for the predetermined time (NO), the program advances to step 360. At step 360, the processor 310 receives signals from the brake position sensor 316 and the drive wheel position sensor 318. The processor determines if the brakes are off (wheeled carriage 116 unbraked), and if the auxiliary drive wheels 136, 138 are not deployed. If both conditions are not met (NO), the program advances to step 362.

At step 362, the processor 310 provides a signal to the display 320, indicating that the auxiliary wheels 136, 138 are not deployed and/or that the brakes are locked/applied. The operator can then lower the auxiliary wheels 136, 138. The program then returns to step 346 and repeats operation of the main program. Thus steps 360, 362 inform the operator that the auxiliary wheels 136, 138 are not deployed, and prevent operation of the drive motor 192 until the auxiliary wheels engage the floor surface 156.

After passing through steps 346, 348, 352, 356, the program returns to step 360. At step 360, if the brakes are at an off position and the auxiliary wheels 136, 138 are engaged (YES), the program advances to step 400. At step 400, a carriage driving subroutine 400 shown in FIG. 24 is executed as explained below.

After execution of the carriage driving subroutine 400, the program advances to step 362. At step 362, the CPU operates to display the sensed voltage of batteries 326, 328 on the display. The program then returns to step 346 to repeat the steps of the main program.

Operation of the Carriage Driving Subroutine Acceleration

Figure 24:
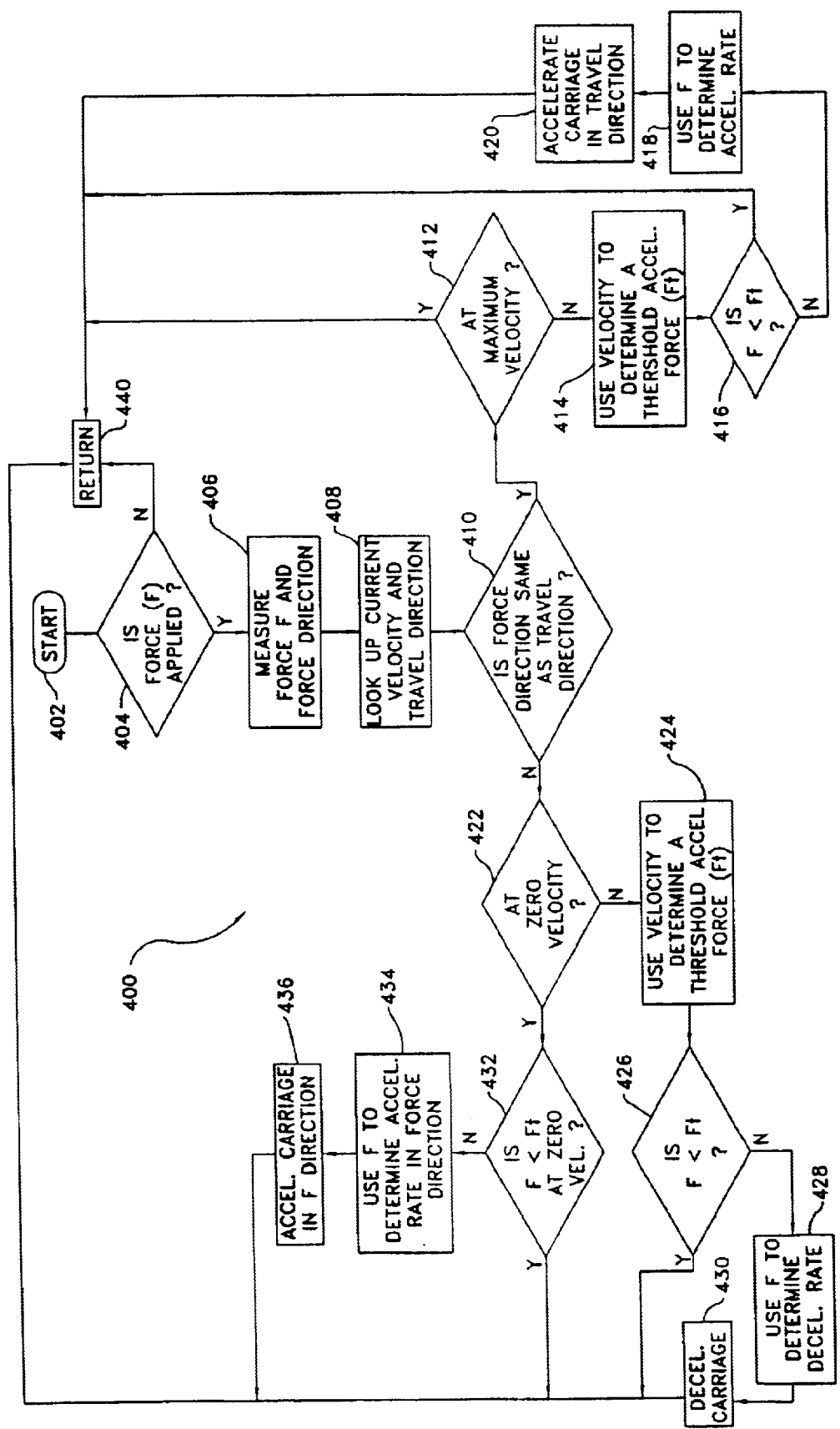
FIG. 24 is a block diagram of an auxiliary wheel drive subroutine for step 400 in FIG. 23.

The wheeled carriage driving subroutine 400 of FIG. 24 illustrates how the processor 310, of the auxiliary wheel drive and control system 300 drives the auxiliary wheels 136, 138 of the wheeled carriage 116.

Figure 23:
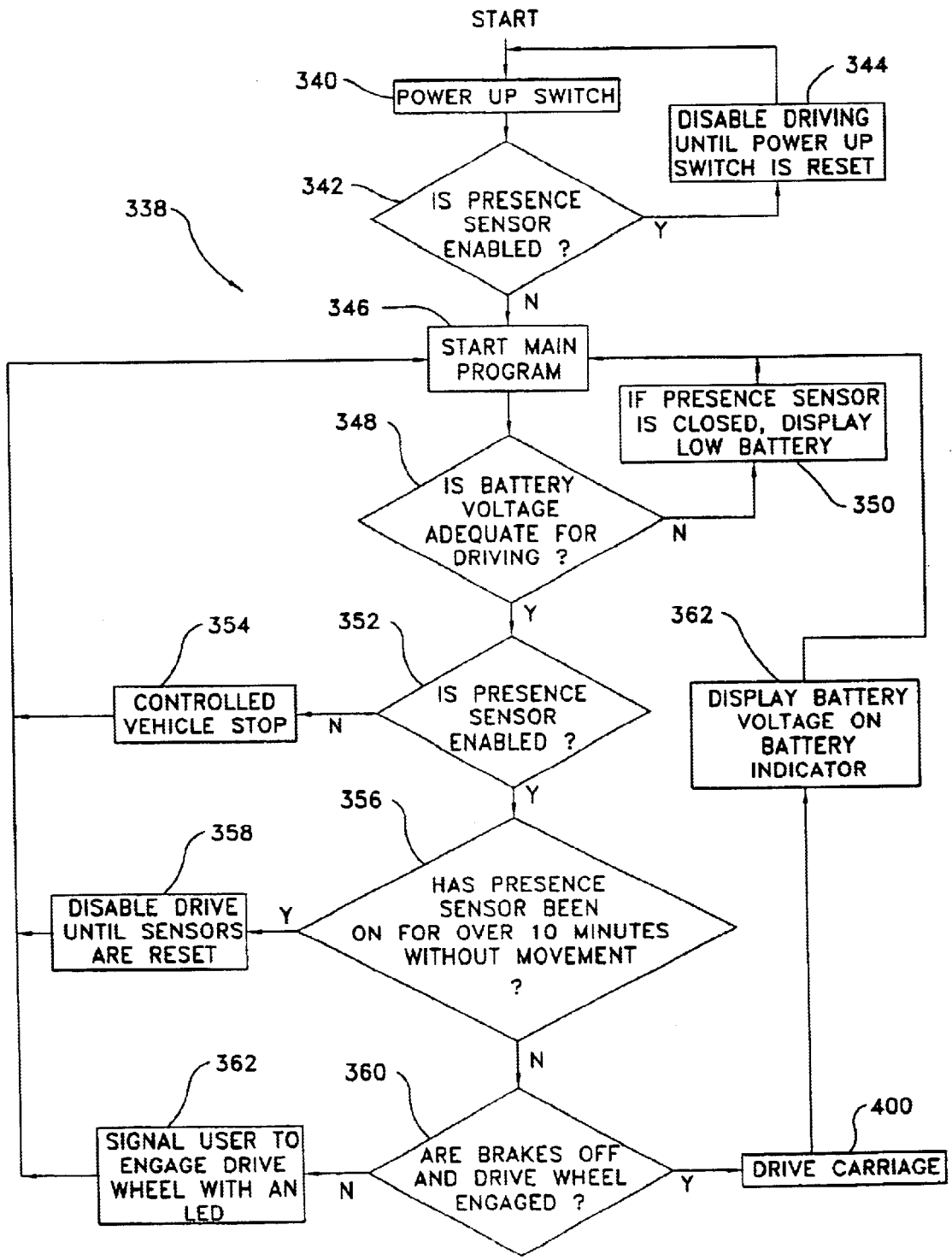
FIG. 23 is a block diagram of an auxiliary wheel drive decision program.

As shown in FIG. 23, after step 360 of the main program detects that the carriage brakes and the auxiliary drive wheels 136, 138 are in a condition to power the drive wheels, the subroutine 400 begins. FIG. 24 shows the subroutine starting at step 402 and operating as follows.

The subroutine 400 advances to step 404. At step 404, the processor 310 receives a drive signal from the load cell 112 via the amplifier 302. In the preferred embodiment, the baseline voltage for the load cell 112 is 2.5 volts (no force applied). Thus, the load cell 112 provides a drive signal at 2.5 volts when the load cell is at rest. The processor 310 compares the 2.5-volt value with the measured force to determine if a force is being applied to the load cell 112 via the handles 140a, 140b. If the sensed force value is approximately 2.5 volts, no force is being applied to the handles 140a, 140b (NO). Then the subroutine advances to step 440. At step 440, the subroutine 400 ends and returns to step 362 shown in FIG. 23.

Returning to step 404, if an applied force is sensed, the subroutine 400 advances to step 406. At step 406, the processor 310 then calculates an applied force value F based on the drive signal. In the preferred embodiment, the drive signal from the load cell 112 represents measured load cell force Fc having a unit in volts. The measured force value F is calculated as follows. F=Fc−2.5 volts. The measured force value can be a positive value or a negative value.

At step 406, the processor 310 determines the direction of the applied force based on the polarity of the measured force value F. The direction of applied force is either forward or reverse. If the applied force is in a forward direction, the measured force value F is a positive value. If the applied force is in a reverse direction, the measured force value F is a negative value. The subroutine then advances to step 408.

At step 408, the processor looks up the current velocity and the current travel direction for the wheeled carriage 116. The subroutine 400 then advances to step 410.

At step 410, the processor 310 compares the direction of the force received from the load cell 112 with the current direction of travel of the wheeled carriage 116. If the directions are the same, the subroutine 400 advances to step 412.

At step 412, the processor 310 determines if the current velocity value for the wheeled carriage 116 equals a predetermined maximum velocity, such as 2½ miles per hour. If so (YES), the subroutine 400 advances to step 440 and returns to the main program at step 362 in FIG. 23. The velocity of the wheeled carriage 116 remains unchanged.

Returning now to step 412, if the current velocity of the wheeled carriage 116 is less than the maximum velocity, the subroutine 400 advances to step 414.

At step 414, the processor 310 calculates or looks up a threshold force value Ft based on the current velocity of the wheeled carriage 116. The threshold force value Ft is calculated as follows. "S" represents the velocity or speed of the wheeled carriage 116. "M" represents a force multiplier for the velocity of the carriage. The equation Ft=S×M defines the threshold force value. The threshold force value Ft increases with the velocity S of the wheeled carriage 116. The multiplier M preferably is a constant value from 0.1 to 0.3. Thus, the applied force F must be greater at higher velocities for the wheeled carriage 116 to change the velocity of the carriage. The effect of the equation for the threshold value Ft is to create opening force windows extending outwardly from a velocity of zero for the wheeled carriage. These windows represent regions where the measured force value F is not large enough to change the velocity of the wheeled carriage 116. In the preferred embodiment set forth above having a constant multiplier, the threshold force value Ft is represented by a linear equation dependent on velocity of the wheeled carriage 116.

In conclusion, as the speed or velocity of the wheeled carriage 116 increases in either of the forward or reverse directions, the force value F required to accelerate or decelerate the carriage increases.

Returning to step 414, after calculating the threshold force value Ft, the subroutine 400 then advances to step 416.

At step 416 the measured force value F is compared with the threshold force value Ft. The threshold force value Ft is always a positive value. Thus, in this instance, and all other comparisons, the absolute value of the measured force value is utilized (hereafter referred to simply as the "measured force value"). If the measured force value F is less than the threshold force value Ft (YES), the subroutine 400 advances to step 440. At step 440, the subroutine 400 ends and returns to step 362 of the program shown in FIG. 23. However, if the measured force value F is greater than the threshold force value Ft, the subroutine 400 advances to step 418.

At, step 418, the processor 310 uses the measured force value F to determine an acceleration rate for the wheeled carriage 116. For purposes of calculation, the processor 310 receives the drive signal from the load cell 112 and also stores a predetermined maximum force value Fmax. Any portion of a force applied to the load cell having a value greater than Fmax is not capable of being utilized in any calculations. Thus, measured force values F greater than Fmax do not further increase the acceleration rate for the wheeled carriage 116.

Returning to step 418, the acceleration rate for the wheeled carriage 116 is directly proportional to the measured force value F. Thus the operator has direct control of the acceleration rate of the wheeled carriage 116. However, in some embodiments, the acceleration rate in the reverse direction differs from the acceleration rate in the forward direction for the same force value F. The acceleration rate is stored in the processor 310 as the subroutine 400 advances to step 420.

At step 420, the processor 310 sends a power signal to the power drive control circuit 332 to control the auxiliary wheel drive motor 192 and power the auxiliary drive wheels 136, 138 to accelerate the wheeled carriage 116 at the calculated acceleration rate. The subroutine 400 then advances to step 440.

The subroutine 400 ends at step 440 and advances to step 362 shown in FIG. 23. This completes a description of the subroutine for all situations where the condition for step 410 is YES.

In another unusual instance, not likely to occur, a force applied to the load cell 112 can provide a constant measured force value F greater than the start-up force threshold Ft at zero velocity. However, the constant measured force value F can be less than the force threshold Ft at maximum velocity. If the measured force value F can be maintained at the constant value, the wheeled carriage 116 will not reach the maximum velocity Vmax. This is so because the measured force value F will eventually fall inside the window of the threshold value Ft, which increases as the velocity of the wheeled carriage 116 increases. This instance better explains how the force window widens or increases with velocity in both the forward and reverse directions.

Change in Direction/Deceleration

Returning now to step 410, all situations where the force direction is not the same as the travel direction are described as follows. At step 410, the processor 310 compares the direction of the force received from the load cell 112 with the current direction of travel of the wheeled carriage 116. If the directions are opposite (NO), the subroutine 400 advances to step 422.

At step 422, the processor 310 determines if the stored velocity of the wheeled carriage 116 equals approximately zero velocity. If not (NO), the subroutine 400 advances to step 424.

At step 424, the processor 310 calculates a threshold force value Ft based on the current velocity of the wheeled carriage 116. The process was described above for step 414. The subroutine 400 then advances to step 426.

At step 426, if the measured force value is less than the threshold force value Ft (YES), the subroutine 400 advances to step 440. At step 440, the subroutine 400 ends and returns to step 362 of the program shown in FIG. 23. However, if the measured force value F is greater than the threshold force value Ft, the subroutine 400 advances to step 428.

At step 428, the processor 310 uses the measured force value F to determine a deceleration rate for the wheeled carriage 116. Such a determination is opposite or inverse to the determination disclosed in step 418 above. The subroutine 400 then advances to step 430.

At step 430, the processor 310 controls the power drive control circuit 332 to power the auxiliary wheel drive motor 192 to decelerate the auxiliary drive wheels 136, 138. The rate of deceleration depends on the amount of the measured force value F. The subroutine 400 then advances to step 440. At step 440, the subroutine 400 ends and returns to step 362 shown in FIG. 23.

Start-Up/Zero Velocity

Returning now to step 422, if the velocity of the wheeled carriage 116 is approximately zero, the subroutine 400 advances to step 432.

At step 432, the measured force value F is compared with the threshold force value Ft. The threshold force value Ft at zero velocity is a small-predetermined value, and is stored in the processor 310, so no calculation is required. At step 432, if the measured force value F is less than the threshold force value Ft (YES), the subroutine 400 advances to step 440. At step 440, the subroutine 400 ends and returns to step 362 of the program shown in FIG. 23. However, if the measured force value F is greater than the threshold force value Ft (NO), the subroutine 400 advances to step 434.

At step 434, the processor 310 uses the measured force value F to determine an acceleration rate for the wheeled carriage 116. The direction of acceleration is in the direction of measured force, not in the previously known and stored travel direction. As discussed for step 418, the rate of acceleration depends on the measured force value F. The subroutine 400 then advances to step 436.

At step 436, the processor 310 controls the power drive control circuit 332 to power the auxiliary wheel drive motor 192 and accelerate the auxiliary drive wheels 136, 138 at the rate and in the direction determined at step 434. The subroutine 400 then advances to step 440. At step 440, the subroutine 400 returns to step 362 shown in FIG. 23.

This concludes the description of the individual steps of the drive carriage subroutine 400. The block diagram of the program shown in FIG. 23 can quickly execute and return to subroutine 400 to control the measured force and direction. The subroutine 400 quickly executes and outputs the changes to the drive motor 192 of the wheeled carriage 116. Because of the fast operation of the computer program at steps 412, 414, 416, and 418, the wheeled carriage 116 has a smooth ramping effect at start up. Further, the repeated updating and fast execution of the computer program for controlling the velocity of the wheeled carriage 116 provides a smooth ramping effect at all carriage velocities.

Effect of Operation—Constant Velocity

The effect of the drive and control system 300 in FIG. 22 and the arrangement described in FIGS. 23 and 24 is as follows.

At start-up, a user applies a force to the handles 140a, 140b in one of the two directions. As the wheeled carriage 116 travels in the selected direction, the operator must continue to grasp the handle to continue travel. If the operator does not follow the carriage, eventually their hand, due to the movement of the wheeled carriage 116, will apply a force in the reverse direction opposing travel of the carriage. This force will slow or stop the wheeled carriage 116. This arrangement prevents a sudden acceleration at start-up in a given direction from occurring. Thus, a smooth ramping effect at start up is obtained. Further, the operator's movement of the wheeled carriage 116 in any direction is limited by the speed of movement of their hand touching the handles 140a, 140b.

The drive and control system 300 acts to maintain constant velocity, thus acting as a cruise control system in some respects. Application of force to the handles 140a, 140b causes movement/acceleration of the wheeled carriage 116. After the wheeled carriage 116 is moving at a given velocity, if force is not applied to the handles 140a, 140b, the vehicle will maintain the given velocity.

For example, if the wheeled carriage 116 is moving at a first constant velocity in a forward direction, with no force applied to the handles 140a, 140b, the first constant velocity is maintained. Then, if a force in the forward direction is temporarily applied to the handles 140a, 140b, an acceleration of the wheeled carriage 116 occurs, and the velocity thereof increases. If the force is discontinued, the wheeled carriage now maintains a second velocity greater than the first velocity.

Of course, the drive and control system 300 operates in a similar manner when a force in a rearward direction is applied to the wheeled carriage 116 traveling in a forward direction. Temporary application of a force in the opposite direction decelerates the wheeled carriage 116. Such deceleration provides a second lower constant velocity for the wheeled carriage 116 in the same direction. If the force value F in the opposite direction is applied for a sufficient time, the wheeled carriage 116 can decelerate, stop and accelerate in the opposing direction. When the reverse force value F is released, the wheeled carriage 116 moves at a constant velocity.

With regard to the above examples, when the operator applies no force to the handles 140a, 140b, presence sensor 115 still requires that the operator's hand be adjacent the handles 140a, 140b. If the operator releases the carriage 116, the carriage will stop in a predetermined manner. Thus, the wheeled carriage 116 will not continue at a constant velocity if s operator's hand is removed.

There is some concern that the pair of switches of the presence sensor 115a, 115b both may remain in a closed position, thus failing to open, upon release of the sensor by the operator. Such a result could lead to the wheeled carriage being powered at a constant velocity even after the operator's hand releases the handles 140a, 140b.

To avoid such an event, in a preferred embodiment, the drive and control system 300 stores the measured force value F and compares the force value F with the next measured force value F.

In normal operation, during driving of the wheeled carriage 116, the mere presence of an operator's hand on one of the handles 140a, 140b, causes slight changes in the measured force value F due to the person walking at a slightly different velocity than the wheeled carriage. Even when the changes to the force value are extremely small, the changes can be sensed. The minor changes in force value are received by the drive and control system 300.

The drive and control system 300 repeatedly senses whether any minute or insignificant change in the measured force value F occurs over a given time period, such as two seconds. If no change occurs, the drive and control system 300 stops the carriage 116. In this way, the drive and control system 300 monitors the presence of the operator's hand thereon to ensure proper usage and operation of the wheeled carriage 116.

In conclusion, failure of both of the switches used within one of the presence sensors 115a, 115b, will not permit continued powered driving of the carriage when an operator's hand is removed from the handles 140a, 140b.

Velocity Maintainence for Constant Velocity Operation

The discussion of constant velocity type operation set forth above assumes no change in loading of the auxiliary wheel drive motor 192, 292. However, in some instances the loading on the drive motor 192, 292 changes. For example, when the wheeled carriage 116, 216 travels from a flat surface upwardly on a ramp, the resistive force or resistance against upward movement the auxiliary wheels 136, 138, 236, 238 increases. The increased resistance translates to an increased load for the drive motor 192, 292. The increased load decreases the voltage across the drive motor 192, 292 and the wheeled carriage velocity decreases.

Likewise, when the wheeled carriage 116, 216 travels from a smooth or tiled surface onto a carpeted surface, the carpeted surface increases resistance. Again, the increased resistance for the auxiliary wheels 136, 138, 236, 238 translates into an increased load for the drive motor 192, 292. The increased load decreases voltage across the drive motor 192, 292. Thus, the velocity of the wheeled carriage 116, 216 decreases.

Conversely, when the wheeled carriage 116, 216 reaches the bottom of a ramp or when the wheeled carriage moves from a carpet-type surface to a smooth surface, the resistance received by the auxiliary wheels 136, 138, 236, 238 decreases. The decreased resistance translates into a decreased load for the drive motor 192, 292. The decreased load increases the voltage across the drive motor 192, 292. The velocity of the wheeled carriage 116, 216 increases.

Loading of the drive motor 192, 292 includes resistive, inductive and capacitive components. As discussed above, a significant change in loading for the drive motor 192, 292 changes the velocity of the wheeled carriage.

Figure 25:
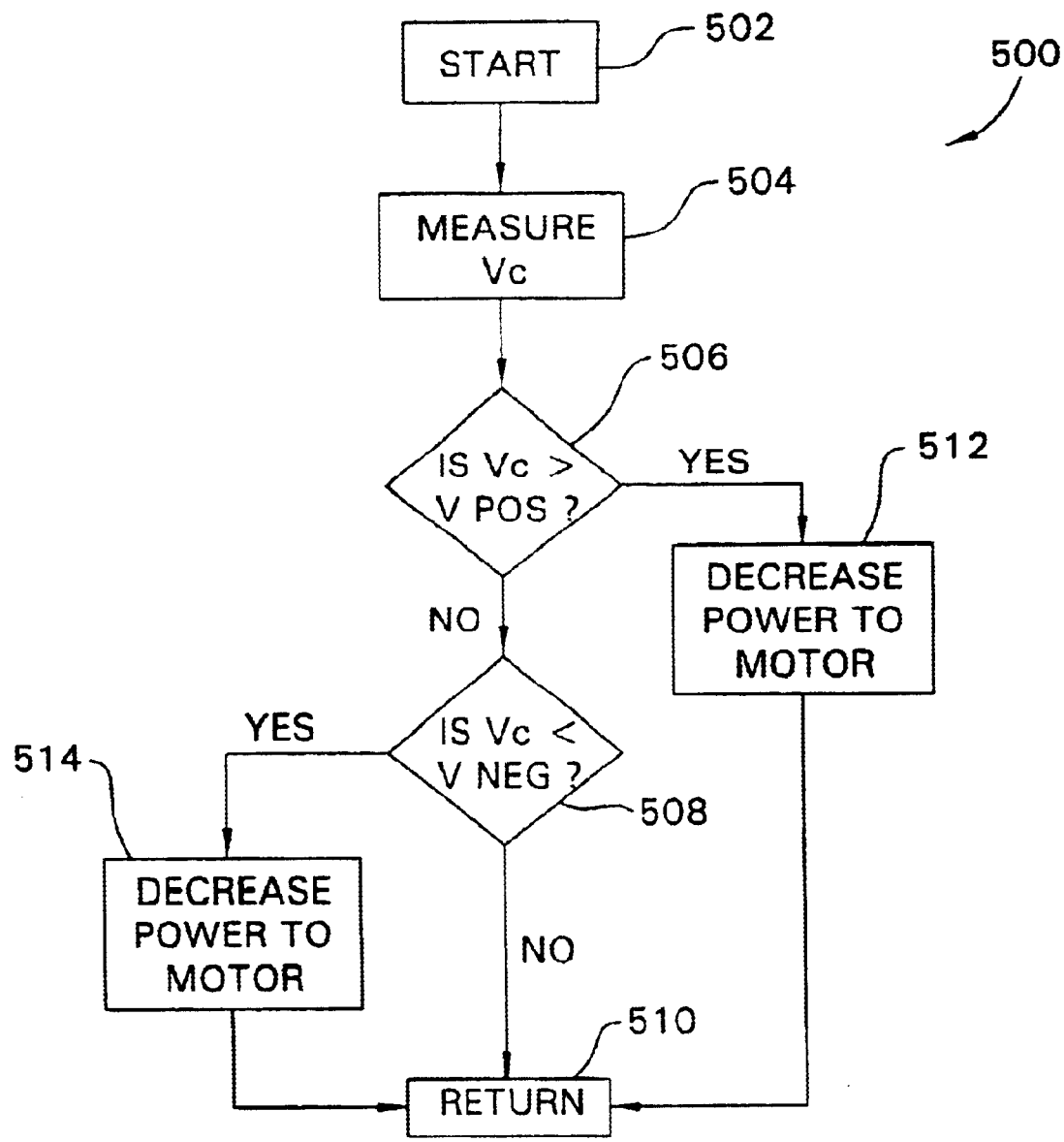
FIG. 25 is a block diagram of a carriage velocity maintenance subroutine 500.

In order to avoid changes in velocity due to changes in load on the motor 192, 292, a carriage velocity maintenance subroutine 500 shown in FIG. 25 has been incorporated into the main program executed by the processor 310 of the drive and control system 300.

The subroutine 500 of FIG. 25 operates as follows. Step 502 is the start of the subroutine 500. The subroutine 500 starts when called for in a main program executed by the processor 310. From step 502 the subroutine 500 advances to step 504.

At step 504, a drive motor voltage sensor unit includes a motor voltage sensor (not shown). The drive motor voltage sensor senses a voltage across the drive motor 192, 292. The sensor unit compares the voltage with a previously measured voltage across the drive motor 192, 292. The sensor unit determines a measured voltage change value Vc for the auxiliary wheel motor 192, 292 over a predetermined time period, which preferably is much less than one second. The subroutine 500 then advances to decision step 506.

Decision step 506 compares the measured voltage change value Vc with a predetermined positive voltage change value Vpos. If change value Vc is less than value Vpos, the subroutine 500 advances to decision step 508.

Decision step 508 compares the measured value Vc with a predetermined negative voltage change value Vneg. If Vc has a positive value or a negative value, which is not as great as Vneg, the subroutine advances to step 510.

At step 510, the subroutine 500 returns to the main program executed by the processor 310. In the above instances, the change in load applied to the auxiliary wheel motor 192, 292 did not cause a measured voltage change value Vc having a value great enough to execute any operation.

Returning to step 506, however, when the measured voltage change value Vc is greater than change value Vpos, the subroutine 500 advances to step 512.

At step 512, the following occurs. The processor 310 calculates a change in value for the power signal applied to the drive motor 192, 292. The change in value for the power signal is proportional to Vc. The processor 310 directs the power drive control circuit 332 to decrease power applied to the auxiliary wheel drive motor 192, 292 in view of the calculation. The decreased power maintains the auxiliary wheel drive motor 192, 292 at the chosen stored velocity. In this way, decreased resistance applied to the auxiliary wheels 136, 138 does not increase the velocity of the wheeled carriage 136, 236.

Following step 512, the subroutine 500 advances to step 510. At step 510, the subroutine 500 returns to the main program.

Returning to decision step 508, the subroutine 500 senses when the measured voltage change value Vc has a negative value greater than value Vneg. A sufficient negative value indicates an increase in load for the drive motor 192, 292 and a corresponding decrease in motor voltage. This advances the subroutine 500 to step 514.

At step 514, the following occurs. The processor 310 calculates a change in value for the power signal applied to the drive motor 192, 292. This change in value is proportional to the change value Vc. The processor 310 directs the power drive control circuit 332 to increase power applied to the auxiliary wheel drive motor 192, 292 in view of the calculation. The increased power maintains the auxiliary wheel drive motor 192, 292 at the chosen velocity. In this way, increased resistance applied to the auxiliary wheels 136, 138 does not decrease the velocity of the wheeled carriage 136, 236.

Following step 514, the subroutine 500 advances to step 510. At step 510, the subroutine 500 returns to the main program.

This concludes the description of the individual steps of the velocity maintenance subroutine 500 of FIG. 25. The block diagram of the program shown in FIG. 23 can quickly execute and return to subroutine 500 to maintain the velocity of the wheeled carriage 116, 216. The subroutine 500 quickly executes and outputs the changes to the power drive control circuit 332. Due to the fast operation of the computer program at steps 504, 506, 508, 512, and 514, the wheeled carriage 116 maintains a constant velocity. This is so despite the change in load on the auxiliary wheel drive motor 192, 292 caused by a change in characteristics of the wheel drive surface, such as from carpet to a tiled floor, or driving of the wheeled carriage 116, 216 up or down an inclined surface, such as a ramp.

The above subroutine 500 discloses increasing and decreasing power to the drive motor 192, 292. Of course, the preferred embodiment changes the length of positive or negative pulse width modulated signals to control power. In other embodiments, other types of power signals may be varied to provide the same effect.

In another embodiment, the system voltage, such as battery voltage is sensed. A change in voltage caused by the battery voltage decreasing and/or additional load on the motor 192 is measured. The measured voltage then controls power to the power drive control circuit 332.

Disconnect Arrangement

Figure 26:
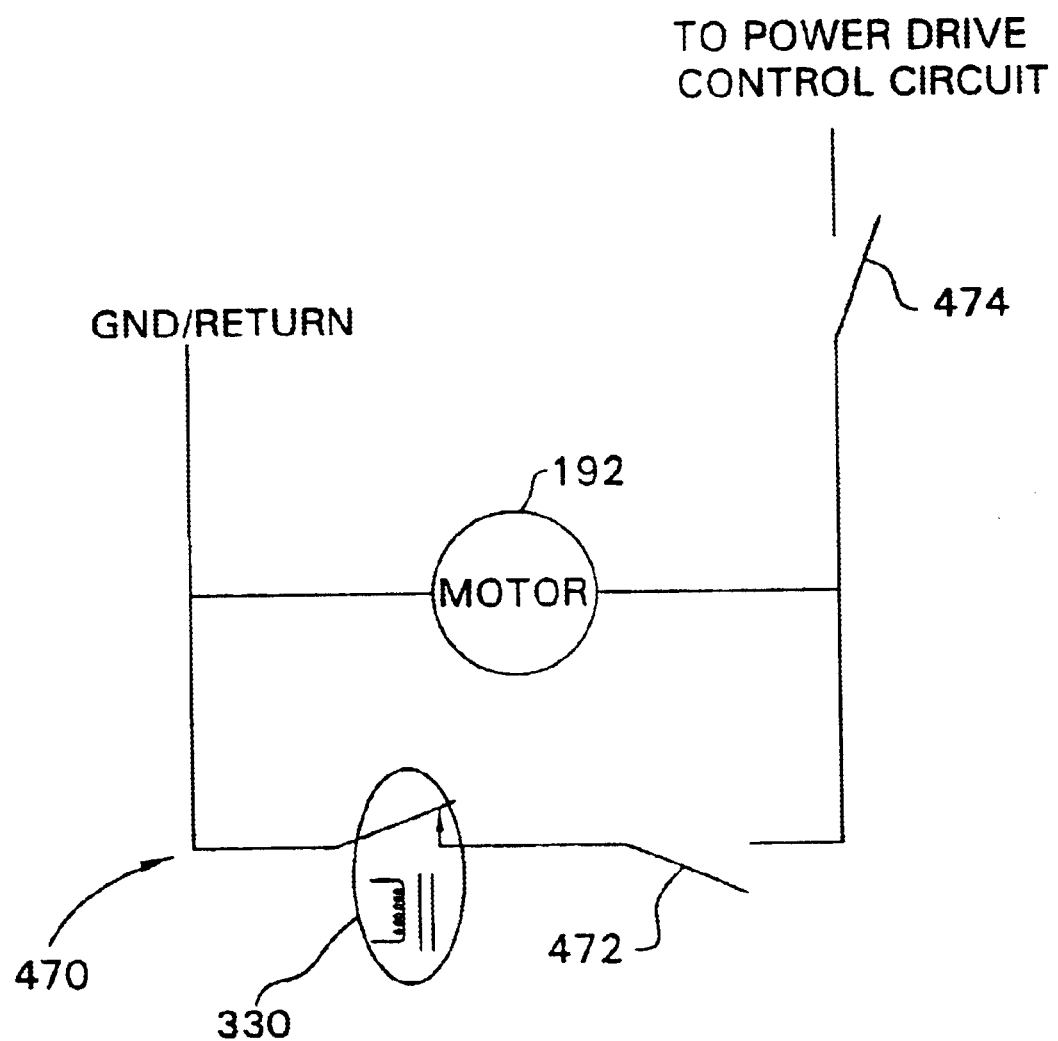
FIG. 26 is a portion of a motor control circuit for disconnecting power supply and open circuiting a drive motor.

FIG. 26 shows a portion of a motor control circuit for drive motor 192, 292. A drive motor power disconnect arrangement includes open circuit elements 472, 474.

Open circuit element 472 is series connected in a parallel circuit 470 with the motor disable relay 330 for short-circuiting the drive motor 192, 292 described above. As shown in FIG. 26, open circuit element 474 is series connected between the drive motor 192, 292 and the power drive control circuit 332.

A manual actuator (not shown) connects to the open circuit elements 472, 474. The manual actuator controls the open circuit elements 472, 474 to provide an open circuit to the drive motor 192, 292 and to open the parallel circuit 470.

Opening of the circuit elements 472, 474 enables an operator to manually move the wheeled carriage 116, 216. The motor 192, 292 provides no electromagnetic resistance because no back emf generated by the motor is carried to the opposing side of the motor or back to the power drive circuit 332.

While the circuit elements 472, 474 are open, the auxiliary wheel axle 194, 294 remains coupled to the drive motor 192, 292. However, the shaft of the drive motor 192, 292 and coupling transmission 193, 293 provide only minimal resistance to manual movement of the carriage 116, 216.

In operation, the operator pushes the wheeled carriage 116, 216 without assistance, except for the traction gained by the shortened wheelbase from deployment of the taller and wider auxiliary wheels 236, 238.

While manual operation is not preferred, manual operation is useful when the battery power for driving the wheeled carriage 216 is insufficient. Manual operation can also be selected when an operator is moving the carriage a short distance or when the battery power is at a decreased level.

The disconnect elements 472, 474 are normally closed switches. However, relays or other well-known electrical elements for breaking electrical circuits can be utilized. The manual actuator preferably is a single actuator for actuating both of the disconnect elements 472, 474 simultaneously.

In some embodiments, the manual actuator controls the motor disable relay 330 to open the parallel circuit 470. Thus, no disconnect element 472 is present in the parallel circuit 470. Such an arrangement decreases the number of required electrical elements.

Other embodiments for calculating the acceleration and deceleration rates, as well as the force threshold value Ft are within the scope of the invention. For example, the acceleration rates in the forward and reverse directions preferably are different. Further, the threshold values for the same force in forward and reverse directions can be different for the same speed of the wheeled carriage. Further, the threshold values and windows need not have a linear multiplier. Likewise, the acceleration rates can differ in a nonlinear fashion with respect to the measured force value F or the current velocity.

Third Embodiment

FIGS. 27–31 illustrate a third embodiment of the invention. Where possible, elements in FIGS. 27–31 that are the same as in the second embodiment have the same reference numeral except the prefix "2" is changed to the prefix "6". For example, the wheeled base 218 in FIGS. 11–20 is represented as element 618 in FIGS. 27–31.

The third embodiment utilizes the electrical drive and control system 300 and all of the features discussed above.

Except for the cam apparatus 600, shown in FIGS. 28–31, the third embodiment is almost identical in construction and function to the second embodiment. Thus description of the third embodiment will be limited to significant differences therein.

Figure 27:
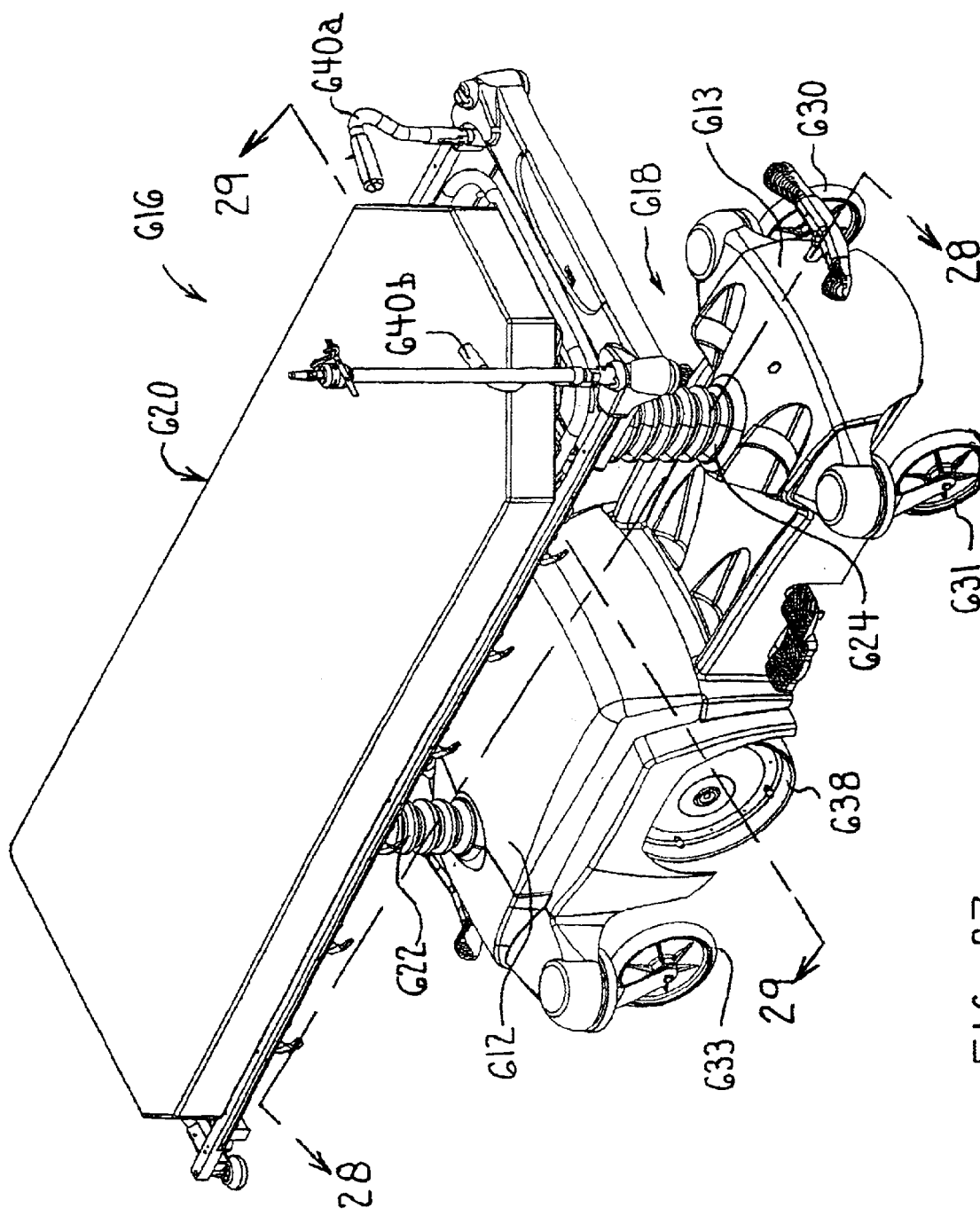
FIG. 27 is an isometric view of a third embodiment of a wheeled carriage for supporting a patient in a substantially horizontal position and embodying the invention.

FIG. 27 shows a wheeled carriage 616 including a patient support 620 mounted on jacks 622, 624. The jacks 622, 624 and castered wheels 630–633 are secured to a wheeled base 618. The carriage 616 includes a first front-covering member 613 covering a lower front bottom portion of the wheeled base 618 and a second rear-covering member covering a rear portion of the wheeled base. Control handles 640a, 640b are also shown in FIG. 27.

Figure 28:
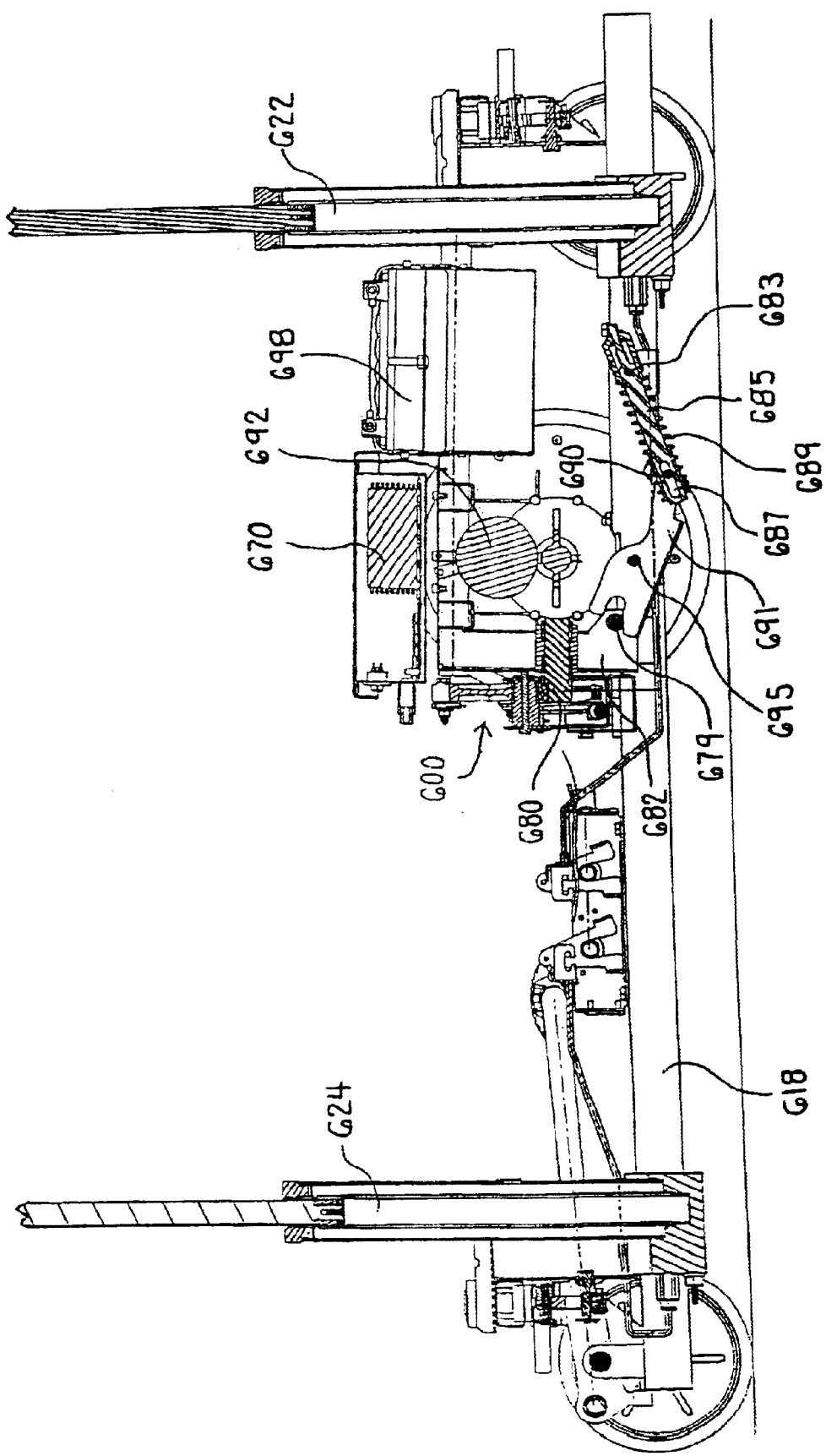
FIG. 28 is a cross-sectional view taken at 28—28 of FIG. 27 showing the wheeled carriage with the auxiliary wheels in the retracted position.

FIG. 28 shows essentially the same apparatus for moving the auxiliary wheels between retracted and deployed positions as shown in FIG. 12 of the second embodiment. A rod support post 683, push rod 685 with rod slot 687, rod spring 689, cross pin 690, lift linkage element 691, pivot pin 695, rolling element 679, cam follower support member 682 and cam follower 680 all operate in approximately the same fashion as in the second embodiment.

FIG. 28 also illustrates locating electronic unit 670 in a compartment above the auxiliary wheel drive motor 692. The electronic unit 670 includes elements of the drive and control system, such as the processor 310, the battery charger 324 and power drive control circuit 332 shown in FIG. 22. FIG. 28 also illustrates power supply container 698 for storing batteries.

Cam Apparatus

Cam apparatus 600 is almost identical to the cam apparatus of the second embodiment illustrated in FIGS. 11–14 and 17. The cam apparatus 600 is positioned on the wheeled base 618, as shown in FIG. 28. The cam apparatus 600 includes an elongate crank arm 601 fixedly secured at one end to a rotatable shaft 650. As in the second embodiment, the crank arm 601 pivotally connects to a first end of an elongate cam linkage member 602. A second end of the cam linkage member 602 pivotally connects to a top portion of a cam 604. The cam 604 rotates about a cam axle 608.

Figure 29:
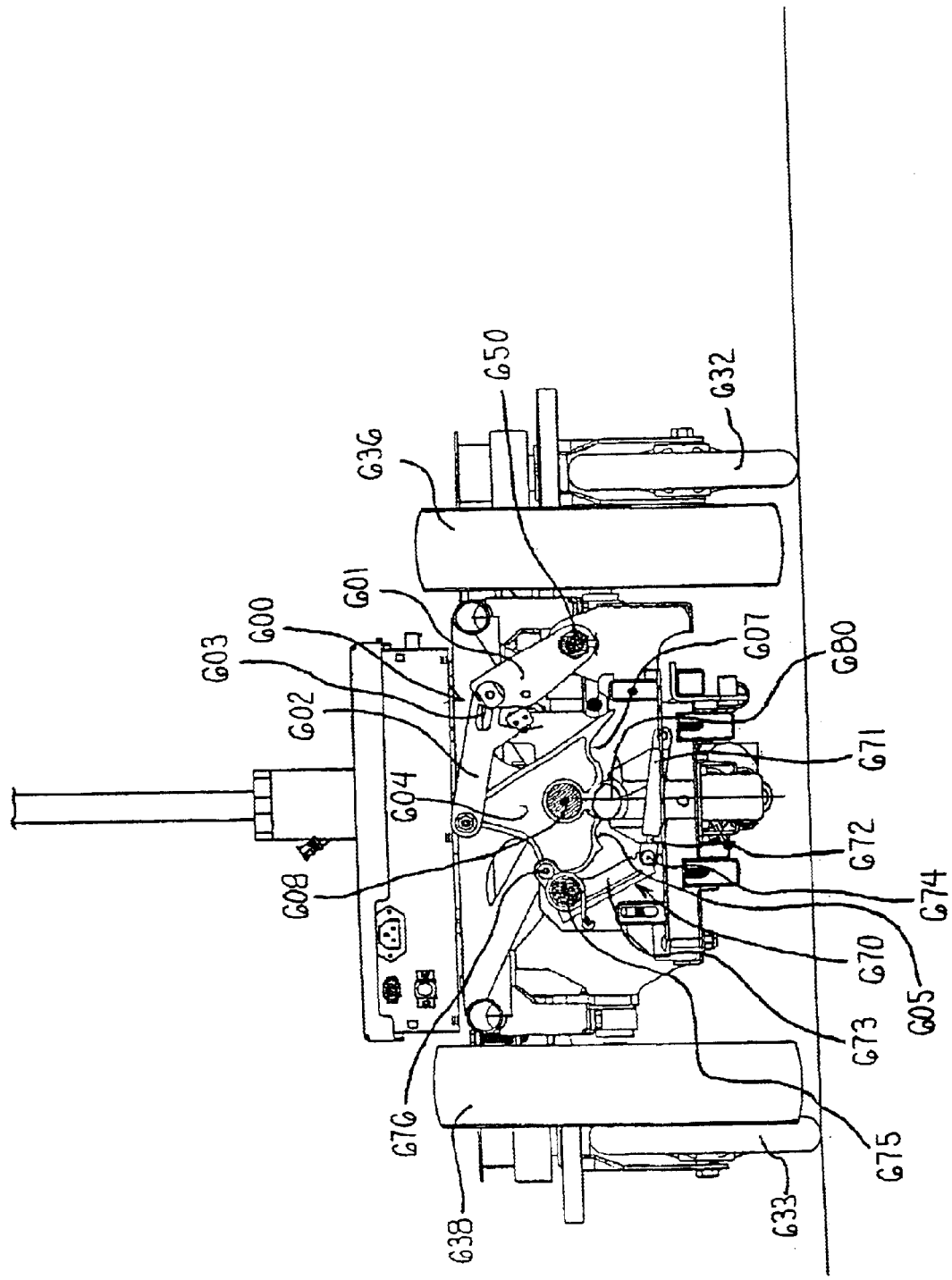
FIG. 29 is a cross sectional view taken at 29—29 of FIG. 27 showing a cam apparatus supporting a cam follower so that the auxiliary wheels are in a stored position.
Figure 30:
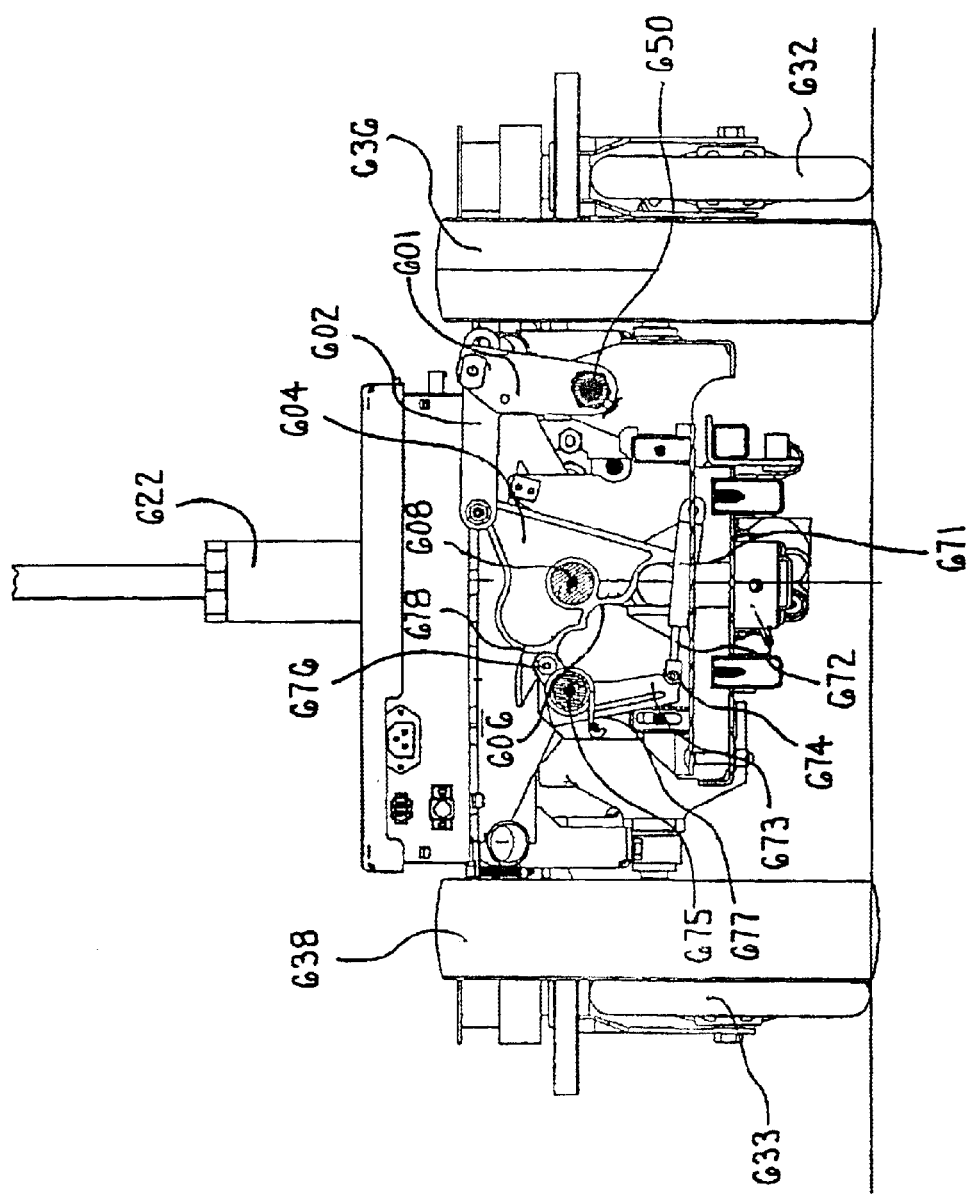
FIG. 30 is a cross-sectional view taken at 29—29 of FIG. 27 showing a cam apparatus supporting a cam follower when the auxiliary wheels are in a deployed position.
Figure 31:
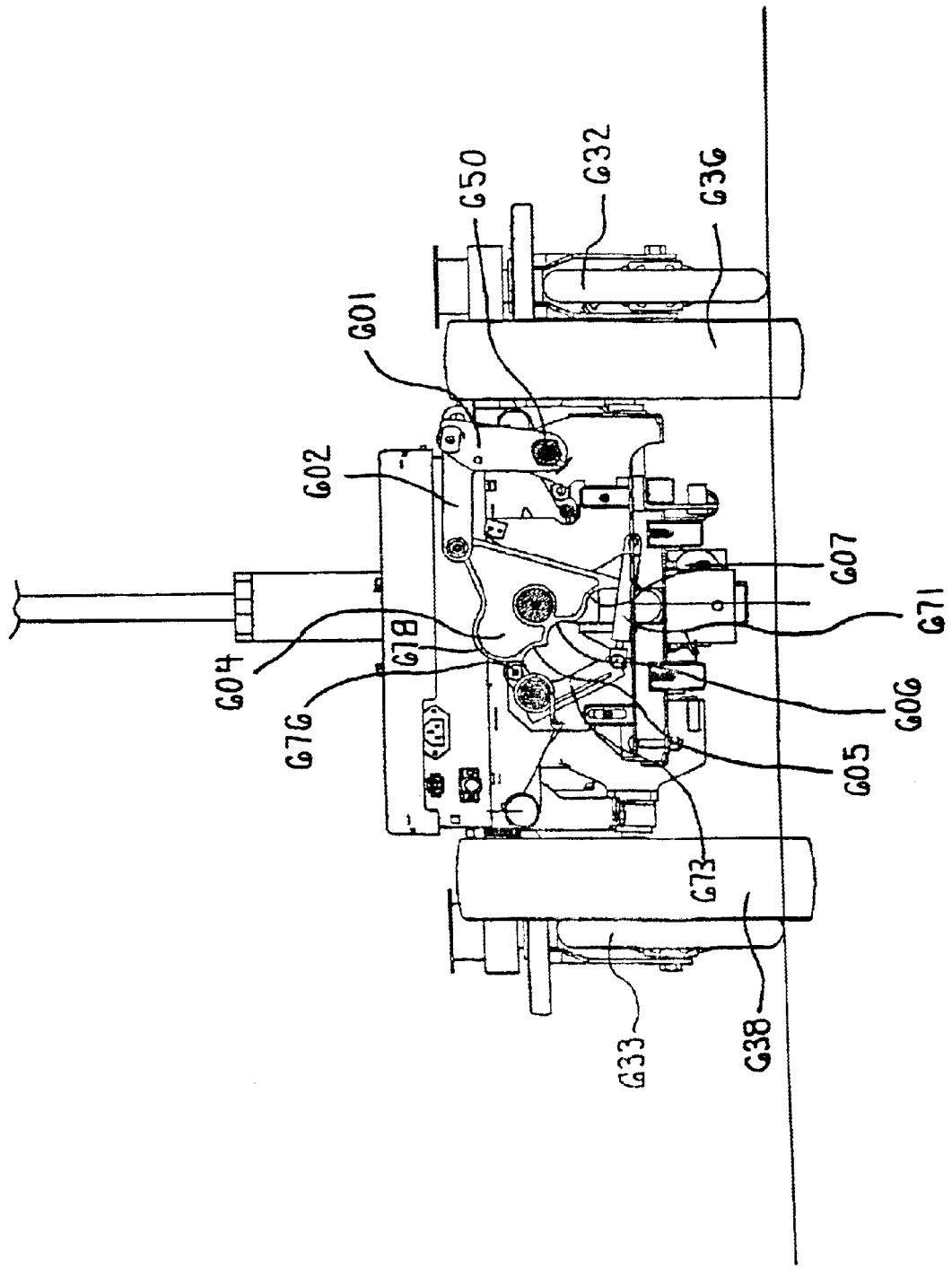
FIG. 31 is a cross-sectional view taken at 29—29 of FIG. 27 showing a cam apparatus supporting a cam follower when the auxiliary wheels are in an overtravel position.

As shown in FIGS. 29–31, the cam 604 includes a retracting depression 606 for receiving the cam follower 680 and a separate deployment depression 607 for receiving the cam follower. The cam 604 also includes an assembly depression 605.

The assembly depression 605 only is used during assembly of the cam apparatus 600 and retraction damper unit 670. Unlike the second embodiment, in use, the depression 605 does not receive the cam follower 680.

In the second embodiment, in the braking mode, the cam apparatus 200 rotates the cam 204 into the third depression 605 when the wheeled carriage 216.

In the third embodiment, the cam linkage member slot 603 in the cam linkage member 602 enables additional rotation of the shaft 650 coupled to the crank arm 601 without movement of the cam 604.

As in the second embodiment, a foot pedal rotates the shaft 650 and thus the crank arm 601. The crank arm 601 rotates the cam 604 via the linkage member 602. Rotation of the cam 604 acts upon the cam follower 680 so that the cam follower is positioned in one of two locations. When the cam follower 680 is in the retraction depression 606 shown in FIG. 29, the auxiliary wheels 636, 638 are raised from the floor surface. In the retracted position, the four castered wheels 630–633 support the wheeled carriage 616. When the cam follower 680 is moved into the deployment depression 607 shown in FIG. 30, the auxiliary wheels 636, 638 are deployed against the floor surface. Then auxiliary wheels 636, 638 and a pair of the castered wheels 630–633 support the wheeled carriage 616. Thus, the cam apparatus 600 operates in the same manner as described in detail above for the second embodiment.

FIG. 31 illustrates the cam apparatus 600 with the auxiliary wheels 636, 638 in the overtravel position. In this position, the cam follower 680 moves downwardly away from the deployment depression 607. As in the second embodiment, push rod 685 and rod spring 689 provide a downward biasing force for lowering the auxiliary wheels 636, 638 by moving the entire rear section, including the drive motor 692, electronic unit 670 and power supply container 698 downwardly about a pivot point at a rear end of the wheeled carriage 116.

Retraction Damper Unit

The third embodiment includes a retraction damper unit 670. The retraction damper unit 670 is not present in either of the first and second embodiments of the cam apparatus. The retraction damper unit 670 slows or dampens movement of the auxiliary wheels 636, 638 from the deployed position shown in FIG. 30 to the retracted position shown in FIG. 29. By slowing movement of the auxiliary wheels 636, 638, the retraction damper unit 670 slows movement of the pair of castered wheels 630–633, which are out of contact with the floor surface. Thus, the retraction damper unit 670 prevents sudden contact of a pair of raised castered wheels with the floor surface when the auxiliary wheels 636, 638 are retracted.

As shown in FIGS. 29–31, the retraction damper unit 670 includes a damper 671 pivotally connected at a first end to the wheeled base 618. A second end of the damper 671 includes a damper rod 672. A first end of an L-shaped linkage member 673 pivotally connects at movable damper pivot element 674 to the damper rod 672. A fixed damper pivot element 675 fixes the L-shaped linkage member 673 to the cam apparatus 600. The pivot element 675 allows pivoting of the L-shaped linkage member 673 about a second end of an elongate portion of the L-shaped member. A shortened leg of the L-shaped linkage member 673 extends outwardly from the pivot element 675. The shortened leg includes a damper roller 676 at the outwardly projecting end thereof. The damper roller 676 is configured to contact a damping cam surface 678 of the cam 604. A torsional spring element 677 biases the damper roller 676 against the cam surface.

Operation of the Retraction Damper Unit

As discussed above, the purpose of the retraction damper unit 670 is to dampen movement of the cam 604 (auxiliary wheels 636, 638) during transition between the deployed state shown in FIG. 30 and the retracted state shown in FIG. 29.

Retraction of the auxiliary wheels from the deployed state shown in FIG. 30 occurs as follows. The operator pushes one of the foot pedals to rotate the shaft 650. The shaft 650 rotates the crank arm 601 and thus rotates the cam 604 via linkage member 602. The cam 604 is rotated in a counter-clockwise direction relative to the direction of view in FIGS. 29 and 30.

As the cam 604 rotates, the damping cam surface 678, which projects outwardly relative to other portions of the cam surface, contacts and applies a force against the damper roller 676. However, the damper roller 676 is mounted to the L-shaped linkage member 673, which is fixed by pivot element 675. Thus, the damper roller 676 pivots the linkage member 673.

Pivoting of the linkage member 673 moves the damper rod 672 toward the damper 671. The damper 671 resists inward movement of the damper rod 672. The resistance to movement acts as a resistance force. The resistance force transfers back through the linkage member 673 to the damper roller 676. The damper roller 676 provides the resistance force against the damping cam surface 678 to resist rotation of the cam 604. In this manner, the retraction damper unit 670 prevents sudden retraction of the auxiliary wheels 636, 638. The cam 604 rotates until the cam follower 680 is positioned in the retracting depression 606.

When the auxiliary wheels 636, 638 are deployed, the retraction damper unit 670 does not provide resistance. The cam 604 rotates in a clockwise direction, relative to the direction of view in FIGS. 29 and 30, to deploy the auxiliary wheels 636, 638. The damper 671 provides no significant resistance to extension of the damper rod 672. Thus, the damper rod 672 moves outwardly from a retracted position without resistance against deployment of the auxiliary wheels 636, 638. Thus, during deployment of the auxiliary wheels 636, 638, no damping effect occurs. During deployment, the cam 604 advances until the cam follower 680 is positioned in the deployment depression 607.

While the terms "damper" and "damping" are used throughout the specification and claims, the terms are not limited to lessening the peaks of force or energy. The terms also can include a resistance or force opposing motion of a member or element a predetermined amount, not sufficient to prevent movement thereof.

Although particular preferred embodiments of the invention have been disclosed in detail for illustrative purposes, it will be recognized that variations or modifications of the disclosed apparatus, including the rearrangement of parts, lie within the scope of the present invention.

What is claimed is:

1. A wheeled carriage for supporting a patient in a substantially horizontal position, comprising:

a patient support having a length, opposing ends of the length comprising a head end and a foot end of said patient support, said patient support having a pair of lateral sides intermediate the head and foot ends;

a wheeled base having a length and supporting said patient support and enabling movement of said patient support, said wheeled base including at least four floor surface engaging wheels spaced from one another, said wheeled carriage having a first edge corresponding to the head end of said patient support and a second edge corresponding to the foot end of said patient support, said wheeled base having an imaginary transverse centerline located at a midpoint of the length of said wheeled base and dividing said wheeled base;

an auxiliary wheel support structure secured to said wheeled base and suspendedly supporting at least one auxiliary wheel at an axis thereof to said wheeled base, wherein the axis of said at least one auxiliary wheel is spaced from the centerline at the midpoint of said wheeled base toward the second edge of said wheeled base, said auxiliary wheel support structure including a pair of spaced parallel frame members secured at first ends to said wheeled base and secured at second ends to a cross bar, said cross bar supporting a support member including a cam follower and a roller member; and a control apparatus for controlling said auxiliary wheel support structure to move said at least one auxiliary wheel between a first deployed position whereat said at least one auxiliary wheel is engaged with a floor surface and a second stored position whereat said auxiliary wheel is out of engagement with the floor surface, wherein, when a portion of the floor surface has a lower depth directly below said deployed auxiliary wheel such that the four surface engaging wheels engage the floor surface, said auxiliary wheel support structure enables downward movement of said at least one auxiliary wheel from said deployed position so that said auxiliary wheel maintains contact with the floor surface.

2. The wheeled carriage of claim 1, wherein said at least one auxiliary wheel is uncastered and has a height greater than the height of said floor engaging wheels and a width greater than the width of said floor engaging wheels.

3. The wheeled carriage of claim 1, wherein said at least one auxiliary wheel comprises first and second parallel aligned auxiliary wheels having the same axis of rotation.

4. The wheeled carriage of claim 1, wherein said control apparatus comprises a rotatable shaft for rotation by a user and a cam apparatus responsive to the rotation.

5. The wheeled carriage of claim 4, wherein said cam apparatus further comprises an elongate crank arm fixed at one end to said rotatable shaft and pivotably secured at a second end to a first end of an elongate cam linkage member, a second end of said cam linkage member being pivotably connected to a cam.

6. The wheeled carriage of claim 5, wherein said cam coacts with said cam follower to move said at least one auxiliary wheel between the first deployed position and the second stored position.

7. The wheeled carriage of claim 1, wherein said auxiliary wheel support structure supports a motor for selectively driving said auxiliary wheel.

8. The wheeled carriage of claim 1, wherein said auxiliary wheel support structure includes a linkage element pivotally secured to said wheeled base, said linkage element at a first end having an opening receiving said roller member.

9. The wheeled carriage of claim 8, wherein said auxiliary wheel support structure includes a push rod pivotally secured at a first end to said wheeled base and pivotally and slidably secured at a second end to said linkage element.

10. The wheeled carriage of claim 9, said auxiliary wheel support structure including a rod spring mounted about and along the length of said push rod for applying a biasing force at ends thereof, wherein, when said deployed auxiliary wheel is positioned at the portion of the floor surface such that the four surface engaging wheels engage the floor surface, said rod spring applies a biasing force through said linkage element and said roller member to move said auxiliary wheel downwardly to maintain contact with the floor surface.

11. The wheeled carriage of claim 9, said push rod including a rod slot at the second end thereof and a cross pin extending through the rod slot and secured to said linkage element to enable pivoting of said rod and said linkage element, and wherein the rod slot enables said linkage element to move toward said rod when the lengths of said rod and said linkage element are substantially in alignment with each other, so that said rod and said linkage element are capable of pivoting to an upright position or a downward position.

12. A wheeled carriage for supporting a patient in a substantially horizontal position, comprising:

a patient support having a length, opposing ends of the length comprising a head end and a foot end of said patient support, said patient support having a pair of lateral sides intermediate the head and foot ends;

a wheeled base having a length and supporting said patient support and enabling movement of said patient support, said wheeled base including at least four floor surface engaging wheels spaced from one another, said wheeled carriage having a first edge corresponding to the head end of said patient support and a second edge corresponding to the foot end of said patient support, said wheeled base having an imaginary transverse centerline located at a midpoint of the length of said wheeled base and dividing said wheeled base;

an auxiliary wheel support structure secured to said wheeled base and suspendedly supporting at least one auxiliary wheel at an axis thereof to said wheeled base, wherein the axis of said at least one auxiliary wheel is spaced from the centerline at the midpoint of said wheeled base toward the second edge of said wheeled base, said auxiliary wheel support structure including a floating frame; and a control apparatus for controlling said auxiliary wheel support structure to move said at least one auxiliary wheel between a first deployed position whereat said auxiliary wheel is engaged with a floor surface and a second stored position whereat said auxiliary wheel is out of engagement with the floor surface, wherein, when a portion of the floor surface has a lower depth directly below said at least one deployed auxiliary wheel such that the four surface engaging wheels engage the floor surface, said floating frame of said auxiliary wheel support structure moves downwardly along with said at least one auxiliary wheel mounted thereto to maintain said at least one auxiliary wheel in contact with the lowered floor surface.

13. A wheeled carriage for supporting a patient in a substantially horizontal position, comprising:

a patient support having a length, opposing ends of the length comprising a head end and a foot end of said patient support, said patient support having a pair of lateral sides intermediate the head and foot ends;

a wheeled base having a length and supporting said patient support and enabling movement of said patient support, said wheeled base including at least four floor surface engaging wheels spaced from one another, said wheeled carriage having a first edge corresponding to the head end of said patient support and a second edge corresponding to the foot end of said patient support, said wheeled base having an imaginary transverse centerline located at a midpoint of the length of said wheeled base and dividing said wheeled base;

an auxiliary wheel support structure secured to said wheeled base and suspendedly supporting at least one auxiliary wheel at an axis thereof to said wheeled base, wherein the axis of said at least one auxiliary wheel is spaced from the centerline at the midpoint of said wheeled base toward the second edge of said wheeled base, said auxiliary wheel support structure including a loading frame pivotally mounted to said wheeled base and a floating frame mounted to said loading frame; and a control apparatus for controlling said auxiliary wheel support structure to move said at least one auxiliary wheel between a first deployed position whereat said auxiliary wheel is engaged with a floor surface and a second stored position whereat said auxiliary wheel is out of engagement with the floor surface, wherein, when a portion of the floor surface has a lower depth directly below said at least one deployed auxiliary wheel such that the four surface engaging wheels engage the floor surface, said floating frame of said auxiliary wheel support structure moves downwardly along with said at least one auxiliary wheel mounted thereto to maintain said at least one auxiliary wheel in contact with the lowered floor surface.

14. The wheeled carriage of claim 13, wherein said loading frame pivotally supports said floating frame.

15. The wheeled carriage of claim 14, wherein said floating frame is unbiased to enable pivoting movement in an upward or downward direction.

16. The wheeled carriage of claim 14, wherein said at least one auxiliary wheel comprises first and second parallel aligned auxiliary wheels supported by a single auxiliary wheel axle, said axle secured to said floating frame.

17. The wheeled carriage of claim 16, wherein said loading frame comprises two frame members secured at first ends to said wheeled base and secured at second ends to a cross bar.

18. The wheeled carriage of claim 17, wherein said loading frame includes a cam follower mounted to said cross bar and first and second slotted elements mounted to said two frame members adjacent the second ends thereof, each slotted element having a vertical slot.

19. The wheeled carriage of claim 18, wherein said auxiliary wheel axle secured to said floating frame extends through said vertical slots, said auxiliary wheels being mounted at the ends of said auxiliary wheel axle outwardly from said slotted elements.

20. The wheeled carriage of claim 17, wherein said floating frame includes first and second beams pivotally secured at respective first ends to said first and second frame members of said loading frame, said first and second beams supporting a plate element therebetween.

21. The wheeled carriage of claim 20, wherein said first and second beams have apertures aligned parallel to the imaginary transverse centerline, said apertures enabling passage of said auxiliary wheel axle therethrough, said auxiliary wheel axle being rotatably mounted to said floating frame.

22. The wheeled carriage of claim 18, wherein said control apparatus comprises a cam apparatus and at least one spring for biasing said loading frame to a raised position so that said auxiliary wheels move to the stored position with said auxiliary wheel axle resting at a lower portion of the vertical slots.

23. The wheeled carriage of claim 22, wherein said control apparatus controls said cam apparatus to coact with said cam follower to lower said loading frame to a position corresponding to the deployed position with said auxiliary wheel axle positioned at an upper end of the vertical slots.

24. The wheeled carriage of claim 12, including a motor mounted to said floating frame for driving said auxiliary wheel, and wherein, when the portion of the floor surface having the lower depth is directly below said deployed auxiliary wheel such that the four surface engaging wheels engage the floor surface, said floating frame has a predetermined weight and pivots the auxiliary wheel downwardly, such that said at least one auxiliary wheel maintains sufficient contact to retain drive traction at the lowered floor surface.

25. A power assisted wheeled carriage for supporting a patient in a substantially horizontal position, comprising:
a patient support having a length, opposing ends of the length comprising a head end and a foot end of said patient support, said patient support having a pair of lateral sides intermediate the head and foot ends;
a wheeled base having a length and supporting said patient support and enabling movement of said patient support, said wheeled base including at least four floor surface engaging wheels spaced from one another, said wheeled carriage having a first edge corresponding to the head end of said patient support and a second edge corresponding to the foot end of said patient support;
an auxiliary wheel support structure secured to said wheeled base and suspendedly supporting at least one auxiliary wheel about an axis transverse to the length of said wheeled base;
a control apparatus for controlling said auxiliary wheel support structure to move said at least one auxiliary wheel between a first deployed position in contact with a floor surface, and a second stored position whereat said at least one auxiliary wheel is out of engagement with the floor surface;
an auxiliary wheel drive power circuit for driving said at least one auxiliary wheel;
a processor for controlling the auxiliary wheel drive power circuit to control acceleration, deceleration, velocity and direction of driving of said at least one auxiliary wheel;
a drive member at an end of said wheeled carriage for receiving a force input from a user in one of first and second opposing directions; and
a load cell for measuring the force input applied to said drive member, and providing an output to said processor,
wherein said processor controls driving of said at least one auxiliary wheel in response to the force input and the direction of the force input applied to said drive member.

26. The power assisted wheeled carriage of claim 25, wherein, when the deployed auxiliary wheel engages a floor surface, two of said floor engaging wheels adjacent said foot end of said wheeled carriage are elevated away from the floor surface.

27. The power assisted wheeled carriage of claim 25, wherein said drive member comprises a handle.

28. The power assisted wheeled carriage of claim 26, wherein, when a portion of the floor surface has a lower depth directly below said at least one deployed auxiliary wheel such that the four surface engaging wheels engage the floor surface, said auxiliary wheel support structure enables downward movement of said at least one auxiliary wheel from said deployed position so that said auxiliary wheel maintains contact with the floor surface.

29. The power assisted wheeled carriage of claim 25, wherein said wheeled base has an imaginary transverse centerline located at a midpoint of the length of said wheeled base and dividing said wheeled base, and wherein the axis of said at least one auxiliary wheel is spaced from the centerline at the midpoint of said wheeled base toward the second edge of said wheeled base.

30. The power assisted wheeled carriage of claim 25, including a force transfer element for transferring force applied to said drive member to said load cell.

31. The power assisted wheeled carriage of claim 25, wherein said drive member effectively remains stationary during application of the force to said load cell.

32. The power assisted wheeled carriage of claim 25, wherein the output from said load cell comprises a drive signal value, and said processor compares the drive signal value with a drive signal threshold value, and does not change the velocity of said wheeled carriage when the drive signal value is less than the drive signal threshold value.

33. A power assisted wheeled carriage for supporting and transporting a person in a substantially horizontal position, comprising:
a patient support having a length, opposing ends of the length comprising a head end and a foot end of said patient support;
a wheeled base having a length and supporting said patient support and enabling movement of said patient support, said wheeled base including at least four floor surface engaging wheels spaced from one another, said wheeled carriage having a first edge corresponding to the head end of said patient support and a second edge corresponding to the foot end of said patient support;

an auxiliary wheel support structure secured to said wheeled base and for supporting at least one auxiliary wheel about an axis transverse to the length of said wheeled base, and moving said at least one auxiliary wheel into a first deployed position contacting the floor and a second stored position out of engagement with the floor;

a drive motor for driving said auxiliary wheel;

a power drive control circuit for controlling said drive motor;

a drive member mounted on the wheeled carriage for providing a drive signal in one of a first direction and a second opposing direction;

a drive and control system for receiving the drive signal and for driving said at least one auxiliary wheel by providing a power signal to said power drive control circuit; and a drive motor disconnect arrangement for open circuiting said drive motor from said power drive control circuit to enable manually powered movement of said wheeled carriage, said drive motor disconnect arrangement including first and second disconnect elements for disconnecting said drive motor from said power drive control circuit and from a parallel circuit.

34. The power assisted wheeled carriage of claim 33, wherein said drive motor disconnect arrangement includes a manual actuator for manually actuating said first and second disconnect elements.

35. The power assisted wheeled carriage of claim 33, wherein said parallel circuit includes a motor disable relay.

36. A power assisted wheeled carriage for supporting and transporting a person in a substantially horizontal position, comprising:

a patient support having a length, opposing ends of the length comprising a head end and a foot end of said patient support;

a wheeled base having a length and supporting said patient support and enabling movement of said patient support;

an auxiliary wheel support structure secured to said wheeled base and suspendedly supporting at least one auxiliary wheel at an axis thereof to said wheeled base;

a control apparatus for controlling said auxiliary wheel support structure to move said at least one auxiliary wheel between a first deployed position whereat said auxiliary wheel is engaged with a floor surface and a second stored position whereat said auxiliary wheel is out of engagement with the floor surface;

a drive motor for driving said auxiliary wheel;

a power drive control circuit for controlling said drive motor;

a drive member for receiving an input from a user in one of a first direction and a second opposing direction;

an input measuring device for measuring the input from the drive member and providing a drive signal;

a drive and control system for receiving the drive signal from said input measuring device, said drive and control system comparing the value of the drive signal with a drive signal threshold value, and providing a power signal to said power drive control circuit for driving said at least one auxiliary wheel in response to the value of the drive signal and the direction of the drive signal when the drive signal value exceeds the drive signal threshold value.

37. The power assisted wheeled carriage of claim 36, wherein the input from a user comprises a force input and said input measuring device comprises a force measuring device.

38. The power assisted wheeled carriage of claim 37, wherein said force measuring device comprises a load cell.

39. The power assisted wheeled carriage of claim 36, wherein said drive member remains essentially stationary when applying the input to the input measuring device.

40. The power assisted wheeled carriage of claim 36, wherein said drive and control system varies the drive signal threshold value in response to the velocity of the vehicle.

41. The power assisted wheeled carriage of claim 40, wherein the drive signal threshold value increases at increasing velocities of the carriage.

42. The power assisted wheeled carriage of claim 36, wherein, when the wheeled carriage is traveling in a first direction and the drive signal is in the first direction, said drive and control system accelerates the wheeled carriage.

43. The power assisted wheeled carriage of claim 42, wherein, when the wheeled carriage is traveling in a first direction and the drive signal is in the second opposing direction, said drive and control system decelerates the wheeled carriage.

44. The power assisted wheeled carriage of claim 43, wherein, when the wheeled carriage is traveling in a first direction and the drive signal is in the second opposing direction for an extended time period, said drive and control system decelerates the wheeled carriage moving in the first direction, stops the wheeled carriage, and accelerates the wheeled carriage in the second opposing direction.

45. The power assisted wheeled carriage of claim 36, wherein the drive motor comprises a DC electric motor, and the power signal comprises electric pulses having a calculated width supplied to the DC electric motor.

46. The power assisted wheeled carriage of claim 36, including four castered wheels, with one of said castered wheels mounted at each opposing corner at each opposing end of said wheeled base.

47. The power assisted wheeled carriage of claim 36, wherein said wheeled base includes at least four floor surface engaging wheels spaced from one another, and said wheeled carriage has a first edge corresponding to the head end of said patient support and a second edge corresponding to the foot end of said patient support, and said wheeled base having an imaginary transverse centerline located at a midpoint of the length of said wheeled base and dividing said wheeled base, and wherein the axis of said at least one auxiliary wheel is spaced from the centerline at the midpoint of said wheeled base toward the second edge of said wheeled base.

48. The power assisted wheeled carriage of claim 47, wherein at the first deployed position, when said auxiliary wheel engages the floor surface, two of said floor surface engaging wheels adjacent said foot end of said wheeled carriage are elevated away from and out of contact with the floor surface when the floor surface is even.

49. The power assisted wheeled carriage of claim 36, wherein the drive and control system provides a ramping effect for the wheeled carriage.

50. A method for driving a power assisted wheeled carriage used for supporting and transporting a person in a substantially horizontal position, the carriage including a patient support having a length, opposing ends of the length comprising a head end and a foot end of said patient support, a wheeled base having a length and supporting said patient support and enabling movement of said patient support, an auxiliary wheel support structure secured to said wheeled base and for biasing at least one auxiliary wheel into a first position contacting the floor and a second raised position out of engagement with the floor, and a drive motor for driving said at least one auxiliary wheel, the method including the steps of:

(a) sensing the presence of a force input by an operator to a drive member for controlling driving of said at least one auxiliary wheel in a first direction, and when the force input is absent, maintaining the velocity of said at least one auxiliary wheel and returning to a main program; and (b) measuring magnitude of the force input and direction of the force input applied by the operator, and (i) when the direction of the force input is in the direction as previously sensed, sensing if the velocity is at a maximum velocity, and (1) maintaining the velocity of the wheeled carriage when the velocity is at a maximum value, and (2) when the velocity is not at a maximum value, using the magnitude of the force input to determine an acceleration rate;

(ii) when the direction of the force input is not in the direction as previously sensed, sensing if the velocity is at zero velocity, and (1) when the velocity of the wheeled carriage is at zero, using the force input to determine an acceleration rate in the direction of the force applied by the operator, and (2) when the velocity is not at zero, using the force to determine a deceleration rate.

51. The method for driving a power assisted wheeled carriage of claim 50, wherein the step of sensing the presence or absence of the force input is calculated by comparing a value of the measured force with a force threshold value.

52. The method for driving a power assisted wheeled carriage of claim 51, wherein the force threshold value increases when the velocity of the auxiliary wheel increases.

53. The method for driving a power assisted wheeled carriage of claim 50, including a drive member for receiving the force input from the operator.

54. The method for driving a power assisted wheeled carriage of claim 53, wherein the step of measuring the force input includes a load cell secured to said drive member, the load cell sensing the force input applied to the drive member.

55. The method for driving a power assisted wheeled carriage of claim 50, including the steps of:

sensing presence of an operator's hand on the drive member, and executing a controlled stop of the wheeled carriage when the operator's hand is not on the drive member.

56. The method for driving a power assisted wheeled carriage of claim 50, including the step of applying a power signal to the drive motor to control and drive the wheeled carriage at the determined acceleration or deceleration rate.

57. The method for driving a power assisted wheeled carriage of claim 53, including determining essentially no change in the force input for a predetermined time period indicating an operator release of the drive member, wherein, in response to the essentially no change in the force input during the time period, the drive and control system stops movement of the wheeled carriage.

58. A power assisted wheeled carriage for supporting and transporting a person in a substantially horizontal position, comprising:

a patient support having a length, opposing ends of the length comprising a head end and a foot end of said patient support;

a wheeled base having a length and supporting said patient support and enabling movement of said patient support, said wheeled base including at least four floor surface engaging wheels spaced from one another, said wheeled carriage having a first edge corresponding to the head end of said patient support and a second edge corresponding to the foot end of said patient support;

an auxiliary wheel support structure secured to said wheeled base and for supporting at least one auxiliary wheel about an axis transverse to the length of said wheeled base, and moving said at least one auxiliary wheel into a first deployed position contacting the floor and a second stored position out of engagement with the floor;

a drive motor for driving said auxiliary wheel;

a power drive control circuit for controlling said drive motor;

a drive member mounted on the wheeled carriage for providing a drive signal in one of a first direction and a second opposing direction;

a drive and control system for receiving the drive signal and for driving said at least one auxiliary wheel by providing a power signal to said power drive control circuit; and a drive motor disabling device for providing a parallel electrical connection across said drive motor to prevent a voltage improperly applied to said drive motor from powering said drive motor and to resist or slow uncontrolled movement of said wheeled carriage.

59. The power assisted wheeled carriage of claim 58, wherein said drive motor disabling device comprises a motor disable relay.

60. A power assisted wheeled carriage for supporting and transporting a person in a substantially horizontal position, comprising:

a patient support having a length, opposing ends of the length comprising a head end and a foot end of said patient support;

a wheeled base having a length and supporting said patient support and enabling movement of said patient support, said wheeled base including at least four floor surface engaging wheels spaced from one another, said wheeled carriage having a first edge corresponding to the head end of said patient support and a second edge corresponding to the foot end of said patient support;

an auxiliary wheel support structure secured to said wheeled base and for supporting at least one auxiliary wheel about an axis transverse to the length of said wheeled base, and moving said at least one auxiliary wheel into a first deployed position contacting the floor and a second stored position out of engagement with the floor;

a drive motor for driving said auxiliary wheel;

a power drive control circuit for controlling said drive motor;

a drive member mounted on the wheeled carriage for providing a drive signal in one of a first direction and a second opposing direction;

a drive and control system for receiving the drive signal and for driving said at least one auxiliary wheel by providing a power signal to said power drive control circuit; and a voltage system sensor unit for sensing a change in system voltage over a predetermined time and calculating a measured voltage change value, wherein said drive and control system, compares said measured voltage change value with a predetermined value, and when said measured value is greater than the predetermined value, said drive and control system changes the power signal to said power drive control circuit to maintain the velocity of said wheeled carriage at a constant velocity.

61. The power assisted wheeled carriage of claim 60, wherein said voltage system sensor unit comprises a drive motor voltage sensor unit for sensing change in voltage across the drive motor caused by an increase or decrease in an electrical load to said motor.

62. The power assisted wheeled carriage of claim 61, wherein driving of said wheeled carriage from a smooth surface onto a rough surface increases resistance or resistive force applied to said drive motor through said at least one auxiliary wheel, increases the electrical load to said motor, while simultaneously decreasing voltage across said drive motor.

63. A wheeled carriage for supporting a patient in a substantially horizontal position, comprising:

a patient support having a length, opposing ends of the length comprising a head end and a foot end of said patient support, said patient support having a pair of lateral sides intermediate the head and foot ends;

a wheeled base having a length and supporting said patient support and enabling movement of said patient support, said wheeled base including at least four floor surface engaging wheels spaced from one another, said wheeled carriage having a first edge corresponding to the head end of said patient support and a second edge corresponding to the foot end of said patient support, said wheeled base having an imaginary transverse centerline located at a midpoint of the length of said wheeled base and dividing said wheeled base;

an auxiliary wheel support structure secured to said wheeled base and suspendedly supporting at least one auxiliary wheel at an axis thereof to said wheeled base, wherein the axis of said at least one auxiliary wheel is spaced from the centerline at the midpoint of said wheeled base toward the second edge of said wheeled base; and a control apparatus for controlling said auxiliary wheel support structure to move said at least one auxiliary wheel between a first deployed position whereat said auxiliary wheel is engaged with a floor surface and two of said floor engaging wheels adjacent said foot end of said wheeled carriage are elevated away from the floor surface when the floor surface is even, and a second stored position whereat said at least one auxiliary wheel is out of engagement with the floor surface; and a retraction damper unit for slowing movement of said at least one auxiliary wheel from the deployed position toward the stored position to decrease a force caused when the two of said floor engaging wheels adjacent said foot end of said wheeled carriage contact the floor surface during raising of said at least one auxiliary wheel.

64. The wheeled carriage according to claim 63, said control apparatus including a rotatable shaft oriented on an axis parallel to a longitudinal axis of said rectangular patient support and having a first manually manipulatable member connected to said rotatable shaft, said first manually manipulatable member being oriented adjacent at least one of said head and foot ends.

65. The wheeled carriage according to claim 64, said wheeled carriage further comprising a cam apparatus including a linkage unit pivotally securing said rotary shaft of said control apparatus to a cam, and a cam follower secured to said auxiliary wheel support structure, said cam follower being movable by said cam, wherein rotation of said cam operates on said cam follower so that said at least one auxiliary wheel moves between the first deployed position and the second stored position.

66. The wheeled carriage according to claim 65, wherein said retraction damper unit includes a damper for resisting movement of said cam from a cam position corresponding to the first deployed position of said at least one auxiliary wheel to a cam position corresponding to the stored position of said at least one auxiliary wheel.

67. The wheeled carriage according to claim 66 wherein said retraction damper unit includes a damper roller for contacting an outwardly projecting cam surface of said cam, and a linkage unit linking said damper roller to said damper.

68. The wheeled carriage according to claim 67, wherein said damper resists movement of said damping rod only in one of said first and second opposing directions corresponding to retracting of said at least one auxiliary wheel.

69. The wheeled carriage according to claim 63, wherein said retraction damper unit includes a damping rod within a damper, said damping rod being movable in first and second opposing directions.

70. A wheeled carriage for supporting a patient in a substantially horizontal position, comprising:

a patient support having a length, opposing ends of the length comprising a head end and a foot end of said patient support, said patient support having a pair of lateral sides intermediate the head and foot ends;

a wheeled base having a length and supporting said patient support and enabling movement of said patient support, said wheeled base including at least four floor surface engaging wheels spaced from one another, said wheeled carriage having a first edge corresponding to the head end of said patient support and a second edge corresponding to the foot end of said patient support, said wheeled base including first and second spaced elongate frame members extending the length of said wheeled base;

an auxiliary wheel support structure secured to said wheeled base and suspendedly supporting at least one auxiliary wheel at an axis thereof to said wheeled base, wherein the axis of said at least one auxiliary wheel is spaced from the centerline at a midpoint of said wheeled base toward the second edge of said wheeled base, said auxiliary wheel support structure comprising:

a push rod pivotally secured at a first end to said wheeled base; and a linkage element having a first end movable when said auxiliary wheel support structure is moved between a first deployed position whereat said auxiliary wheel is engaged with a floor surface and a second stored position whereat said auxiliary wheel is out of engagement with the floor surface, a second end of said push rod being pivotally secured to a second end of said linkage element; and a control apparatus for coacting with the first end of said linkage element to move said at least one auxiliary wheel between the first deployed position and the second stored position, wherein, when a portion of the floor surface has a lower depth directly below said deployed auxiliary wheel such that the four surface engaging wheels engage the floor surface, said auxiliary wheel support structure enables downward movement of said at least one auxiliary wheel from said deployed position so that said auxiliary wheel maintains contact with the floor surface, and wherein the second ends of said linkage element and said push rod are at a raised position relative to said frame members when said auxiliary wheel is in the deployed position and the second ends of said linkage element and said push rod are at a lowered position relative to said frame members when said auxiliary wheel is in the second stored position.

71. The wheeled carriage of claim 70, wherein the first end of said linkage element includes an opening receiving a roller member.

72. The wheeled carriage of claim 71, wherein said auxiliary wheel support structure includes a cam follower and said control apparatus comprises a rotatable shaft for rotation by a user and a cam apparatus responsive to the rotation, and wherein said cam apparatus coacts with said cam follower and said roller member to simultaneously pivot the first end of said linkage element and the second end of said linkage element, thus moving the second end of said push rod and said linkage element between the raised position and the lowered position relative to said wheeled base.

73. The wheeled carriage of claim 70, wherein the second end of said push rod is pivotally and slidably secured to the second end of said linkage element.

74. The wheeled carriage of claim 73, said push rod including a rod slot at the second end thereof and a cross pin extending through the rod slot and secured to the second end of said linkage element, wherein the rod slot enables said linkage element to move toward said rod when the lengths of said rod and said linkage element are substantially in alignment with each other.

75. The wheeled carriage of claim 73, said auxiliary wheel support structure including a rod spring mounted about and along the length of said rod member for applying a biasing force at ends thereof, wherein, when said deployed auxiliary wheel is positioned at the portion of the floor surface such that the four surface engaging wheels engage the floor surface, said rod spring applies a biasing force through said linkage element and said roller member to move said auxiliary wheel downwardly to maintain contact with the floor surface.

76. The wheeled carriage of claim 73, wherein said auxiliary wheel support structure includes a pair of spaced parallel auxiliary wheel support frame members pivotally secured at first ends to said wheeled base and secured at second ends to a cross bar, said cross bar supporting a support member including a cam follower, and a roller member received in an opening at the first end of said linkage element.

77. The wheeled carriage of claim 76, wherein said control apparatus comprises a rotatable shaft for rotation by a user and a cam apparatus responsive to the rotation, wherein said cam apparatus coacts with said cam follower and said roller member to simultaneously pivot the first end of said linkage element and the second end of said linkage element.

78. The wheeled carriage of claim 70, wherein said control apparatus comprises a cam apparatus and said auxiliary wheel support structure includes a cam follower and a support member, said cam apparatus coacting with said cam follower and a roller member located at the first end of said linkage element.

* * * * *